(12) United States Patent
Kodas et al.

(10) Patent No.: US 10,201,916 B2
(45) Date of Patent: Feb. 12, 2019

(54) GAS DISPERSION MANUFACTURE OF NANOPARTICULATES, AND NANOPARTICULATE-CONTAINING PRODUCTS AND PROCESSING THEREOF

(71) Applicant: SICPA HOLDING SA, Prilly (CH)

(72) Inventors: Toivo T. Kodas, Carlisle, MA (US); Mark J. Hampden-Smith, Albuquerque, NM (US); Klaus Kunze, Carlsbad, CA (US); David E. Dericotte, Albuquerque, NM (US); Karel Vanheusden, Los Altos, CA (US); Aaron Stump, Albuquerque, NM (US)

(73) Assignee: SICPA HOLDING SA, Prilly (CH)

( * ) Notice: Subject to any disclaimer, the term of this patent is extended or adjusted under 35 U.S.C. 154(b) by 1185 days.

(21) Appl. No.: 14/056,134

(22) Filed: Oct. 17, 2013

(65) Prior Publication Data
US 2014/0042652 A1 Feb. 13, 2014

Related U.S. Application Data

(62) Division of application No. 11/199,100, filed on Aug. 8, 2005.

(60) Provisional application No. 60/599,847, filed on Aug. 7, 2004.

(51) Int. Cl.
*B29B 9/12* (2006.01)
*B01J 13/00* (2006.01)

(52) U.S. Cl.
CPC .............. *B29B 9/12* (2013.01); *B01J 13/0043* (2013.01); *B01J 13/0047* (2013.01); *B01J 13/0095* (2013.01)

(58) Field of Classification Search
None
See application file for complete search history.

(56) References Cited

U.S. PATENT DOCUMENTS

| | | |
|---|---|---|
| 5,429,824 A | 7/1995 | June |
| 5,498,446 A | 3/1996 | Axelbaum et al. |
| 5,560,931 A | 10/1996 | Eickhoff et al. |
| 5,569,448 A | 10/1996 | Wong et al. |
| 5,573,783 A | 11/1996 | Desieno et al. |
| 5,656,329 A | 8/1997 | Hampden-Smith et al. |
| 5,695,901 A | 12/1997 | Selim |
| 5,766,788 A | 6/1998 | Inoue et al. |
| 5,776,539 A | 7/1998 | Watanabe et al. |
| 5,876,793 A | 3/1999 | Sherman et al. |
| 5,879,715 A | 3/1999 | Higgins et al. |
| 5,889,091 A | 3/1999 | Ziolo |
| 6,024,786 A | 2/2000 | Gore |
| 6,103,393 A | 8/2000 | Kodas et al. |
| 6,194,338 B1 | 2/2001 | Andolfatto et al. |
| 6,245,280 B1 | 6/2001 | Tan et al. |
| 6,254,940 B1 | 7/2001 | Pratsinis et al. |
| 6,267,989 B1 | 7/2001 | Liversidge et al. |
| 6,270,806 B1 | 8/2001 | Liversidge et al. |
| 6,277,169 B1 | 8/2001 | Hampden-Smith et al. |
| 6,277,766 B1 | 8/2001 | Ayers |
| 6,291,188 B1 | 9/2001 | Meade et al. |
| 6,328,894 B1 | 12/2001 | Chan et al. |
| 6,338,809 B1 | 1/2002 | Hampden-Smith et al. |
| 6,375,986 B1 | 4/2002 | Ryde et al. |
| 6,406,745 B1 | 6/2002 | Talton |
| 6,428,814 B1 | 8/2002 | Bosch et al. |
| 6,429,824 B2 | 8/2002 | LaRochelle et al. |
| 6,482,387 B1 | 11/2002 | Gulgun et al. |
| 6,503,475 B1 | 1/2003 | McCormick et al. |
| 6,506,493 B1 | 1/2003 | Kumar et al. |
| 6,506,564 B1 | 1/2003 | Mirkin et al. |
| 6,537,665 B2 | 3/2003 | O'Connor et al. |
| 6,601,776 B1 | 8/2003 | Oljaca et al. |
| 6,712,993 B2 | 3/2004 | Kijima et al. |
| 6,746,767 B2 | 6/2004 | Gottfried et al. |

(Continued)

FOREIGN PATENT DOCUMENTS

| | | |
|---|---|---|
| DE | 196 39 632 | 4/1998 |
| JP | 2003-019427 | 7/2001 |

(Continued)

OTHER PUBLICATIONS

Xia et al.; "Novel Route to Nanoparticle Synthesis by Salt-Assisted Aerosol Decomposition", 2001 Wiley-VCH Verlag GmbH, Advanced Materials, vol. 13, No. 20, pp. 1579-1582.*
Sharma et al.; "Tailoring the particle size from IJm ~ nm scale by using a surface modifier and their size effect on the fluorescence properties of europium doped yttria", 1999; Elsevier, Journal of Luminescence, vol. 82, pp. 187-193.*
Choi et al. "Enhanced cathodoluminescent properties of ZnO encapsulated ZnS:Ag phophors using an electrochemical deposition coating," 2003; American Institute of Physics, Applied Physic Letters, vol. 82, No. 15, pp. 2494-2496.*
Lenggoro et al.; "An experimental and modeling investigation of particle production by spray pyrolysis using laminar flow aerosol reactor", 2000; Materials Research Society; Journal of Materials Research, vol. 15, No. 3, pp. 733-743.*
Sharma et al.; "Tailoring the particle size from µm →nm scale by using a surface modifier and their size effect on the fluorescence properties of europium doped yttria", 1999; Elsevier, Journal of Luminescence, vol. 82, pp. 187-193.

(Continued)

*Primary Examiner* — David J Blanchard
*Assistant Examiner* — Ivan A Greene
(74) *Attorney, Agent, or Firm* — Muncy, Geissler, Olds & Lowe, P.C.

(57) ABSTRACT

In one aspect, the present invention relates to a method of making multi-phase particles that include nanoparticulates and matrix, which maintains the nanoparticulates in a dispersed state. A flowing gas dispersion is generated that includes droplets of a precursor medium dispersed in a gas phase. The precursor medium contains liquid vehicle and at least a first precursor to a first material and a second precursor to a second material. The multi-phase particles are formed from the gas dispersion by removing at least a portion of the liquid vehicle from the droplets of precursor medium. The nanoparticulates in the multi-phase particles include the first material and the matrix in the multi-phase particles includes the second material.

2 Claims, 19 Drawing Sheets

(56) References Cited

U.S. PATENT DOCUMENTS

| | | |
|---|---|---|
| 6,811,885 B1 | 11/2004 | Andriessen et al. |
| 7,078,276 B1 | 7/2006 | Zurcher et al. |
| 2002/0068092 A1 | 6/2002 | Boxch et al. |
| 2002/0106461 A1 | 8/2002 | Talton |
| 2002/0110597 A1 | 8/2002 | Ryde et al. |
| 2002/0145132 A1 | 10/2002 | Won |
| 2003/0049517 A1 | 3/2003 | Hampden-Smith et al. |
| 2003/0054218 A1 | 3/2003 | Hampden-Smith et al. |
| 2003/0108644 A1 | 6/2003 | Coleman et al. |
| 2003/0108664 A1 | 6/2003 | Kodas et al. |
| 2003/0115986 A1 | 6/2003 | Pozarnsky et al. |
| 2003/0115987 A1 | 6/2003 | Pozarnsky et al. |
| 2003/0115988 A1 | 6/2003 | Pozarnsky et al. |
| 2003/0116017 A1 | 6/2003 | Pozarnsky et al. |
| 2003/0116080 A1 | 6/2003 | Huang |
| 2003/0116228 A1 | 6/2003 | Pozarnsky |
| 2003/0124259 A1 | 7/2003 | Kodas et al. |
| 2003/0146529 A1 | 8/2003 | Chen et al. |
| 2003/0148024 A1 | 8/2003 | Kodas et al. |
| 2003/0161959 A1 | 8/2003 | Kodas et al. |
| 2003/0175411 A1 | 9/2003 | Kodas et al. |
| 2003/0180451 A1 | 9/2003 | Kodas et al. |
| 2004/0182533 A1 | 9/2004 | Blum et al. |

FOREIGN PATENT DOCUMENTS

| | | |
|---|---|---|
| WO | 9713503 | 4/1997 |
| WO | 2003/032084 | 4/2003 |
| WO | 2003/038002 | 5/2003 |
| WO | 2004/081111 | 9/2004 |

OTHER PUBLICATIONS

Xia et al.; "Nanoparticle Separation in Salt Droplet Microreactors", 2002; American Chemical Society; Chemistry of Materials, vol. 14, No. 6, pp. 2623-2627.

Moore, Anna; et al.; "Tumoral Distribution of Long-circulating Dextran-coated Iron Oxide Nanoparticles in a Rodent Model", 2000, Radiology, vol. 214, pp. 568-574.

Merriam-Webster™ "Merriam-Webster's Collegiate Dictionary, 11th edition," 2003; Merriam-Websters Inc; entries for "dispersion" (361), "isosmotic" (665), "matrix" (766), "phase" (p. 928), "robust" (p. 1078) and "saline" (p. 1097), pp. 1-25.

Lewis, Richard J.; "Hawley's Condensed Chemical Dictionary" 15$^{th}$ ed., 2007, entry for "phosphor", p. 984.

Kim, H-S et al., "Growth of Monodisperse Silver Nanoparticles in Polymer Matrix by Spray Pyrolysis", *Aerosol Science and Technology*, 40, pp. 536-544 (2006).

Mikrajuddin Abdullah, I. Wuled Lenggoro, and Kikuo Okuyama and Frank G. Shi, "In Situ Synthesis of Polymer Nanocomposite Electrolytes Emitting a High Luminescence with a Tunable Wavelength", J. Phys. Chem. B., pp. 107, 1957-1961, 2003.

Xia, I.W. Lenggoro and K.Okuyama, "Synthesis of CeO2 nanoparticles by salt-assisted ultrasonic aerosol decomposition", J. Mater. Chem., pp. 11, 2925-2927, 2001.

Ferry Iskandar, I. Wuled Lenggoro, Bin Xia and Kikuo Okuyama, "Functional nanostructured silica powders derived from colloidalsuspensions by sol spraying" Journal of Nanoparticle Research, pp. 3: 263-270, 2001.

Mikrajuddin, I.W. Lenggoro, Kikuo Okuyama, and F.G. Shi, "Luminescent Polymer Electrolytes Prepared by Growing ZnO Nanoparticles in the Matrix of Polyethylene Glycol.", Journal of the Electrochemical Society, pp. 149 (5) H107-H112/2002.

Kikuo Okuyama, I. Wuled Lenggoro, "Preparation of nanoparticles via spray route", Chemical Engineering Science 58, pp. 537-547, 2003.

Kim, et al., Synthesis of Nanoporous Metal Oxide Particles by a New Inorganic Matrix Spray Pyrolysis Method, *Chem. Mater.*, vol. 14, pp. 2889-2899 (2002).

Li, et al., *Process for Preparing Macroscopic Quantities of Brightly Photoluminescent Silicon Nanoparticles with Emission Spanning the Visible Spectrum*, Langmuir, vol. 19, pp. 8490-8496 (2003).

Silvert, Pierre-Yves, et al., *Preparation of colloidal silver dispersions by the polyol process, Part 1—Synthesis and characterization*, Journal of Material Chemistry, 6(4), pp. 573-577 (1996).

Silvert, Pierre-Yves, et al., *Preparation of colloidal silver dispersions by the polyol process, Part 2—Mechanism of particle formation*, Journal of Material Chemistry, 7(2), pp. 193-199 (1997).

Xia, et al., The roles of ammonia and ammonium bicarbonate in the preparation of nickel particles from nickel chloride, *J. Materl. Res.*, vol. 15, No. 10, pp. 2157-2166 (2000).

Xia, et al., Synthesis and Photoluminescence of Spherical ZnS:MN$^{2+}$ Particles, *Chem. Mater.*, vol. 14, pp. 4969-4974 (2002).

\* cited by examiner

```
┌─────────────────────────┐
│ GENERATING GAS DISPERSION│─ 102
└─────────────────────────┘
             │
             ▼
┌─────────────────────────┐
│    FORMING PARTICLES    │─ 104
└─────────────────────────┘
```

FIG. 1

```
┌─────────────────────────────┐
│  GENERATING GAS DISPERSION  │─── 102
└──────────────┬──────────────┘
               │
               ▼
┌─────────────────────────────┐
│      FORMING PARTICLES      │─── 104
└──────────────┬──────────────┘
               │
               ▼
┌─────────────────────────────┐
│    DECOMPOSING PARTICLES    │─── 116
└─────────────────────────────┘
```

FIG. 3

```
┌─────────────────────────────┐
│  GENERATING GAS DISPERSION  │─── 102
└─────────────────────────────┘
              │
              ▼
┌─────────────────────────────┐
│      FORMING PARTICLES      │─── 104
└─────────────────────────────┘
              │
              ▼
┌─────────────────────────────┐
│  MODIFYING NANOPARTICULATES │─── 118
└─────────────────────────────┘
```

FIG. 4

```
GENERATING GAS DISPERSION    /102
          │
          ▼
FORMING PARTICLES            /104
          │
          ▼
DECOMPOS

```
┌─────────────────────────────┐
│ GENERATING GAS DISPERSION   │──102
└─────────────────────────────┘
              │
              ▼
┌─────────────────────────────┐
│      FORMING PARTICLES      │──104
└─────────────────────────────┘
              │
              ▼
┌─────────────────────────────┐
│      MODIFYING MATRIX       │──126
└─────────────────────────────┘
```

FIG. 8

GAS DISPERSION MANUFACTURE OF NANOPARTICULATES, AND NANOPARTICULATE-CONTAINING PRODUCTS AND PROCESSING THEREOF

CROSS REFERENCE TO RELATED APPLICATIONS

This application is a divisional of and claims priority to U.S. application Ser. No. 11/199,100, filed on Aug. 8, 2005, and to U.S. Provisional Patent Application No. 60/599,847, filed Aug. 7, 2004, both hereby incorporated by reference in their entirety.

FEDERALLY SPONSORED RESEARCH OR DEVELOPMENT

This application claims an invention made with United States Government support under agreement No. 70NANB2H3034 awarded by the National Institute of Standards and Technology (NIST). The United States Government has certain rights in the invention.

FIELD OF THE INVENTION

The present invention relates to nanoparticulate materials, products containing and made using nanoparticulate materials, and methods of making and processing nanoparticulate materials.

BACKGROUND OF THE INVENTION

Nanoparticulate materials, and methods for making nanoparticulate materials, have been the subject of recent interest and research because of the advantages provided by nanoparticulate materials over larger sized particulate materials. One advantage of nanoparticulates is increased surface area, which is useful in a variety of applications, including catalyst, electrocatalyst, absorbent, chemical separations and bio-separation applications. Nanoparticulates are also useful in formulations of inks, pastes and tapes that are used in depositing thin or thick films, such as optically transparent conductors for use in displays, magnetic coatings for storage media and printed circuitry for electronic applications. Inks and pastes with nanoparticulates have improved rheology characteristics (e.g., flowability), which allow thinner layers to be applied and allow deposition of features with smaller dimensions. Lighting applications also benefit from the properties of nanoparticulate materials; for example, semiconductor nanoparticulates, in addition to other uses, are useful because of their "quantum dot effect," which allows the luminescent color of a semiconductor nanoparticulate to be tailored according to the size of the nanoparticulate. In addition to the examples above, nanoparticulate materials are being used, or considered for use, in many other applications including pharmaceutical formulations, drug delivery applications, medial diagnostic aids, abrasives, pigments, phosphors for lighting, dental glasses, polymeric fillers, thermal interface materials and cosmetics.

As a result of the large number of applications for nanoparticulate materials, a variety of methods have been developed for making and processing nanoparticulates. One common problem faced by these methods is the tendency of the nanoparticulates to agglomerate because of their high surface area. Once the nanoparticulates have agglomerated, often they do not provide the same advantages achieved when the individual nanoparticulates are in a dispersed state. Consequently, the tendency of nanoparticulates to agglomerate makes the forming, processing, handling, transporting and use of nanoparticulates problematic. Complicating matters is that separating or redispersing nanoparticulates once they have agglomerated is difficult to do.

Thus, there is a need for additional methods of forming, processing, handling, transporting and using nanoparticulates and new nanoparticulate products that alleviate some or all of these problems.

SUMMARY OF THE INVENTION

With the present invention, problems with agglomeration that may be encountered during manufacture, processing, handling and using nanoparticulates may be addressed through manufacture and/or processing of nanoparticulates in a dispersed state within multi-phase particles in which the nanoparticulates are maintained in the dispersed state by matrix.

A first aspect of the invention involves a method for making nanoparticulates, with the method including generating a flowing gas dispersion containing droplets of a precursor medium dispersed in a gas phase, removing liquid vehicle from the droplets of the gas dispersion, and forming the multi-phase particles. In one implementation of this first aspect, the multi-phase particles are formed in the gas dispersion under controlled conditions. In variation of this implementation, the controlled conditions include not permitting the average stream temperature of the gas dispersion to exceed a melting temperature for more than a short time, such as no longer than 10 seconds. In variation of this implementation, a reducing agent is used to promote formation of nanoparticulate material. In another implementation this aspect, first particles are formed in the gas phase and then the first particles are modified to form second particles that are in the multi-phase form including the nanoparticulates and the matrix. In one variation of this implementation, the conversion to the second particles occurs in the gas dispersion. In another variation of this implementation, the conversion to the second particles occurs after the first particles have been separated from the gas dispersion. In another implementation of this first aspect, the multi-phase particles are formed in the gas dispersion and collected from the gas dispersion directly into a liquid medium.

A second aspect of the invention involves processing of the multi-phase particles, or portions thereof. In one implementation of this second aspect, the processing involves decomposing the multi-phase particles in a liquid medium to release the nanoparticulates for dispersion in the liquid medium. In one variation of this implementation, the processing involves surface-modifying the nanoparticulates. In another variation of this implementation, the processing involves, after releasing the nanoparticulates, fixedly dispersing the nanoparticulates in a composite structure with a different matrix. In another implementation of this second aspect, the processing involves modifying at least one of the matrix and the nanoparticulates while the nanoparticulates remain in the dispersed state of the multi-phase particles. In one particular embodiment, a portion of the matrix is removed while retaining nanoparticulates in the dispersed state. In another implementation of this second aspect, multi-phase particles are subjected to treatment in a liquid medium. In one variation of this implementation, the solutes are removed from the liquid medium to reduce the concentration of the solutes in the liquid medium. In one variation of this implementation, the solutes are separated by passage through a membrane. This second aspect of the invention may be combined with the first aspect of the invention to make the multi-phase particles and then process the multi-phase particles, or portions thereof.

A third aspect of the invention involves particulate product comprising the multi-phase particles. In one implementation of this aspect, the multi-phase particles a portion of the matrix is selectively removable relative to another portion of the matrix. In one variation of this implementation, the matrix includes at least two different materials, with one being selectively removable relative to the other. In another implementation of this aspect, the multi-phase particles comprise nanoparticulates of at least two different compositions. In another implementation of this aspect, the multi-phase particles include a surface-modifying material, and the multi-phase particles are decomposable to release the nanoparticulates with surface modification of the nanoparticulates through association with the surface-modifying material. The first and/or second aspects of the invention are useful for making multi-phase particles of the third aspect of the invention.

These aspects, implementations and variations, and other aspects, implementations and variations of the inventions are discussed below.

BRIEF DESCRIPTION OF THE DRAWINGS

FIG. 1 is a generalized process block diagram of one embodiment of the method of the present invention involving preparation of multi-phase particles including dispersed nanoparticulates and matrix.

FIG. 3 is a generalized process block diagram of one embodiment of the method of the present invention including a decomposing particles step.

FIG. 4 is a generalized process block diagram of one embodiment of the method of the present invention including a modifying nanoparticulates step.

FIG. 6 is a generalized process block diagram of one embodiment of the method of the present invention including a modifying nanoparticulates step preceded by a decomposing particles step.

FIG. 8 is a generalized process block diagram of one embodiment of the method of the present invention including a modifying matrix step.

DETAILED DESCRIPTION OF THE INVENTION

With reference to FIG. 1, a general process block diagram is shown for one implementation of a method of the invention for making nanoparticulates. By nanoparticulates, it is generally meant particles having a weight average size of smaller than 500 nm, and typically in a range of from 1 nm to 500 nm. During generating gas dispersion 102, a gas dispersion is generated, with the gas dispersion including a disperse phase dispersed in and suspended by a gas phase. As generated, the gas dispersion has a disperse phase of droplets of a precursor medium dispersed in and suspended by the gas phase. After the generating gas dispersion 102, the gas dispersion is processed in a forming particles 104 step. During the forming particles 104, liquid is removed from the droplets of the precursor medium and particles are formed that include dispersed nanoparticulates that are maintained in a dispersed state in the particles by a matrix.

During the generating gas dispersion 102, the precursor medium is processed to form the droplets of the gas dispersion produced during the generating gas dispersion 102. The precursor medium is a flowable medium containing a sufficient proportion of a liquid vehicle to impart flowability to the medium. In addition to the liquid vehicle, the precursor medium also includes one or more precursors. Each such precursor in the precursor medium is a material that contributes one, or more than one, component to the composition of the particles formed during the forming particles 104. Each precursor included in the precursor medium is either dissolved in the liquid vehicle or is in a fine particulate form suspended in a liquid vehicle. In addition to the precursor, the precursor medium may include one or more other additives, or reagents. As used in this context, reagent refers to a material included in the precursor medium for some purpose other than to provide a component for inclusion in the particles formed during the forming particles step 104.

The gas dispersion is in the nature of a mist or aerosol of the droplets in the gas phase. During the generating gas dispersion 102, the gas dispersion is prepared using any technique for atomizing the precursor medium (i.e., converting the precursor medium to the finely divided form of droplets) and dispersing and suspending the atomized droplets of precursor medium in a gas phase.

During the forming particles 104, liquid vehicle is removed from the droplets to the gas phase of the gas dispersion and particles are formed, which particles are dispersed in the gas dispersion. Removal of the liquid vehicle from the droplets may be accomplished, for example, by vaporizing the liquid vehicle, with liquid vehicle vapor mixing into the gas phase. Such vaporization is preferably aided by heating of the gas dispersion. Also during the forming particles 104, precursors in the gas dispersion may undergo any reactions or other transformations or modifications required to make the particles. The final particles resulting from the forming particles 104 may be formed while the particles remain dispersed in the gas from the forming particles 104 may be formed while the particles reunion dispersed in the gas dispersion or may be formed during further processing conducted after removal of particles from the gas dispersion. Processing that may occur during the forming particles 104 while particles remain dispersed in the gas dispersion and after removal of particles from the gas dispersion may include, for example, reaction of precursors, material phase redistribution, crystal growth or regrowth, nanoparticulate phase formation, growth of nanoparticulate domains (such as through nanoparticulate agglomeration or coalescence), compositional modification, particle coating, etc. For example, particles as formed in the gas dispersion may not have undergon all necessary chemical reactions for morphological modifications necessary to form the desired final particles. In this case, forming particles 104 might involve a step of collecting particles from the gas dispersion and a step of subjecting the collected particles to a subsequent heat treatment during which precursor reactions or other particle transformations or modifications may occur that are required to make the desired final particles. Also, all precursors and reagents required to form the desired final particles during the forming particles 104 may be included in the gas dispersion as generated during the generating gas dispersion 102, or one or more precursor or reagent may be introduced separately during the forming particles 104.

Figure 2:
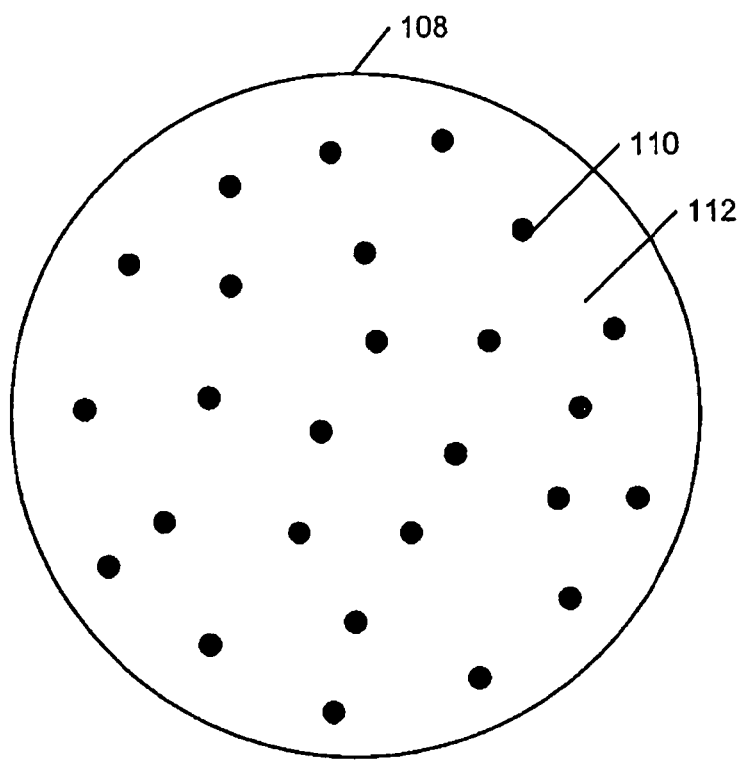
FIG. 2 generally illustrates features of a multi-phase particle manufacturable using the method of the present invention.

The final particles produced during and resulting from the forming particles 104 are multi-phase particles, meaning that at least two distinct material phases are present in the particles. Moreover, the multi-phase particles comprise the nanoparticulates that include at least a first material phase and the multi-phase particles also comprise the matrix that includes at least a second material phase that is different than the first material phase. FIG. 2 generally illustrates one example of a multi-phase particle including dispersed nanoparticulates and matrix, which multi multi-phase particle may result from the forming particles 104. FIG. 2 shows a multi-phase particle 108 generally comprising dispersed nanoparticulates 110 and matrix 112, with the dispersed nanoparticulates 110 maintained in a dispersed state within the particle 108 by matrix 112. The matrix 112 therefore functions to keep the nanoparticulates 110, at least partially and preferably completely, separated to inhibit or prevent agglomeration or coalescense of the nanoparticulates 110 after final formation of the nanoparticulates 110. As noted previously, prior to formation of the final nanoparticulate domains of the nanoparticulates 110, domains of nanoparticulate material may agglomerate and coalese during the forming particles 104.

In the multi-phase particles 108 of FIG. 2, the matrix 112 and the dispersed nanoparticulates 110 are of different compositions, although they may have one or more components in common. Also, although the nanoparticulates 110 and the matrix 112 are each shown including only a single material phase, the invention is not so limited. Referring again to FIG. 1, the particles produced during the forming particles 104 may include one or more of the following features: nanoparticulates each comprised of two or more different material phases; two or more different compositions of nanoparticulates; and matrix comprising two or more different material phases. Moreover, it is not necessary that the matrix or the nanoparticulates be comprised of only a single material phase, or that any material phase of the matrix be a continuous phase. For example, the matrix may be made of many different material phases that together provide a structure for maintaining the nanoparticulates in a dispersed state. Likewise, for example, multi-phase particles made according to the invention may include nanoparticulates of only a single type or may include two or more different nanoparticulates (i.e., nanoparticulates of different compositions). Also, for example, the composition of a nanoparticulate may comprise only a single material phase or may comprise two or more distinct material phases. More specific examples of some possible matrix and nanoparticulate features are provided below.

With reference to FIG. 2, the composition of the matrix 112 may be designed to be wholly or partially permanent for use in a final application. Alternatively, the composition of the matrix 112 may be designed to function as a storage, handling or processing aid, which is wholly or partially removable prior to final use of the nanoparticulates.

As one example, the matrix may be wholly removable, or partially removable to a sufficient extent, to release the nanoparticulates for further processing or for use. In one variation of this example, the matrix may comprise only material(s) designed to be removed at the same time. In another variation of this example, the matrix may include a material that is selectively removable relative to another material to provide enhanced access to the nanoparticulates for intermediate processing prior to removal of other matrix material(s) to effect release of the nanoparticulates. As another example, all or part of the matrix may be designed for permanent use. In one variation of this other example, the matrix as originally formed during the forming particles 104 may be designed to permanently maintain the nanoparticulates in a fixed dispersion for some final application. In another variation of this other example, a portion of the matrix may be selectively removable relative to another portion of the matrix designed to be permanent, providing enhanced access to the nanoparticulates for purposes of intermediate processing prior to final use or for purposes of a final use.

A variety of specific examples will now be presented of materials for possible inclusion in nanoparticulates and matrix of multi-phase particles manufacturable using the method of the invention. It should be appreciated, however, that the examples are non-limiting in that other non-listed materials could additionally or instead be included in nanoparticulates and/or matrix. Also, although some preferred materials are listed for each of the nanoparticulates and the matrix, it should be understood that any of the exemplary materials identified for potential use in nanoparticulates could instead be used in matrix and any of the exemplary materials identified for potential use in matrix could instead be used in nanoparticulates.

With reference to FIG. 1, nanoparticulates in the multi-phase particles made during the forming particles 104 may include organic and/or inorganic materials. Examples of inorganic materials for possible inclusion in nanoparticulates include metallic materials, (including single metals, alloys and intermetallic compounds), ceramics and elemental carbon (such as for example graphite, carbon tubes, carbon spheres (e.g., fullerines, buckyballs) diamond-like carbon, carbon blacks, and modified carbon blacks). Some examples of metallic materials for inclusion in nanoparticulates include one or more of elemental silver, platinum, zinc, palladium, ruthenium, gold, copper, rhodium, tin, molybdenum, cobalt, iron, nickel, metal alloys including one or more of the foregoing and metal elements, and inter-metallic compounds including one or more of the foregoing metal elements. Some examples of ceramic materials for inclusion in nanoparticulates include one or more of oxides, sulfides, carbides, nitrides, borides, tellurides, selenides, phosphides, oxycarbides, oxynitrides, titanates, zirconates, stannates, silicates, aluminates, tantalates, tungstates, glasses, doped and mixed metal oxides. Specific examples of some preferred oxides include silica, alumina, titania, magnesia, indium oxide, indium tin oxide and ceria. Moreover, the composition of the nanoparticulates may be designed for any desired application. For example, the nanoparticulates could include materials such as a semiconductor, a phosphor, an electrical conductor, a transparent electrical conductor, a thermochromic, an electrochromic, a magnetic material, a thermal conductor, an electrical insulator, a thermal insulator, a polishing compound, a catalyst, a pigment or a drug or other pharmaceutical material. Examples of organic materials for possible inclusion in nanoparticulates include one or more polymeric or non-polymeric organic compounds.

In one particular implementation of the invention, the nanoparticulates comprise phosphor materials for use in the nanoparticulates, such as when the nanoparticulates are to be used as phosphors in a display application. Phosphors are substances that are capable of luminescence. The luminescence involves emission of radiation in response to a stimulus or excitation. Preferred luminescence of phosphors for use with this implementation of the invention includes emission of visible light for use in display applications. Such phosphors may, for example, be cathodoluminescent, electroluminescent, photoluminescent or x-ray luminescent. For example, the phosphor materials may be organic or inorganic in composition, or may be a composite of inorganic and organic light emitting materials. Inorganic phosphor compositions typically include a host material and one or more dopants, also referred to as activator ions. Examples of host materials include yttrium oxides, yttrium oxysulfides, gadolinium oxysulfides, sulfides (such as for example zinc sulfide, calcium sulfide and strontium sulfide), silicates (such as for example zinc silicate and yttrium silicate, thiogallates (such as for example strontium thiogallate and calcium thiogallate), gallates (such as for example zinc gallate, calcium gallate and strontium gallate), aluminates (such as for example barium aluminate and barium magnesium aluminate (BAM)), thioaluminates (such as for example barium thioaluminate) and borates (such as for example yttrium-gadolinium borate). Table 1 lists some non-limiting examples of inorganic phosphor materials, including host material and exemplary activator ions, and the type of excitation for luminescence.

TABLE 1

Exemplary Inorganic Phosphor Compositions For Nanoparticulates

| HOST MATERIAL | ACTIVATOR ION (S) | EXCITATION MECHANISM |
|---|---|---|
| $Y_2O_3$ | Eu, rare earths, Tb | Cathodoluminescent, Photoluminescent |
| $Y_2O_2S$ | Eu, Tb | Cathodoluminescent |
| ZnS | Au, Al, Cu, Ag, Cl, Mn | Cathodoluminescent, Electroluminescent |
| $SrGa_2S_4$ | Eu, Ce | Cathodoluminescent, Electroluminescent |
| $Y_3Al_5O_{12}$ | Tb, Cr | Cathodoluminescent, Photoluminescent |
| $Y_3(Ga,Al)_5O_{12}$ | Tb, Cr | Cathodoluminescent, Photoluminescent |
| $Zn_2SiO_4$ | Mn | Cathodoluminescent, Photoluminescent |
| $Y_2SiO_5$ | Tb, Ce | Cathodoluminescent |
| BaS | Eu, Ce | Electroluminescent |
| CaS | Eu, Ce | Electroluminescent |
| SrS | Eu, Ce | Electroluminescent |
| $CaGa_2S_4$ | Eu, Ce | Electroluminescent |
| $ZnGa_2O_4$ | Mn, Cr | Electroluminescent |
| $CaGa_2O_4$ | Eu, Ce | Electroluminescent |
| $SrGa_2O_4$ | Eu, Ce | Electroluminescent |
| $Ga_2O_3$ | Dy, Eu | Electroluminescent |
| $Ca_3Ga_2O_6$ | Eu, Ce | Electroluminescent |
| $Zn_2GeO_4$ | Mn | Electroluminescent |
| $Zn_2(Ge,Si)O_4$ | Mn | Electroluminescent |
| $(Y,Gd)BO_3$ | Eu, Tb | Photoluminescent |
| $BaMgAl_{10}O_{17}$ | Mn, Eu | Photoluminescent |
| $BaAl_xO_y$ | Mn | Photoluminescent |
| $Gd_2O_2S$ | Tb | X-ray |
| $(Y,Gd)_2SiO_5$ | Tb, Ce | X-ray |

In one particular implementation of the invention, the nanoparticulates comprise catalyst compositions. Catalysts are substances that affect the rate of chemical reactions without themselves being consumed or undergoing chemical change. Nanoparticulate catalysts have an advantage of very large specific surface area, providing a large amount of catalytic surface area per unit mass of catalyst material. Catalysts may be organic compositions, or inorganic compositions, or a combination of organic and inorganic constituents. Preferred catalysts for use in nanoparticulates of the invention include inorganic catalytic material, which may be either supported or unsupported. By a supported catalyst, it is meant that the catalytic material is supported by a support material, which imparts structural integrity to the composition. The support material may or may not affect the catalytic performance of the composition. By unsupported catalyst, it is meant that the catalytic material itself imparts structural integrity to the composition. Unsupported catalysts are also referred to as being self-supporting. Catalyst compositions may include only one catalytic material or may include multiple different catalytic materials. Supported catalyst compositions may include only one type of support material or may include multiple different types of support materials. In addition to catalytic material, and optionally support material, catalyst compositions may also optionally include one or more than one additive, such as one or more than one promoter.

The catalysts may be of any composition. For example, the nanoparticulates could include an electrocatalyst material, some non-limiting examples of which include perovskite phase metal oxides (such as for example $La_{1-x}Sr_xFe_{0.6}Co_{0.4}O_3$ or $La_{1-x}Ca_xCoO_3$); and oxygen deficient Co—Ni—O spinels of the form $AB_2O_4$ where A is selected from divalent metals such as Mg, Ca, Sr, Ba, Fe, Ru, Co, Ni, Cu, Pd, Pt, Eu, Sm, Sn, Zn, Cd, Hg or combinations thereof and B is selected from trivalent metals such as Co, Mn, Re, Al, Ga, In, Fe, Ru, Os, Cr, Mo, W, Y, Sc, lanthanide metals and combinations thereof. Other examples include catalyst materials for water-gas shift reactions, auto-thermal reforming, steam reforming and hydrodesulfurization processes, some non-limiting specific compositional examples of which are shown in Table 2. Table 2 lists both supported and unsupported (self-supporting) catalyst materials. In the compositions of Table 2, γ-alumina (γ-$Al_2O_3$), magnesia (MgO), silica ($SiO_2$) and ceria ($CeO_2$) function as support materials. In Table 2, the first column identifies the general catalyst formulation(s), the second column identifies a catalytic application in which a catalyst of that formulation might be used, the third column provides some examples of specific catalyst compositions, the fourth column summarizes exemplary reaction temperatures during use of the catalyst in the identified catalytic application, and the fifth column notes general variations in catalyst manufacture conditions (e.g., during the forming particles 104 step of FIG. 1), to effect changes in the properties of the resulting catalyst composition.

TABLE 2

Exemplary Catalyst Compositions For Nanoparticulates

| Catalyst Formulations | Catalytic Reaction | Composition | Representative Catalytic Reaction Temperatures | Variations in Catalyst Synthesis |
|---|---|---|---|---|
| AuNi/γ-alumina AuNi/MgO AuNi/$SiO_2$ | SR/HT WGSR | A) 10 wt. % Ni 0.2 wt. % Au B) 15 wt. % Ni, 0.3 wt. % Au | 650° C.-700° C. | Time, temperature of synthesis to vary dispersion and alloy stoichiometry |
| Ru/γ-alumina | SR/HT WGSR | 0.1-0.3 wt. % Ru | 650° C.-700° C. | Time, temperature of synthesis to vary dispersion |
| Ni/$CeO_2$/ γ-alumina | ATR | 5-15 wt. % Ni | 650° C.-750° C. | Time, temperature of synthesis to vary dispersion |
| NiRu/$CeO_2$/ γ-alumina (or other oxide ion conducting support) | ATR | A) 10 wt. % Ni 0.3 wt. % Ru B) 15 wt. % Ni, 0.5 wt. % Ru | 650° C.-750° C. | Time, temperature of synthesis to vary dispersion and alloy stoichiometry |
| Pt/$CeO_2$/ γ-alumina | LT WGSR | 0.1-0.3 wt. % Pt | 200° C.-300° C. | Time, temperature of synthesis to vary dispersion |
| PtRu/$CeO_2$/ γ-alumina | LT WGSR | 0.1-0.3 wt. % PtRu Pt:Ru = 50:50 | 200° C.-300° C. | Time, temperature of synthesis to vary dispersion and alloy stoichiometry |
| NiMo/γ-alumina | HDS | 15.0 wt. % $MoO_3$ 3.0 wt. % NiO | 400° C. | Time, temperature of synthesis to vary dispersion and alloy stoichiometry |
| NiMo high surface area self-supporting oxide | HDS | 85.0 wt. % $MoO_3$ 15 wt. % NiO | 400° C. | Time, temperature of synthesis to vary PSD, porosity, surface area |
| ZnO high surface area self-supporting oxide | HDS/Sulfur removal | 100% ZnO | 400° C. | Time, temperature of synthesis to vary PSD, porosity, surface area |
| NiMo/ZnO | HDS/Sulfur removal | 3 wt. % $MoO_3$, 0.6 wt. NiO 96.4 wt. % ZnO | 400° C. | Time, temperature of synthesis to vary PSD, porosity, surface area |

WGSR = water gas shift reaction
ATR = auto-thermal reforming
SR = steam reforming
LT = low temperature
HT = high temperature
HDS = hydrodesulfurization In one implementation of the invention, the nanoparticulates comprise pigments. Table 3 lists some non-limiting examples of inorganic pigment materials and the color imparted by the material.

TABLE 3

Exemplary Pigment Materials For Nanoparticulates

| MATERIAL | FORMULA | COLOR |
|---|---|---|
| Iron Oxide (Hematite) | $Fe_2O_3$ | Red |
| Lead Molybdate | $PbMoO_4$ | Red |
| Cobalt Arsenate | $Co_3(AsO_4)_2$ | Violet |
| Iron Oxide (Magnetite) | $Fe_3O_4$ | Black |
| Iron-Chromium Oxide | $(Fe,Cr)_2O_3$ | Brown |
| Zinc Ferrite | $ZnFe_2O_4$ | Tan |
| Iron oxyhydroxide | FeOOH | Yellow |
| Lead Antimoniate | $Pb_3(SbO_4)_2$ | Yellow |
| Lead Chromate | $PbCrO_4$ | Yellow |
| Zinc Chromate | $ZnCrO_4$ | Yellow |
| Strontium Chromate | $SrCrO_4$ | Yellow |
| Nickel Titanate | $NiTiO_3$ | Yellow |
| Chrome Titanate | $CrTiO_3$ | Yellow |
| Cadmium Sulfide | CdS | Yellow |
| Chrome Oxide | $Cr_2O_3$ | Green |
| Cobalt Chromite | $CoCr_2O_4$ | Green |
| Cerium Sulfide | CeS | Red |
| Cobalt Aluminum Oxide | $CoAl_2O_4$ | Blue |
| Rutile | $TiO_2$ | White |
| Zinc Oxide | ZnO | White |
| Lead Carbonate | $PbCO_3$ | White |
| Zinc Sulfide | ZnS | White |
| Antimony Trioxide | $Sb_2O_3$ | White |
| Cobalt Stannate | $CoSnO_3$ | Blue |
| Ferrocyanide | $Fe(CN)_6$ | Blue |
| Carbon | C | Black |

In one particular implementation of the present invention, the nanoparticulates comprise a combination of pigment materials. For example, the nanoparticulates may comprise a combination of two or more of the inorganic pigments listed in Table 3 in order to create a color that cannot be created with a single inorganic pigment. As another example, the nanoparticulates may contain an inorganic pigment, such as those listed in Table 3, combined with an organic pigment. A layer of organic pigment on an inorganic pigment may also aid dispersion of the pigment nanoparticulates into a polymer, organic liquid or other organic medium.

In one particular implementation of the invention, the nanoparticulates comprise semiconductor materials. Semiconductor materials in nanoparticulate form have a variety of uses including applications in solar cells and phosphors for diagnostic applications. Some examples of types of semiconductor materials include doped and undoped: IV semiconductors, II-IV semiconductors, II-VI semiconductors, III-V semiconductors and rare earth oxides. Specific non-limiting examples of semiconductor materials that may be used in the nanoparticulates include silicon alloys, germanium alloys, PbS, PbO, HgS, ZnS, CdSe, CdTe, CdS:Mn, InP, InN, Ge, Si, $CeO_2$, $CsO_2$, $Eu_2S_3$, EuO, ZnO, GaP, and GaN.

In one particular implementation of the invention, the nanoparticulates comprise a transparent electrical conducting material. Transparent electrical conductors are useful in a variety of applications, such as for example in manufacturing displays and in photovoltaic cells. Table 4 lists some non-limiting examples of transparent conducting metal oxides that may be included in the nanoparticulates.

TABLE 4

Exemplary Transparent Electrical Conductors For Nanoparticulates

| MATERIAL | FORMULA |
|---|---|
| Zinc Oxide | ZnO |
| Indium Oxide | $In_2O_3$ |
| Tin Oxide | $SnO_2$ |
| Indium-Tin Oxide (ITO) | |
| Antimony-Tin Oxide (ATO) | |
| Cadmium-Oxide | CdO |
| Indium-Zinc Oxide | $In_2Zn_2O_5$ |

It should be understood that the materials listed above are non-limiting examples of materials that may be included in the nanoparticulates, either as a sole material phase or as one of multiple material phases in the nanoparticulates. In other embodiments, the nanoparticulates may contain materials other than those previously noted that may be useful in a desired application of the nanoparticulates. For example, in chemical mechanical polishing applications the nanoparticulates may contain one or more hard materials such as metal oxides (e.g. silica, alumina, zirconia and ceria) carbides and nitrides. For absorbent applications, the nanoparticulates may contain compounds such as zinc oxide, magnesium oxide, barium oxide, calcium oxide, copper oxide, silver oxide, barium carbonate, nickel oxide, iron oxide, zirconium oxide, manganese oxide and lithium oxide. Other non-limiting examples of applications for materials included in the nanoparticulates include: anti-abrasive, electrochromic, thermochromic, electrically conductive, electrically resistive, dielectric, moisture absorbent, cosmetic, pharmaceutical and magnetic.

One particularly useful application for use of the nanoparticulates made using the present invention is in ink and paste formulations. Nanoparticulates provide a variety of advantages over larger particulates in ink and paste formulations such as higher solid loading, better flowability, an ability to deposit smaller features and ink stability (e.g., reduced tendency for particle settling). A variety of techniques are available for depositing, patterning and/or printing inks and pastes that contain nanoparticulates made using the present invention, some non-limiting examples of which include ink jet printing, lithographic printing, flexographic printing, roll printing, intaglio, spraying, dip coating, spin coating, stenciling, stamping, liquid embossing, gravure printing and screen printing.

The advantages achieved by using nanoparticulates in inks and pastes are particularly important in printing circuit features for display and electronic applications, manufacturing membrane electrode assemblies for use in fuel cells and manufacturing of batteries. Many circuit features, or components, of displays and electronics, such as conductors, dielectrics, light emitters and resistors are deposited onto substrates (organic and inorganic) using inks and pastes, which are applied to the substrates using a variety of techniques, such as those previously listed. Typically, after an ink or paste is deposited onto a substrate, the deposited paste or ink is subjected to heat treatment to convert the ink or paste into the desired circuit component. For example, one technique for making electrically conductive lines on circuit boards is by depositing an ink containing particles of electrically conductive material (such as particles of an electrically conductive metal, e.g., gold, silver, copper, nickel, conductive alloys) onto the circuit board substrate, such as by ink-jetting, and then heat treating the deposited ink to form a solid electrically conductive line. These inks typically contain metallic particles. Because of the smaller size, using nanoparticulates in the inks will allow the deposition of thinner conducting lines on substrates, and consequently, will allow a greater number of circuit features to be deposited per unit area of substrate (e.g., electrically conductive lines can be formed with a smaller pitch, or center-to-center spacing between the lines). Similarly, use of the nanoparticulates made using the present invention in inks for display applications will allow a greater number of features to be deposited per area of substrate.

Fabrication of membrane electrode assemblies (MEAs) for use in fuel cells can also benefit from the use of inks containing the nanoparticulates made using the present invention. For example, an ink containing carbon and/or catalyst nanoparticulates can be printed on a substrate of ion exchange membrane to form an electrocatalyst layer. Catalysts used in MEAs can be very expensive (e.g., platinum catalystic metal), and the ability to fabricate MEAs using nanoparticulate-sized catalyst particles can greatly reduce the cost of manufacturing MEAs. Additionally, increased surface area that may be provided by nanoparticulates can also contribute to improved performance of the MEAs.

As previously noted, by nanoparticulates it is generally meant particles with a weight average particle size of less than 500 nm, and typically in a range of from 1 nm to 500 nm, although a particular size or size range might be more preferred for some applications. One particular advantage of the method of the present invention is the ability to make nanoparticulates with a weight average particle size of from about 500 nm to about 50 nm. Nonparticulates within this size range are difficult to make using other methods for making nanoparticulates, which other methods often tend toward production of smaller, and often much smaller, nanoparticulates.

Current methods other than that of the present invention often do not permit growth of the nanoparticulates to these larger nanoparticulate sizes. With the present invention, however, there is a significant ability to control nanoparticulate growth through use of the matrix structure. For example, smaller nanoparticulates are generally favored for production in the gas phase during the forming particles 104 (FIG. 1) through the use of smaller proportions of nanoparticulate precursors to matrix precursors in the liquid medium and shorter residence times of the gas dispersion in a thermal tone during processing. Also, because of the retention of the nanoparticulates in a dispersed state by the matrix structure, with the present invention the nanoparticulates may be subjected to additional processing steps, either during or after the forming particles 104 (FIG. 1) to promote growth of the nanoparticulates to a desired size, such as for example by thermal treatment to permit controlled agglomeration or coalescence of smaller nanoparticulate domains to form larger nanoparticulate domains of a desired size.

For many applications, it is preferred to use nanoparticulates having a weight average particle size of generally larger than about 50 nm. One reason that nanoparticulates of this size are preferred for many applications is because it is easier to handle the larger nanoparticulates than the smaller nanoparticulates that are smaller than about 50 nm. One advantage of the method of the present invention is that it is often controllable to make nanoparticulates within a desired range. In one embodiment, the nanoparticulates in the multi-phase particles manufacturable using the method of the present invention have a weight average particle size in a range having in any combination a lower limit selected from the group consisting of 50 nm, 55 nm, 60 nm, 65 nm, 70 nm and 75 nm and an upper limit selected from the group consisting of 500 nm, 450 nm, 400 nm, 350 nm, 300 nm, 250 nm and 200 nm. In one particularly preferred embodiment, the nanoparticulates have a weight average particle size of from 70 nm to 300 nm.

The method of the present invention can also be used to make smaller-size nanoparticulates, which may be preferred for some applications. In one embodiment, the nanoparticulates in the multi-phase particles manufacturable using the method of the invention have a weight average particle size in a range having in any combination a lower limit selected from the group consisting of 1 nm, 10 nm, 20 nm and 30 nm and an upper limit selected from the group consisting of 150 nm, 100 nm, 75 nm and 50 nm.

In like manner to the description above concerning manufacture of larger-size nanoparticulates, the final size and other properties of these smaller-size nanoparticulates may result directly from the forming particles by (FIG. 1) or from subsequent processing performed after the forming particles 104.

As noted previously, the matrix includes one material or a combination of two or more materials that function to maintain the nanoparticulates at least partially and preferably completely separated in a dispersed state in the particles. Examples of some general types of materials for possible inclusion in the matrix include salts, polymers, metals (including alloys and intermetallic compounds), ceramics and inorganic carbon (such as graphitic or diamond-like carbon).

In one particular implementation of the invention, the matrix comprises one or more than one salt material. Matrix salt materials are preferred, for example, for many applications when it is desired to have a matrix that is partially or wholly removable, because the salt material of the matrix can be selected to be dissolvable in a liquid medium that is not detrimental to the nanoparticulates. For water soluble salts, a convenient choice for the liquid medium is water or an aqueous solution, which may be neutral, basic or acidic depending upon the specific application and the specific matrix salt material to be dissolved. The matrix salt material may be an inorganic salt or an organic salt, with inorganic salts being generally more preferred. Table 5 lists some non-limiting examples of inorganic salts that may be used as a matrix material, along with some information concerning the inorganic salts.

TABLE 5

Exemplary Salts For Matrix

| Salt | Molecular Weight | Density (g/cc) | Melting Point (° C.) | Boiling Point (° C.) | Solubility in Cold Water (g/cc) |
|---|---|---|---|---|---|
| BaBr$_2$ | 297.16 | 4.78 | 847 | decomposes | 1.041 |
| BaCl$_2$ | 208.25 | 3.8 | 963 | 1560 | 0.375 |
| HBO$_2$ | 43.82 | 2.486 | 236 | — | very to slightly soluble |
| CaCl$_2$ | 110.99 | 2.15 | 782 | 1600 | 0.745 |
| CaI$_2$ | 293.89 | 3.956 | 784 | 1100 | 2.09 |
| CsSO$_4$ | 361.87 | 4.243 | 1010 | transition point to a hexagonal structure 600 | 1.67 |
| MgBr$_2$ | 184.13 | 3.72 | 711 | — | 1.015 |
| MgCl$_2$ | 95.22 | 2.32 | 714 | 1412 | 0.5425 |
| KBr | 119.01 | 2.75 | 734 | 1435 | 0.5348 |
| KOC(O)CH$_3$ | 98.14 | 1.57 | 292 | — | 2.53 |
| KCl | 74.56 | 1.984 | 770 | sublimes at 1500 | 0.347 |

TABLE 5-continued

Exemplary Salts For Matrix

| Salt | Molecular Weight | Density (g/cc) | Melting Point (° C.) | Boiling Point (° C.) | Solubility in Cold Water (g/cc) |
|---|---|---|---|---|---|
| $K_2MoO_4$ | 238.14 | 2.91 | 919 | d 1400 | 1.846 |
| $KNO_3$ | 101.10 | 2.109 | 334 | decomposes at 400 | 0.133 |
| $K_3PO_4$ | 212.28 | 2.564 | 1340 | — | 0.90 |
| $K_2SiO_3$ | 214.37 | — | 976 | — | soluble |
| $LiNO_3$ | 68.95 | 2.38 | 264 | decomposes at 600 | 0.898 |
| LiCl | 42.39 | 2.068 | 605 | 1325-1360 | 0.637 |
| $NaAlO_2$ | 81.97 | — | 1800 | — | soluble |
| $NaBO_2$ | 65.8 | 2.464 | 966 | 1434 | 0.26 |
| NaBr | 102.9 | 3.203 | 747 | 1390 | 1.16 |
| $NaOC(O)CH_3$ | 82.03 | 1.528 | 324 | — | 1.19 |
| NaCl | 58.44 | 2.165 | 801 | 1413 | 0.357 |
| NaF | 41.99 | 2.558 | 993 | 1695 | 0.042 |
| NaI | 149.89 | 3.7 | 661 | 1304 | 1.84 |
| $NaI \cdot 2H_2O$ | 185.92 | 2.448 | 752 | — | 3.17 |
| $Na_2SO_4$ | 142.04 | — | 884 | — | soluble |
| $Na_2S$ | 78.04 | 1.856 | 1180 | — | 0.154 |
| $NaNO_3$ | | | 307 | 380 | |
| $SrCl_2$ | 158.53 | 3.052 | 875 | 1250 | 0.538 |
| SrO | 103.62 | 4.7 | 2420 | 3000 | 0.2285 |
| $Sr(NO_3)_2$ | 211.63 | 2.986 | 570 | — | 0.709 |

In one particular implementation of the invention, the matrix comprises one or more than one polymer. It may be desirable to include a polymer material in the matrix for a variety of reasons. For example, a polymer may be selected for easy dissolution in a liquid medium to release the nanoparticulates for further processing or use. A polymer material that is soluble in an organic liquid may be selected when it is desired to disperse the nanoparticulates in the organic liquid during subsequent processing or use. As another example, a polymer may be selected as a permanent matrix material for use in some application. When used as a permanent matrix, the polymer of the matrix may simply provide a structure to retain the nanoparticulate in a desired dispersion without interfering with proper functioning of the nanoparticulates in the application. Alternatively, the polymer may itself also provide some function for the application. The polymer may, for example, have a function that is different than that of the nanoparticulates, have a function that compliments that of the nanoparticulates, or have a function that is the same as that of the nanoparticulates. Examples of some specific combinations of materials for the nanoparticulates and polymer materials for the matrix materials and their applications are described in more detail below. As yet another example, the polymer may be selected for its surface modifying properties to beneficially surface modify the nanoparticulates in a way that is useful in some subsequent processing or use of the nanoparticulates. The invention is not limited to use of any particular polymers in the matrix. Some non-limiting examples of polymers that may be used in the matrix include: fluorinated polymers, thermal curable polymers, UV curable polymers, appended polymers, light emitting polymers, semiconducting polymers, electrically conductive polymers (e.g. polythiophenes, poly (ethylene dioxy thiophene), hydrophobic polymers (siloxanes, polyacrylonitrile, polymethylmethacrylate, polyethyleneterephthalate), hydrophilic polymers (polythiophenes, sulfonated polymers, polymers with ionic functional groups), polyaniline & modified versions, poly pyrroles & modified versions, poly pyridines & modified versions, polycarbonates, polyesters, polyvinylpyrrolidone, polyethylene, epoxies, polytetrafluoroethylene, Kevlar® and Teflon®. The polymers included in the matrix may have any structure, some non-limiting examples of polymeric structures include: dendrimers, long single chain polymers, copolymers (random or block, e.g. A-B, A-B-A, A-B-C, etc.) branched polymers and grafted polymers.

With reference again to FIG. 1, some specific non-limiting examples will now be presented for the precursor medium that may be processed to form the droplets of the gas dispersion during the generating aerosol 102. As noted previously, the precursor medium processed during the generating gas dispersion 102 contains a liquid vehicle. The liquid vehicle may be any liquid that is convenient and compatible for processing precursor(s) and reagent(s) that are to be included in the precursor medium to make the desired particles during the forming particles 104. The liquid vehicle may be comprised of only a single liquid component, or may be a mixture of two or more liquid components, which may or may not be mutually soluble in the proportions of the mixture. The use of a mixture of liquid components is useful, for example, when the precursor medium includes multiple precursors, with one precursor having a higher solubility in one liquid component and the other precursor having a higher solubility in another liquid component. As one example, a first precursor may be more soluble in a first liquid component of the liquid vehicle and a second precursor may be more soluble in a second liquid component of the liquid vehicle, but the two components of the liquid vehicle may be mutually soluble so that the liquid vehicle has only a single liquid phase of the first liquid component, the second liquid component and the two dissolved precursors. Alternatively, the liquid vehicle may have two liquid components that are not mutually soluble, so that the liquid vehicle has two, or more, liquid phases (i.e., an emulsion) with one precursor dissolved in one liquid phase, for example a continuous phase, and a second precursor dissolved in a second liquid phase, for example a dispersed phase of an emulsion.

In some cases, the liquid vehicle may be selected to act as a solvent for one or more than one precursor to be included in the precursor medium, so that in the precursor medium all or a portion of the one or more than one precursor will be dissolved in the precursor medium. In other cases, the liquid vehicle will be selected based on its volatility. For example, a liquid vehicle with a high vapor pressure may be selected so that the liquid vehicle is easily vaporized and removed from the droplets to the gas phase of the gas dispersion during the forming particles 104. In other cases, the liquid vehicle may be selected for its hydrodynamic properties, such as viscosity characteristics of the liquid vehicle. For example, if one or more than one precursor is to be included in the precursor medium in the form of dispersed particulates (such as for example colloidal-size particles dispersed in the liquid vehicle), a liquid vehicle having a relatively high viscosity may be selected to inhibit settling of the precursor particles. As another example, a liquid vehicle with a relatively low viscosity may be selected when it is desired to produce smaller droplets of precursor medium during the generating gas dispersion 102. In still other cases, the liquid vehicle may be selected to reduce or minimize contamination of the particles and/or production of undesirable byproducts during the generating gas dispersion 102 or the forming particles 104, especially when using organic components in the liquid vehicle. As one example, an important embodiment is to use a liquid vehicle that provides fuel for generating heat in a flame reactor. In this example, components of liquid vehicle may be chosen so as to reduce or minimize generation of undesirable byproducts from combustion of liquid vehicle components. Examples of some types of liquids that may be used as or included in a liquid vehicle to provide fuel for a flame reactor include: alcohols, hydrocarbons, acrylates, acrylic acid, carboxylates, carboxylic acid, aldehydes, ketones, and kerosene. In some situations, it may be preferred to select more oxygen-rich liquids (e.g., alcohols, aldehydes, ketones, acids) to reduce the potential for carbon contamination of particles.

The liquid vehicle may be an aqueous liquid, an organic liquid or a combination of aqueous and organic liquids. Aqueous liquids are generally preferred for use as the liquid vehicle in most situations, because of their low cost, relative safety and ease of use. For example, water has the advantage of being non-flammable, and when vaporized during the forming particles 104 does not tend to contribute to formation of byproducts that are likely to complicate processing or contaminate particles. Moreover, aqueous liquids are good solvents for a large number of precursor materials, although attaining a desired level of solubility for some materials may involve modification of the aqueous liquid, such as pH adjustment.

In some situations, however, organic liquids are preferred for the liquid vehicle. This might be the case, for example, when it is desired to dissolve a precursor into the liquid vehicle in situations when the precursor is not adequately soluble in aqueous liquids, or when aqueous liquids are otherwise detrimental to the precursor. For example, an organic liquid vehicle might be necessary to solubilize a number of organic or organometallic precursor materials. Also, as noted above, an organic liquid vehicle might be desirable to provide fuel when a flame reactor is used during the forming particles 104.

In addition to the liquid vehicle, the precursor medium also comprises at least one and often two or more precursors. As noted previously, a precursor is a material that provides at least one component for inclusion in the particles made during the forming particles 104. During the forming particles 104, a precursor may undergo reaction to provide the component for the particles, (e.g., thermally decompose at elevated temperature). Alternatively, a precursor may be processed to provide the component of the particles without reaction, in which case the component provided by the precursor is the precursor material itself. For example, a precursor could process without reaction where the precursor is initially dissolved in the liquid vehicle and a precipitate of the precursor is included in the particles made during the forming particles 104. This might be the case, for example, when the precursor medium initially contains a salt or a polymer dissolved in the liquid medium, which salt or polymer precipitates out to form all or part of the matrix when the liquid vehicle is vaporized during the forming particles 104. As another example, the precursor could volatilize during the forming particles 104 and then condense to form part of the particles made during the forming particles 104. One particular implementation of this example is the use of a salt precursor for the matrix that vaporizes and then condenses onto nanoparticulates after formation of the nanoparticulates. In another particular implementation of this example, precursors for both the nanoparticulate and the matrix could volatilize, react if necessary, and then condense to form materials for inclusion in the multi-phase particles.

Another example of a precursor that may be processed without reaction is a solid material suspended in a liquid vehicle. For example, a precursor could be in the form of colloidal-size particles in the precursor medium, which colloidal particles become part of the multi-phase particles made during the forming particles 104. This might be the case, for example, when the precursor medium contains colloidal silica or colloidal carbon, which colloidal particles then form all or part of the matrix, with or without fusing together of the colloidal particles. Additionally, if useful for subsequent processing or for use in a final application, the colloidal particles in the precursor medium could be surface modified or functionalized. By functionalized, it is meant that chemical functional groups have been attached to the surface of the colloidal particles to provide some specific chemical functionality. Such chemical functionality may be designed to aid in the processing of the precursor to form the particles during the forming particles 104, to aid subsequent processing of particles made during the forming particles, or for some purpose related to the application for which the particles are made during the forming particles 104. Also, particulate precursors may be in a form other than colloidal particles, such as for example in the form of fibers, nanotubes or flakes. As another example, such particulate precursors could be porous particles contained in the precursor medium, which porous particles provide the matrix structure on which the nanoparticulates form during the forming particles 104. Some non-limiting examples of material that may be useful in solid particulate precursor form are porous ceramic materials (such as for example, porous silica, alumina, magnesia), porous carbon, carbon nanotubes and fullerines (e.g., bucky balls)).

In many preferred implementations of the invention, at least one precursor in the liquid medium reacts during the forming particles 104 to provide a component for inclusion in the resulting multi-phase particles. Table 6 shows some non-limiting examples of some compounds that may be used as precursors, and that would normally undergo reaction during the forming particles 104. The target material for which a listed precursor material provides a component is also listed in Table 6, which materials could be included in either the nanoparticulates or the matrix.

TABLE 6

Exemplary Reactive Precursor Materials

| TARGET MATERIAL | EXAMPLES OF PRECURSORS |
|---|---|
| Platinum | Platinum hydroxide, chloroplatinic acid ($H_2PtCl_6 \cdot xH_2O$); tetraamineplatinum (II) nitrate ($Pt(NH_3)_4(NO_3)_2$); hydroxoplatinic acid ($H_2Pt(OH)_6$); platinum nitrates; platinum amine nitrates; platinum diamine nitrates (e.g. $Pt(NH_3)_4(NO_3)_2$); platinum tetrachloride ($PtCl_4$); sodium hexahydroxyplatinum ($Na_2Pt(OH)_6$); potassium hexahydroxyplatinum ($K_2Pt(OH)_6$) and $Na_2PtCl_4$ |
| Palladium | palladium (II) chloride ($PdCl_2$); palladium (II) nitrate ($Pd(NO_3)_2$); $H_2PdCl_4$; $Na_2PdCl_4$; $Pd(NH_3)_4Cl_2$; $Pd(NH_3)_2(OH)_2$ and palladium carboxylates |

TABLE 6-continued

Exemplary Reactive Precursor Materials

| TARGET MATERIAL | EXAMPLES OF PRECURSORS |
|---|---|
| Ruthenium | ruthenium β-diketonates; ruthenium nitrosyl nitrate (Ru(NO)(NO$_3$)$_3$); potassium perruthenate (K$_3$RuO$_4$); sodium perruthenate (Na$_3$RuO$_4$); (NH$_4$)$_3$Ru$_2$O$_7$; NH$_4$Ru$_2$O$_7$; Ru$_3$(CO)$_{12}$ and ruthenium chloride (RuCl$_3$) |
| Gold | gold chloride (AuCl$_3$) and ammonium tetrachloroaurate ((NH$_4$)AuCl$_4$) |
| Copper | copper carboxylates; copper acetate(Cu(OOCH$_3$)$_2$); copper chloride (CuCl$_2$); copper nitrate (Cu(NO$_3$)$_2$), and copper perchlorate (Cu(ClO$_4$)$_2$) |
| Rhodium | rhodium chloride hydrate (RhCl$_3$•$x$H$_2$O); ammonium hexachlororhodium hydrate ((NH$_4$)3RhCl6•$x$H$_2$O) and rhodium nitrate (Rh(NO$_3$)$_3$) |
| Titanium | titanium (III) chloride (TiCl$_3$); titanium (IV) chloride (TiCl$_4$) and tetrachlorodianimmo titanium (TiCl$_4$(NH$_3$)$_2$) |
| Vanadium | vanadium (III) chloride (VCl$_3$); vanadium (IV) chloride (VCl$_4$); vanadium fluoride (VF$_4$) and ammonium vanadium oxide (NH$_4$VO$_3$) |
| Manganese | manganese (II) acetate hydrate (MN(OOCCH$_3$)$_2$•$x$H$_2$O); manganese (III) acetate hydrate (Mn(OOCCH$_3$)$_2$•$x$H$_2$O); manganese chloride hydrate (MnCl$_2$•$x$H$_2$O); manganese nitrate (Mn(NO$_3$)$_2$) and potassium permangate (KMNO$_4$) |
| Iron | iron acetate (Fe(OOCCH$_3$)$_2$); iron chloride hydrate (FeCl$_2$•$x$H$_2$O); iron chloride hydrate (FeCl$_3$•$x$H$_2$O); iron nitrate hydrate (Fe(NO$_3$)$_3$•$x$H$_2$O); iron (II) perchlorate hydrate (Fe(ClO$_4$)$_2$•$x$H$_2$O) and iron (III) perchlorate hydrate (Fe(ClO$_4$)$_3$•$x$H$_2$O) |
| Cobalt | cobalt acetate hydrate (Co(OOCCH$_3$)$_2$•$x$H$_2$O); cobalt chloride hydrate (CoCl$_2$•$x$H$_2$O) and cobalt nitrate hydrate (Co(NO$_3$) $x$H$_2$O) |
| Tungsten | tungsten oxychloride (WOCl$_4$) and ammonium tungsten oxide ((NH4)$_{10}$W$_{12}$O$_{41}$) |
| Zinc | zinc acetate (Zn(OOCCH$_3$)$_2$•$x$H$_2$O); zinc chloride (ZnCl$_2$); zinc formate (Zn(OOCH)$_2$) and zinc nitrate hydrate (Zn(NO$_3$)$_2$•$x$H$_2$O). |
| Zirconium | zirconium chloride (ZrCl$_4$); zirconium hydride (ZrH$_2$) and zirconium dinitrate oxide (ZrO(NO$_3$)$_2$•$x$H$_2$O) |
| Niobium | niobium chloride (NbCl$_5$) and niobium hydride (NbH) |
| Molybdenum | molybdenum chloride; molybdenum hexacarbonyl (Mo(CO)$_6$); ammonium paramolybdate ((NH$_4$)Mo$_7$O$_{24}$•$x$H$_2$O); ammonium molybdate ((NH$_4$)$_2$Mo$_2$O$_7$) and molybdenum acetate dimer (Mo[(OCOCH$_3$)$_2$]$_2$) |
| Tin | SnCl$_4$A$x$H$_2$O |
| Osmium | OsCl$_3$ |
| Silver | complex silver salts ([Ag(RNH$_2$)$_2$]$^+$, Ag(R$_2$NH)$_2$]$^+$, [Ag(R$_3$N)$_2$]$^+$ where R = aliphatic or aromatic; [Ag(L)$_x$]$^+$ where L = ziridine, pyrrol, indol, piperidine, pyridine, aliphatic substituted and amino substituted pyridines, imidazole, pyrimidine, piperazine, triazoles, etc.; [Ag(L)$_x$]$^+$ where L = ethanolamine, glycine, gormamides, acetamides or acetonitrile); Silver nitrate (AgNO$_3$); Silver nitrite (AgNO$_2$); Silver oxide (Ag$_2$O, AgO); Silver carbonate (Ag$_2$CO$_3$); Silver oxalate (Ag$_2$C$_2$O$_4$); Silver trispyrazolylborate (Ag[(N$_2$C$_3$H$_3$)$_3$]BH); Silver tris(dimethylpyrazolyl)borate (Ag[((CH$_3$)$_2$N$_2$C$_3$H$_3$)$_3$]BH); Silver azide (AgN$_3$); Silver tetrafluoroborate (AgBF$_4$); Silver acetate (AgO$_2$CCH$_3$); Silver propionate (AgO$_2$CC$_2$H$_5$); Silver butanoate (AgO$_2$CC$_3$H$_7$); Silver ethylbutyrate (AgO$_2$CCH(C$_2$H$_5$)C$_2$H$_5$); Silver pivalate (AgO$_2$CC(CH$_3$)$_3$); Silver cyclohexanebutyrate (AgO$_2$C(CH$_2$)$_3$C$_6$H$_{11}$); Silver ethylhexanoate (AgO$_2$CCH(C$_2$H$_5$)C$_4$H$_9$); Silver neodecanoate (AgO$_2$CC$_9$H$_{19}$); Silver trifluoroacetate (AgO$_2$CCF$_3$); Silver pentafluoropropionate (AgO$_2$CC$_2$F$_5$); Silver heptafluorobutyrate (AgO$_2$CC$_3$F$_7$); Silver trichloroacetate (AgO$_2$CCCl$_3$); Silver 6,6,7,7,8,8,8-heptafluoro-2,2-dimethyl-3,5-octanedionate (AgFOD); Silver lactate (AgO$_2$CH(OH)CH$_3$); Silver citrate (Ag$_3$C$_6$H$_5$O$_7$); Silver glycolate (AgOOCCH(OH)CH$_3$); Silver benzoate (AgO$_2$CCH$_2$C$_6$H$_5$); Silver phenylacetate (AgOOCCH$_2$C$_6$H$_5$); Silver nitrophenylacetates (AgOOCCH$_2$C$_6$H$_4$NO$_2$); Silver dinitrophenylacetate (AgOOCCH$_2$C$_6$H$_3$(NO$_2$)$_2$); Silver difluorophenylacetate (AgOOCCH$_2$C$_6$H$_3$F$_2$); Silver 2-fluoro-5-nitrobenzoate (AgOOCC$_6$H$_3$(NO$_2$)F); Silver acetylacetonate (Ag[CH$_3$COCH=C(O—)CH$_3$]); Silver hexafluoroacetylacetonate (Ag[CF$_3$COCH=C(O—)CF$_3$]); Silver trifluoroacetylacetonate (Ag[CH$_3$COCH=C(O—)CF$_3$]); Silver tosylate (AgO$_3$SC$_6$H$_4$CH$_3$); Silver triflate (AgO$_3$SCF$_3$); Silver sterate; Silver oleate; Silver dodecanoate |

TABLE 6-continued

Exemplary Reactive Precursor Materials

| TARGET MATERIAL | EXAMPLES OF PRECURSORS |
|---|---|
| Nickel | Ni-nitrate ($Ni(NO_3)_2$); Ni-sulfate ($NiSO_4$); Nickel ammine complexes ($[Ni(NH_3)_6]^{n+}$ (n = 2,3)); Ni-tetrafluoroborate ($Ni(BF_4)_2$); Ni-oxalate; Ni-isopropoxide ($Ni(OC_3H_7)_2$); Ni-methoxyethoxide ($Ni(OCH_2CH_2OCH_3)_2$); Ni-acetylacetonate ($[Ni(acac)_2]_3$ or $Ni(acac)_2(H_2O)_2$); Ni-hexafluoroacetylacetonate ($Ni[CF_3COCH\!=\!C(O\!-\!)CF_3]_2$); Ni-formate ($Ni(O_2CH)_2$); Ni-acetate ($Ni(O_2CCH_3)_2$); Ni-octanoate ($Ni(O_2CC_7H_{15})_2$); Ni-ethylhexanoate ($Ni(O_2CCH(C_2H_5)C_4H_9)_2$); Ni-trifluoroacetate ($Ni(OOCCF_3)_2$) |
| Chrome Oxide | $K_2Cr_2O_7$; chrome carboxylates; and chromium oxalate |
| Manganese Oxide | $KMnO_4$; manganese nitrate; manganese acetate; manganese carboxylates; manganese alkoxides; and $MnO_2$ |
| Tungsten Oxide | $Na_2WO_4$ and $W_2O_3$ |
| Molybdenum Oxide | $K_2MoO_4$ and $MoO_2$ |
| Cobalt Oxide | cobalt-amine complexes; cobalt carboxylates and cobalt oxides |
| Nickel Oxide | nickel-amine complexes; nickel carboxylates and nickel oxides |
| Copper Oxide | copper-amine complexes; copper carboxylates and copper oxides |
| Iron Oxide | iron nitrate |
| Carbon | carboxylic acid; benzoic acid; polycarboxylic acids (e.g., terephthalic, isophthalic, trimesic and trimellitic acids); polynuclear carboxylic acids (e.g., napthoic acid) and polynuclear polycarboxylic acids |

Because of their lower cost, some preferred precursors from Table 6, include nitrates, acetates and chlorides. Not listed in Table 6 are precursors for phosphor materials, which include nitrates, hydroxides and carboxylates of yttrium, gallium, barium, calcium, strontium, germanium, gadolinium, europium, terbium, cerium, chromium, aluminum, indium, magnesium, praseodymium, erbium, thulium, praisadinium, manganese, silver, copper, zinc, sodium and dysprosium. Boric acid may be used with precursors for phosphors as a coreactant and/or a fluxing agent.

The precursor medium may also contain various reagent additives, in addition to the liquid vehicle and precursor(s). As used herein, a "reagent additive" or a "reagent" in the precursor medium is a material, other than the liquid vehicle, that is included in the precursor medium for a reason other than to provide a component for inclusion in the particles made during the forming particles 104. Rather, the reagent additive serves another purpose that is beneficial to formulation of the precursor medium or aids processing to make the particles during the forming particles 104. An example of a reagent additive would be, for example, a base or acid material added to adjust solution pH of the liquid vehicle.

One important example of a reagent additive for some implementations of the invention is a reducing agent. The reducing agent may be in the form of a particulate suspended in the liquid vehicle or, more likely, will be dissolved in the liquid vehicle. The purpose of the reducing agent is to assist creation of an environment during the forming particles 104 that promotes formation of a material in a chemically reduced form that is desired for inclusion in the particles made during the forming particles 104. This might be the case, for example when the desired material is a metal, and the reducing agent is included to promote reduction of a metal oxide to the desired metallic form. A reducing agent does not necessarily reduce an oxidized material to form a desired reduced form of the material, but may simply change the chemistry of the precursor medium to favor the formation of the reduced form of the material, such as by scavenging or otherwise tying up oxidizing materials present in the environment. In some implementations, the reduced form of the material could be made without the use of the reducing agent by processing the gas dispersion at a higher temperature during the forming particles 104, but use of the reducing agent permits the desired reduced form of the material to be made at a lower temperature. An important application is when making particles that include metallic nanoparticulates and matrix including a material that cannot be effectively processed at high temperatures that may be required to prepare the metallic nanoparticles absent the use of a reducing agent. For example, use of a reducing agent may permit the processing temperature to be maintained below the melting temperature of a salt matrix material, or below the decomposition temperature of a polymer matrix material, whereas the processing temperature would exceed those limits without use of the reducing agent. As an alternative to including a reducing agent in the precursor medium, a reducing agent could instead be included in the gas phase of the gas dispersion, such as for example using a nitrogen gas phase or other oxygen-free gas composition with addition of some hydrogen gas as a reducing agent. In other situations, the reduced form of the material could be formed even at the desired lower temperature using a nonoxidizing gas phase in the gas dispersion, such as pure nitrogen gas or some other oxygen-free gas composition. However, by including a reducing agent in the precursor medium, the use of a nonoxidizing gas phase or a reducing agent in the gas phase may often be avoided, and air may instead be used as the gas phase. This is desirable because it is usually much easier and less expensive to generate and process the gas dispersion using air. The reducing agent is typically a material that either reacts to bind oxygen, or that produces decomposition products that bind with oxygen. The bound oxygen often exits in the gas phase in the form of one or more components such as water vapor, carbon dioxide, carbon monoxide, nitrogen oxides and sulfur oxides. Reducing agents included in the precursor medium are often carbon-containing materials, with carbon from the reducing agents reacting with oxygen to form carbon dioxide and/or carbon monoxide. The reducing agent may also contain hydrogen that reacts with oxygen to form water.

Table 7 shows some non-limiting examples of reducing agents that may be included in the precursor medium, typically dissolved in the liquid vehicle.

TABLE 7

Exemplary Reducing Agents

| MATERIALS | SPECIFIC EXAMPLES |
|---|---|
| Amines | Triethyl amine; Amino propanol |
| Boranes | Borane-tetrahydrofuran |
| Borane adducts | Trimethylamineborane |
| Borohydrides | Sodium borohydride, lithium borohydride |
| Hydrides | Tin hydride, lithium hydride, lithium aluminum hydride |
| Alcohols | Methanol, ethanol, isopropanol, terpineol, t-butanol, ethylene glycols, citrates |
| Silanes | Dichlorosilane |
| Carboxylic acid | Formic acid |
| Aldehyde | Formaldehyde; octanal, decanal, dodecanal |
| Hydrazines | Hydrazine, hydrazine sulfate |
| Phosphorous compounds | Hypophosphoric Acid |

Table 8 shows non-limiting examples of some preferred combinations of reducing agents and precursors that may be included in the precursor medium for manufacture of a variety of metal nanoparticulate materials.

TABLE 8

Exemplary Precursor/Reducing Agent Combinations

| PRECURSOR | REDUCING AGENT |
|---|---|
| Most Metal Nitrates | Amines (e.g. triethylamine), ethylene glycols, alcohols (terpineol), aminopropanol |
| Copper Nitrate | Long chain alcohols; citrates, carboxylates |
| Most Metal Carboxylates | Amines (e.g. triethylamine), ethylene glycols, alcohols (terpineol), aminopropanol |

Another important reagent addition that may be included in the precursor medium in some implementations of the invention is an oxidizing agent. The purpose of an oxidizing agent is to help create an environment during the forming particles 104 that is conducive to making a desired oxidized form of a material for inclusion in particles made during the forming particles. The oxidizing agent may provide oxygen in addition to the oxygen that might be present when air is used as the gas phase to make the gas dispersion. Alternatively, the oxidizing agent may be used in combination with a nonoxidizing carrier gas, such as pure nitrogen gas, to provide a controlled amount of oxygen to form the desired oxidized form of the material. One application for such control of the oxidation is when making one oxide of a metal that may form into multiple different oxide forms. For example, a controlled amount of oxygen may be used during the manufacture of magnetite to inhibit formation of the more oxidized iron oxide form of hematite.

Table 9 shows non-limiting examples of some oxidizing agents that may be included in the precursor medium, typically dissolved in the liquid vehicle, such as to assist in the making of oxide materials.

TABLE 9

Oxidizing Agents

| TYPES | EXAMPLES | CHEMICAL FORMULA |
|---|---|---|
| Amine Oxides | Trimethylamine-N-Oxide | $Me_3NO$ |
| Mineral Acids | nitric acid, sulfuric acid, aqua regia | |
| Organic Acids | carboxylic acids | |
| Peroxides | hydrogen peroxide | HOOH |
| Phosphine Oxides | | |
| Ozone | | $O_3$ |
| Sulfur Oxides | | |
| Ammonia in combination with Oxygen | | $NH_3$ & $O_2$ |

Another reagent addition that may be included in a precursor medium in some situations is a fluxing agent to assist crystal growth or recrystallization of material in the particles made during the forming particles 104. Any of the salts listed in Table 6 may be included in the precursor medium as fluxing agents. A particularly preferred fluxing agent for particles containing phosphor materials is lithium nitrate.

The relative quantities of precursors, liquid vehicle and reagents in the precursor medium will vary, such as for example depending upon the desired composition and morphology of the particles to be produced during the forming particles 104 and the particular feed materials used to prepare the gas dispersion during the generating gas dispersion 102. In most situations, however, the liquid vehicle will be present in the precursor medium in the largest proportion, with the precursor medium typically comprising at least 50 weight percent of the liquid vehicle and often at least 70 weight percent of the precursor medium. The precursor medium comprises at least one precursor to a material for inclusion in the particles made during the forming particles 104, such as material that forms all or part of the nanoparticulates or a material that forms all or part of the matrix. As generated during the generating gas dispersion 102, the gas phase of the gas dispersion may also comprise one or more than one precursor. For example, when making oxide materials, air is often used as the carrier gas to generate the gas dispersion, and the oxygen component of the air is often used as a precursor to provide at least a portion of the oxygen component of the oxide material. The precursor medium will typically comprise, in solution and/or as particulate precursor, no more than about 50 weight percent precursor(s), and preferably no more than about 25 weight percent precursor(s). In most situations, however, the precursor medium will comprise at least 5 weight percent precursor(s). When the precursor medium comprises particulate precursor(s), the precursor medium will typically comprise no more than 20 weight percent of such particulate precursor(s). Moreover, such particulate precursors will typically be of colloidal size, preferably having a weight average size of no larger than about 100 nm and more preferably having a weight average size of no larger than about 50 nm. When the precursor medium comprises dissolved precursors, the precursor medium will typically comprise no more than 25 weight percent of such dissolved precursor(s).

In one preferred embodiment, the precursor medium includes at least two precursors, and even more preferably at least one precursor for a material to be included in the nanoparticulates and at least one other precursor for a material to be included in the matrix. The precursors should be included in the precursor medium in relative proportions to provide the proper relative proportions of the nanoparticulate material and the matrix material in the particles made during the forming particle. The amount of a precursor included in the precursor medium will be selected to provide the desired amount of the final material in the particles. For example, if the multi-phase particles resulting from the forming particle are to contain certain weight percentages respectively of a nanoparticulate material and a matrix material, then the relative quantities of nanoparticulate precursor and matrix precursor must be properly proportioned in the precursor medium to provide the proper weight fractions, taking into account any reactions that are involved in converting the nanoparticulate and matrix precursors into the respective nanoparticulate and matrix materials in the resulting multi-phase particles. In that regard, the particles made during the forming particles 104 will often comprise from 1 weight percent to 80 weight percent nanoparticulates and from 99 weight percent to 20 weight percent matrix.

It should be appreciated, however, that even though the relation proportions of the matrix and nanoparticulate portions of the resulting multi-phase particles may be expressed as weight percentages (or weight fractions), it is the volume percentage (or volume fraction) of these components that is typically more important from a particle engineering standpoint. Weight percentages are often more convenient to use for calculated purposes to determine the relative quantities of precursors to include in the precursor medium. For example, when a nanoparticulate material is significantly more dense than a matrix material (which is frequently the case), then a multi-phase particle may contain a large weight fraction of the nanoparticulate material, but only a small volume fraction of the nanoparticulate material. In most implementations of the invention, the multi-phase particles will comprise a volume percentage of nanoparticulates within a range having in any combination a lower limit selected from the group consisting of 1 volume percent, 5 volume percent and 10 volume percent and an upper limit selected from the group consisting of 60 volume percent, 50 volume percent, 40 volume percent, 30 volume percent and 25 volume percent. One particularly preferred implementation is for the nanoparticulates to comprise up to 30 volume percent and more preferably up to 25 volume percent of the multi-phase particles, but preferably also with at least 5 volume percent and more preferably at least 10 volume percent nanoparticulates. These lower volume fractions tend to favor formation of well dispersed and more completely separated nanoparticulate domains in the multi-phase particles. As the volume percentage of nanoparticulates increases, the separation of the nanoparticulate domains tends to be less complete. For example, with greater than about 50 volume percent of nanoparticulates in the multi-phase particles, an interconnected network of the nanoparticulates may often be favored, such as is described below with respect to FIG. 16.

Correspondingly, in most implementations of the invention the multi-phase particles will comprise a volume percentage of matrix in a range having an upper limit selected from the group consisting of 99 volume percent, 95 volume percent and 90 volume percent and having a lower limit selected from the group consisting of 40 volume percent, 50 volume percent, 60 volume percent, 70 volume percent and 75 volume percent. One particularly preferred implementation is for the matrix to comprise at least 70 volume percent and more preferably at least 75 volume percent of the multi-phase particles, but also preferably with no greater than 95 volume percent and even more preferably no greater than 90 volume percent of matrix. In this discussion concerning volume percent, the pore volume in the multi-phase particles are ignored, so that the volumes of the matrix and nanoparticulates are included in determining the total volume of the multi-phase particles used to determine the volume percentages of the nanoparticulates and the matrix. On this basis, the sum of the volume fractions of the nanoparticulates and the matrix add up to 100. It should be appreciated, however, that in some instances the multi-phase particles resulting from the particle forming 104 (FIG. 1) may contain significant porosity.

As will be appreciated, in some implementations of the invention, the precursor medium may comprise more than one precursor for one or for each of the nanoparticulates and the matrix. The relative proportions of the nanoparticulate precursor(s) and matrix precursor(s) in the precursor medium will, therefore, vary depending upon the relative proportions of nanoparticulate material(s) and matrix material(s) in the final particles and also on the nature of the particular precursors to those materials that are included in the precursor medium.

The precursor medium should also have properties that are conducive to efficient formation of the desired droplets of the precursor medium during the generating gas dispersion 102. The desired properties of the precursor medium for droplet generation may vary depending upon the specific composition of the precursor medium and the specific apparatus used to generate droplets for the gas dispersion. Some properties that may be important to droplet generation include the viscosity and surface tension properties of the liquid vehicle, the proportion of liquid vehicle and solids, when present, in the precursor medium, and the viscosity, flowability and density of the precursor medium. Some properties, such as viscosity and flowability of the precursor medium, may be affected by the temperature of the precursor medium. Accordingly, if it is desired to reduce the viscosity of the precursor medium to achieve more effective droplet generation, the precursor medium may be preheated to an elevated temperature at which the precursor medium has a reduced viscosity. Alternatively, if a higher viscosity is desired, the precursor medium could be pre-cooled to an appropriate depressed temperature at which the precursor medium has an increased viscosity. Typically, when the droplets are generated, the precursor medium will have a viscosity of less than 1000 centipoise and usually less than 100 centipoise. If the precursor medium contains a particulate precursor, the precursor medium should be sufficiently viscous enough to avoid significant settling of particles in the precursor medium during processing.

As noted previously, the generating gas dispersion 102 includes generating droplets of the precursor medium and dispersing and suspending those droplets in a carrier gas to form the gas dispersion. The droplets may be generated using any appropriate apparatus for finely dividing liquids to produce droplets. Apparatus for generating such droplets are referred to by a variety of names, including liquid atomizers, mist generators, nebulizers and aerosol generators. The technique and apparatus used to generate the gas dispersion may vary depending upon the application.

One example of an apparatus for generating the droplets and mixing the droplets with the carrier gas to form the gas dispersion is an ultrasonic aerosol generator, in which ultrasonic energy is used to form or assist formation of the droplets. One type of ultrasonic aerosol generator is a nozzle-type apparatus, with the nozzle ultrasonically energizable to aid formation of droplets of a fine size and narrow size distribution. Another example of an ultrasonic aerosol generator ultrasonically energizes a reservoir of precursor medium, causing atomization cones to develop, from which droplets of the precursor medium form, and the droplets are swept away by a flowing carrier gas. The reservoir-type ultrasonic aerosol generators can produce very small droplets of a relatively narrow size distribution and are preferred for use in applications when the particles made during the forming particles 104 are desired to be in a range of from about 0.2 to about 5 microns (weight average particle size), and especially when a narrow size distribution of the particles is desired. An example of a reservoir-type ultrasonic aerosol generator is described, for example, in U.S. Pat. No. 6,338,809, the entire contents of which are incorporated by reference herein as if set forth herein in full. Although both the nozzle-type ultrasonic aerosol generator and the reservoir-type ultrasonic aerosol generator produce small droplets of a relatively narrow size distribution, the reservoir-type generally produces finer droplets of a more uniform size.

Another example of an apparatus for generating droplets is a spray nozzle (not ultrasonically energized). Several different types of spray nozzles exist for producing droplets in gas dispersions, and new spray nozzles continue to be developed. Some examples of spray nozzles include 2-fluid nozzles, gas nozzles and liquid nozzles. Spray nozzle generators have an advantage of very high throughput compared to ultrasonic generators. Droplets produced using spray nozzles, however, tend to be much larger and to have a much wider size distribution than droplets produced by ultrasonic generators. Therefore, spray nozzles are preferred for making relatively large particles during the forming particles 104. Other types of droplet generators that may be used include rotary atomizers, and droplet generators that use expansion of a supercritical fluid or high pressure dissolved gas to provide the energy for droplet formation. Still another method for generating droplets is disclosed in U.S. Pat. No. 6,601,776, the entire contents of which are incorporated herein by reference in as if set forth herein in full.

It will be appreciated that no matter what type of droplet generator is used, the size of the particles produced during the forming particles 104 will depend not only upon the size of the droplets produced by the generator, but also on the composition of the precursor medium (such as the concentration and types of precursor(s) in the precursor medium).

As initially generated, the gas dispersion will have a gas phase that is wholly or primarily composed of the carrier gas used to generate the gas dispersion. The gas phase may have some minor components provided by the precursor medium during the generating gas dispersion 102, such as some liquid vehicle vapor from vaporization of some liquid vehicle during the generating gas dispersion 102. The carrier gas may be any convenient gas composition and may be, for example, a single component gas composition (such as for example pure nitrogen gas) or a mixture of multiple gas components (such as for example air, or a mixture of nitrogen and hydrogen). As the gas dispersion is processed, however, the composition of the gas phase will change. For example, during the forming particles 104, liquid vehicle is removed from the droplets to the gas phase, typically by evaporation caused by heating. Also, if the precursor medium contains reactive precursors or reagents, as the precursors or reagents react, the composition of the gas phase will contain decomposition products and reaction byproducts. At the conclusion of the forming particles 104, the gas dispersion will typically comprise an altered gas phase composition and a dispersion of the particles made during the forming particles 104.

In some implementations, the carrier gas used to generate the gas dispersion will be substantially non-reactive during the processing of FIG. 1. For example, the gas phase may contain only one or more inert gases, such as nitrogen and/or argon, depending upon the situation. Air can be used as a non-reactive carrier gas, when the oxygen component of the air is not reactive during processing. In other cases the carrier gas will include one or more reactive components that react during processing, and often during the forming particles 104. For example, the carrier gas, and therefore the gas phase of the gas dispersion as generated, may contain a reactive precursor to a material for inclusion in the particles (such as for example reactive oxygen gas when making some oxide materials) or a reactive reagent (such as hydrogen gas useful as a reducing agent when making some metallic materials).

Continuing with reference to FIG. 1, the forming particle step 104 may be performed in any apparatus suitable for removing liquid vehicle from the droplets to the gas phase of the gas dispersion and reacting or otherwise processing the precursors to make the particles comprising the desired nanoparticulates and matrix. Reactions to be accommodated during the forming particles 104 may include for example thermal decomposition of precursor(s), reaction of precursor(s) with other materials and reaction of reagents. Other processing of the precursors that may occur during the forming particles 104 may include for example, precipitating dissolved precursor(s) from the liquid vehicle and fusing particulate precursor(s).

Removing liquid from the droplets and reaction of precursor(s) may occur in the same or different equipment. The removing liquid is typically accomplished by vaporizing liquid vehicle, with the liquid vehicle vapor then mixing into the gas phase of the gas dispersion. Vaporization of the liquid vehicle is preferably accomplished by heating the gas dispersion to a temperature at which most, and preferably substantially all, of the liquid vehicle in the droplets vaporizes. In a preferred embodiment, reactions or other processing of precursors to form the desired particles are accomplished in a reactor or reactors. By a reactor, it is meant apparatus in which a chemical reaction or structural change to a material is effected. The removing of the liquid vehicle from the droplets may occur in the reactor or may occur in separate process equipment upstream of the reactor.

Referring again to FIG. 1, during the forming particles 104, at least a portion and preferably substantially all, of the liquid vehicle is removed from the droplets to the gas phase of the gas dispersion. Also during the forming particles 104, the matrix/nanoparticulate structure of the multi-phase particles is formed, with a dispersion of nanoparticulates being maintained by matrix. Removing at least a portion of the liquid vehicle from the droplets during the forming particles 104 occurs in the gas dispersion, and often the nanoparticulate/matrix structure is also formed in the gas dispersion, so that the multi-phase particles that result from the forming particles 104 are formed in a dispersed state in the gas dispersion. The removing of the liquid vehicle from the droplets and the formation of the nanoparticulate/matrix structure of the multi-phase particles may occur in the gas dispersion in a single apparatus or processing stage (e.g., both may occur while the gas dispersion passes through a thermal reactor). Alternatively, removing at least a portion of the liquid vehicle may be performed in a separate apparatus or step from the termination of the nanoparticulate/matrix structure (e.g., gas dispersion first dried in a dryer to form precursor particles without the nanoparticulate/matrix structure, followed by processing of the gas dispersion through a separate thermal reactor in which the nanoparticulate/matrix structure is formed). In yet another alternative, at least part of the liquid vehicle is removed from the droplets in the gas dispersion to form such precursor particles, the precursor particles are then separated from the gas dispersion, and the separated precursor particles are then processed to form the nanoparticulate/matrix structure (e.g., by controlled thermal treatment such as in a belt furnace, rotary furnace or tray furnace, with or without the introduction into the furnace of additional reactant(s) or control of the furnace atmosphere).

In one embodiment of the present invention, removing at least a portion of the liquid vehicle (and perhaps substantially all of the liquid vehicle) from the droplets of precursor medium in the gas dispersion and reacting precursors to form the desired materials for inclusion in the multi-phase particles are performed in separate steps. The removing of the liquid vehicle from the droplets may be performed in a reactor, furnace or using spray drying equipment, to produce a precursor particulate product that is collected for further processing. In some cases, the precursor particulate product made by removing the liquid vehicle from the droplets may not have distinct matrix and nanoparticulate phases, but may contain a single phase of mixed precursor(s) that have not yet reacted to form the matrix and nanoparticulate materials. However, in other cases the precursor(s) to the matrix and the precursor(s) to the nanoparticulates may already be in separate phases. The precursor particulate product made by removing the liquid vehicle from the droplets may then be subjected to a heat treatment in a separate reactor or furnace (e.g. belt furnace, tray furnace or rotary furnace) to react the precursors to form the desired matrix and nanoparticulate materials and to impart the nanoparticulate/matrix structure. It should be noted that in some cases during the heat treatment the matrix material of several particles may fuse together to form a continuous structure of matrix material with dispersed nanoparticulates and no longer be in the form of individual multi-phase particles. If it is desirable to have discrete multi-phase particles, the continuous structure of matrix with dispersed nanoparticulates may be jet milled or hammer milled to form separate multi-phase particles.

One example of a reactor for possible use during the forming particles 104 is a flame reactor. Flame reactors utilize a flame from combustion of a fuel to generate the required heat. In some cases, the precursor medium may contain the primary fuel that is combusted to generate the required heat may contain a supplemental fuel or may contain no fuel for the flame. Flame reactors have an advantage of being able to reach high temperatures. They also have the advantages of being relatively inexpensive and requiring relatively uncomplicated peripheral systems. One problem with flame reactors, however, is that there may be undesirable contamination of particles with byproducts from combustion of the fuel generating the flame. Additionally, there is very little ability to vary and control the environment within the reactor to control the progression of particle formation.

Another example of a reactor for possible use during the forming particles 104 is a plasma reactor. In a plasma reactor, the gas dispersion is passed through an ionized plasma zone, which provides the energy for effecting reactions and/or other modifications in the gas dispersion. Another example of a reactor for possible use during the forming particles 104 is a laser reactor. In a laser reactor, the gas dispersion is passed through a laser beam (e.g., a $CO_2$ laser), which provides the energy for effecting reactions and/other modifications in the gas dispersion. Plasma reactors and laser reactors have an advantage of being able to reach very high temperatures, but both require relatively complicated peripheral systems and provide little ability for control of conditions within the reactor during particle formation.

Another example of a reactor for possible use during the forming particles is a hot-wall furnace reactor. In a hot-wall furnace reactor, heating elements heat zones of the inside wall of the reactor to provide the necessary energy to the gas dispersion as it flows through the reactor. Hot-wall furnace reactors have relatively long residence times relative to flame, plasma and laser reactors. Also, by varying the temperature and location of heat input from heating elements in the different heating zones in the reactor, there is significant ability to control and vary the environment within the reactor during particle formation.

A spray drier is another example of a reactor that may be used during the forming particles. Spray driers have the advantage of having high throughput, allowing large amounts of particles to be produced. However, because of their larger size they provide less of an ability to control the reactor conditions during particle formation.

Referring to FIG. 1 again, in one embodiment of present invention, during the forming particles 104, the average stream temperature of the gas dispersion does not exceed a melting temperature of the matrix material for longer than a specific period of time. The length of the specific period of time will depend on the particular reactor used during the forming particle 104. As a non-limiting example, in those cases in which a spray dryer is being used in the forming particles, the period of time may be as much as about 10 seconds, as much as about 20 seconds, as much as about 30 second or even as much as about 40 seconds. However, if a different reactor system is being used in the forming particles step, the period of time may be as short as about 8 seconds, as short as about 5 seconds or even as short as about 1 second. In other situations, the period of time may be less than about 1 second, such as from about 0.5 second to about 0.01 second.

In addition to making particles including matrix and dispersed nanoparticulates, in one aspect the invention also concerns post manufacture processing of the particles that occurs after the forming particles 104. As noted previously, some or all of the material of the matrix in the particles made during the forming particles 104 may be designed to be permanent for some applications of the nanoparticulates. One example of particles using such a permanent matrix material is dispersion of phosphor nanoparticulates in an inorganic oxide matrix (e.g., silica). The multi-phase particles may be used directly, such as for example in the manufacture of a display, to take advantage of the phosphor properties of the nanoparticulates without releasing the nanoparticulates from the matrix. The silica provides a protective environment for the phosphor nanoparticulates without interfering with the excitation of and emission of light from the phosphor nanoparticulates during use in a display application. As another example of an application using a permanent matrix, particles may be made for use as a thermally conductive barrier layer, such as for use in computers. The nanoparticulates could be of a metal with high thermal conductivity, such as silver or copper. The matrix could be of an electrically insulating material, such as an electrically insulating polymer. The combination of electrically insulative polymer matrix and thermally conductive metal nanoparticulates is useful for making thermal interface layers, such as may be used underneath computer chips, permitting rapid dissipation of heat without significant risk of an electrical short through the thermally conductive metal. Another example is use of a matrix as a protective barrier to protect nanoparticulates from degradation. A protective matrix may be useful for protecting organic pigments, inorganic pigments and light emitting materials such as phosphors from the ambient environment (e.g., moisture or oxidation). Other non-limiting examples of multi-phase particles including a permanent matrix material are shown in Table 10, along with exemplary applications for use of those particles.

In one variation, the removability of the matrix material is an aid to further processing of the nanoparticulates to prepare the nanoparticulates for final use in an application. For example, the matrix may be wholly removable, thereby effecting decomposition of the particles and releasing the nanoparticulates. This may be desirable, for example, when the nanoparticulates need to be modified prior to use (such as for example surface modification for enhanced dispersability), or need to be in a free state for use (for example, for

TABLE 10

Exemplary Particles With Permanent Matrix Material

| NANOPARTICULATE MATERIAL | MATRIX MATERIAL | APPLICATION |
|---|---|---|
| Photoluminescent phosphor | Light emitting polymer Polymer | Organic light emitting diode (OLED) displays, lighting applications |
| Electroluminescent (EL) phosphor | Light emitting polymer Polymer | Electroluminescent (EL) displays/lamps |
| PL phosphor | Transparent inorganic material | Light emitting diodes (LED), plasma display panels (PDP), lighting |
| Red, Green, Blue (RGB) phosphors all in one layer | Polymer or inorganic material | Lighting |
| Cathodoluminescent (CL) phosphor | Light emitting polymer Polymer | Field emission display (FED) |
| Pigment | Polymer | Colored coatings |
| Pigment | Transparent inorganic material | Pigment, coloring |
| Hard materials such as oxides or nitrides | Polymer | Anti-scratch, anti-abrasion, dental glass |
| Hard materials such as oxides or nitrides | Softer inorganic material | Anti-scratch, anti-abrasion, dental glass |
| Semiconductor | Polymer | Solar cell |
| Semiconductor | Inorganic material | Solar cell |
| Semiconducting metal oxides | Glasses | Resistors |
| UV absorbing | Polymer | UV protection |
| UV absorbing | Inorganic | UV protection |
| High dielectric | Polymer | Capacitor |
| High dielectric | Inorganic material, glass, low melting point material | Capacitor |
| Conductor | Non-conductor | Electromagnetic shielding |
| Absorbent | Polymer | Protective barrier |
| Light absorber | Light emitter | Production of monochromatic light |
| High dielectric | Polymer dielectric | Dielectric layer in polymer transistor |
| Semiconductor, n type, p type | Polymer semiconductor, n type, p type | Semiconductor in polymer transistor |
| Semiconductor, n type, p type | Insulating polymer | Transistor |
| Silicon | Polymer | Transistor |
| electrochromic | Polymer | Electrochromic display |
| Electrochromic | Inorganic | Electrochromic display |
| Thermochromic | Polymer | Display, visual output device |
| Thermochromic | Inorganic material | Display |
| Photochromic | Polymer | Display, visual output device |
| Photochromic | Inorganic | Display, visual output device |
| Ion conductor | Polymer | Battery |
| Lithium containing | Polymer | Lithium ion battery |
| Metals, electrical conductor | Polymer, silicone | Thermal interface material |
| Refractive index | Refractive index matching | Reflective coating |
| UV absorber | Biologically inactive materials, polymers, inorganics | Cosmetics |
| Sorbent | Porous | Absorbents (dissolving away partially), chemical separations, bio-separations |
| Low k oxides | Porous to provide air | Low k material |
| Anti-fouling | Porous | Anti-fouling (marine) |
| Catalytically active | Porous | Self cleaning surfaces, membrane electrode assemblies |
| Dissolvable material | Polymer | Time release |
| Magnetic material | Organic or inorganic material | Magnetic applications |
| Pigments | Polymer Pigments | Color |

In one implementation of the invention, however, the particles made during the forming particles 104 will have a matrix that is designed to be wholly or partially removable. incorporation of the nanoparticulates into a paste or slurry, such as in an ink formulation for ink jet printing). In another variation, a portion of the matrix is removable to leave enough matrix to retain the structure of a particle that maintains the nanoparticulates in a dispersed state in the particle. In a preferred embodiment of this variation, the matrix comprises at least two different materials, with one matrix material being selectively removable relative to another matrix material.

In another implementation of the present invention, the matrix may comprise two or more different materials, with at least one material being selectively removable to produce a controlled pore characteristic (e.g., percent porosity, pore size, permeability) in the remaining particle. In one variation, the matrix may comprise uniformly sized regions of one matrix material that serve as a template to provide a length scale for porosity. The uniformly sized regions of material are then selectively removed to form relatively uniformly sized pores throughout the particle. In one particular implementation of this variation, the matrix is initially composed of two different matrix materials, a salt and a polymer, with the polymer being in the form of substantially uniformly sized particles or beads. When the polymer is selectively removed by being dissolved with a solvent or vaporized in a heater or reactor, leaving the salt matrix material remains with pores of substantially uniform size. The uniformly sized regions of matrix material that aid in forming controlled porosity in the multi-phase particles may, however, be made of any convenient material. Some non-limiting examples of materials that may be used in the matrix to create a template for generating controlled porosity in the multi-phase particles include: large salts, silica or other metal oxide particles, metal particles, zeolites, glasses, polymers (shaped as spheres, e.g., latex spheres; beads; or other shapes) and surfactant salts. Additionally, surfactants can be added to the precursor medium to form micelles (or reverse micelles) that control the size of a matrix material by isolating a matrix precursor within the micelles and constraining the size of the domains of the matrix material that is formed during the forming particles 104.

In yet another implementation of the invention, the matrix is designed to be wholly removable and merely serves as an aid for delivering the nanoparticulates into a final application or product. For example, in catalytic applications it might be useful to have a porous network of nanoparticulates of a catalyst material deposited on a catalytic support surface. However, such a network of nanoparticulates might be difficult to form directly on the surface. Using one embodiment of the present invention, multi-phase particles containing a matrix and an interconnected network of nanoparticulates, such as shown and described below with respect to FIG. 16, may be used to deposit the desired network on the catalytic support surface. The multi-phase particles containing matrix and the network of nanoparticulates may be deposited onto the desired catalytic support surface as a dry powder, an ink or a paste, and then washed with a solvent for the matrix to dissolve the matrix and leave the interconnected network of nanoparticulates on the catalytic support surface.

Referring now to FIG. 3, a generalized process block diagram is shown for one implementation of the invention involving decomposition of multi-phase particles to free nanoparticulates. FIG. 3 is the same as FIG. 1, except that a step of decomposing particles 116 is included after the forming particles 104. During the decomposing particles 116 sufficient matrix material is removed from the multi-phase particles to effectively decompose the structure of the particles, thereby releasing the nanoparticulates.

Removal of matrix material may be effected in any convenient way that effectively destroys the structure of the particles to release the nanoparticulates. As one example, matrix material may be removed by chemical reaction of, or reacting away the matrix material. The particles are subjected to reactant(s) that react with one or more materials of the matrix, thereby removing matrix material from and decomposing the particles. Table 11 shows some non-limiting examples of combinations of matrix materials and reactants or stimuli resulting in reaction of a matrix material to effect removal of the matrix material.

TABLE 11

Exemplary Matrix Material/Reactant Combinations

| MATRIX MATERIAL | REACTANT/STIMULUS |
| --- | --- |
| Oxygen sensitive polymers | Oxygen |
| Acid sensitive materials | Acids |
| Base sensistive materials | Bases |
| Heat sensitive materials | Heat |
| Light sensitive materials | Light |

As another example, matrix material may be removed by sublimation of the matrix material. The particles are subjected to conditions of temperature and pressure, which may be a vacuum pressure, at which the matrix material sublimes. Some non-limiting examples of sublimable matrix materials include lower molecular weight organic materials and oxides of lead, bismuth, vanadium, antimony and tin.

In one preferred embodiment, during the decomposing particles 116, sufficient matrix material is dissolved into a liquid medium to effect the decomposition of the particles. For example, salt matrix materials, such as those listed in Table 6, may be dissolved into aqueous liquids. As another example, a polymer matrix could be dissolved into an organic liquid, or aqueous liquid, depending upon the polymer. In any event, it is important that the liquid medium be selective for dissolving the matrix material relative to the nanoparticulates, so that material from the nanoparticulates is substantially not dissolved into the liquid medium. The dissolution of the matrix material in a liquid medium may be performed using any adequate method or apparatus such as for example a stirred tank or other equipment that agitates the liquid medium to promote contact of the liquid medium with the multi-phase particles.

With continued reference to FIG. 3, during and after the decomposing particles 116, it is generally preferred to significantly inhibit or substantially prevent the released nanoparticulates from agglomerating, because of the difficulty in subsequently redispersing the nanoparticulates for further processing or use. One way of significantly inhibiting agglomeration of the nanoparticulates is to make the multi-phase particles during the forming particles 104 to include a surface-modifying material that inhibits agglomeration and promotes dispersion of the nanoparticulates in the liquid medium. Such a surface-modifying material is referred to herein as a dispersant or a dispersing agent. The dispersing agent may rely on physical or chemical interactions with the nanoparticulates to promote dispersion. Typically, when a dispersing agent is included in the multi-phase particles, it will be part of the matrix of the particles. In that regard, the matrix may comprise substantially only the dispersing agent or may comprise multiple matrix materials, of which the dispersing agent is only one. In any event, the dispersing agent is of such a nature that when the particles are decomposed, at least a portion of the dispersing agent associates with a surface of the nanoparticulates in a way to inhibit agglomeration in the liquid medium of released nanoparticulates. As one example, the dispersant may be an amphiphile, with a polar portion that interacts with one of the nanoparticulates and the liquid medium and a nonpolar portion that interacts with the other of the nanoparticulates and the liquid medium, to promote maintenance of the nanoparticulates in the liquid medium in a dispersed state. The dispersing agent may be an ionic, nonionic or zwitterionic surfactant, or a polymer, that interact with the surface of the nanoparticulates. Some non-limiting examples of possible dispersing agents for use in polar and nonpolar liquid media include: ammonium salt of polyacrylic acid; ammonium salt of a polymeric carboxylic acid; sodium salt of a polymeric carboxylic acid; anionic macromolecular surfactant, condensed naphthalene sulfonic acid; methyl hydroxyethyl cellulose; mono-calcium salt of polymerized alkyl-aryl sulfonic acid; anionic and nonionic surfactants; polycarboxylic acid surfactant; polyoxyethylenesorbitan fatty acid ester; polyoxyethylene sorbitan monooleate; polyoxyethylene sorbitan monostearat; salts of polyfunctional oligomer; sodium dodecyl benzene sulfonate; sodium or ammonium salt of a sulfate ester an alkylphenoxypoly (ethyleneoxy)ethanol; sodium salt of a carboxylated polyelectrolyte; sodium salt of condensed naphthalene sulfonate; sodium salt of disulohonic acids; sodium salt of polyacrylic acids Polyacrylic acids; sodium salt of polymerized alkyl naphthalene sulfonic acid; sodium salt of polymerized alkyl-aryl sulfonic acid; sodium salts of polymerized substituted alkyl-aryl sulfonic acids; sodium salts of polymerized substituted benzoid alkyl sulfonic acids; sodium tetraborate; ammonium salt of carboxylated polyelectrolyteAlkylphenol ethoxylates; calcium sulfonate; zinc sulfonate; condensation product of naphthalene sulfonic acid formaldehyde; condensation product sulfo-succini acid ester of an alkoxylated novolak; nonylphenol novolak ethoxylate; condensation product of cresol-formaldehyde-schaffer salt; sodium salt of a cresol-formaldehyde condensation product; fatty acid methyl tauride sodium salt; phosphate of EO-PO-EO block polymer; 2,4,6-Tri-(1-phenylethyl)-phenol polyglycol ether phosphoric acid ester; 2,4,6-Tri-1(1-phenylethyl)-phenol polyglycol ether monophosphate triethanolamine salt; tri-sec,-butylphenol polyglycol ether phosphoric acid ester with 4 EO; alkyl polyglycol ether phosphoric acid ester with 6 BO; alkyl polyglycol ether phosphoric acid ester with 8 EO; 2,4,6-Tri-(1-phenylethyl)-phenol polyglycol ether sulfate ammonium salt; sulfosuccinic ester of ethoxylated castor oil; mannitol; sodium lauryl sulfate; and mono & disaccharides.

When the particles are made during the forming particles 104 to include a dispersing agent, a precursor for the dispersing agent will typically be included in the precursor medium from which droplets are formed during the generating gas dispersion 102. For example, a polymer for use as the dispersing agent could be dissolved in the liquid vehicle, with the polymer precipitating out and being included in the particles during the forming particles 104. Alternatively, the dispersing agent may be a material that is formed during the forming particles 104 from reaction of precursor(s) included in the precursor medium and/or the carrier gas. For example, a monomer or monomers for a polymer (which may be a homopolymer, copolymer, terpolymer, etc.) to be used as a dispersing agent may be included in the precursor medium, which monomer(s) polymerize to form the dispersing agent during the forming particles 104.

An alternative to including the dispersing agent in the particles made during the forming particles 104 is for the dispersing agent to be present in the liquid medium when initially contacted with the particles during the decomposing particles 116, or to add the dispersing agent to the liquid medium after such initial contact, but preferably prior to completion of the decomposing particles 116. In a preferred variation of this alternative, the dispersing agent is predissolved into the liquid medium prior to contacting the liquid medium with the particles during the decomposing particles 116, so that the dispersing agent is immediately available to intimately contact and associate with the nanoparticulates as they are exposed during the decomposing particles 116. During the decomposing particles 116, the mixture of liquid medium and particles is preferably agitated, such as with a mixer, to promote effective decomposition of the particles and intimate contact between the nanoparticulates and the dispersing agent.

Contacting the nanoparticulates with a dispersing agent in a liquid medium during or following the decomposing particles 116 is one example of post manufacture modification of the nanoparticulates, in that the dispersing agent effects a surface modification of the nanoparticulates to inhibit agglomeration and promote dispersibility. Another example of post manufacture modification of the nanoparticulates is contacting the nanoparticulates with a dispersing agent or other surface-modifying agent in a fluidized bed following the decomposing particles 116. The present invention, however, provides significant flexibility to effect a variety of post-manufacture modifications to one or both of the nanoparticulates and the matrix.

Referring now to FIG. 4, a generalized process block diagram is shown including modifying nanoparticulates 118 following the forming particles 104. The modifying nanoparticulates 118 could include, for example, surface modification by contacting the nanoparticulates with a dispersing agent as described above with reference to FIG. 3. The modifying nanoparticulates 118 may be performed while the nanoparticulates are in the multi-phase particles, made during the forming particles 104; may be performed after removal of a portion of the matrix from the multi-phase particles, but while the nanoparticulates are still held in a dispersed state by the matrix; or may be performed after decomposition of the multi-phase particles to release the nanoparticulates. Non-limiting examples of some types of modifications of the nanoparticulates that may be performed during the modifying nanoparticulates 118 include surface modification of a surface of the nanoparticulates, compositional modification of the nanoparticulates and structural modification of the nanoparticulates (e.g., modifications of morphology, crystallinity and/or composition).

One type of surface modification that may be performed on the nanoparticulates is coating or covering a surface of the nanoparticulates with a material that masks, or otherwise modifies, the surface properties of the nanoparticulates. By coating a surface it is meant covering a portion or all of the surface with surface-modifying material(s), also referred to herein as surface-modifying agents. A surface-modifying material may be held in association with the surface by any mechanism, including physical absorption, chemisorption or attachment through chemical bonding to the surface of the nanoparticulates (e.g., through covalent or ionic bonding). The surface-modifying material may perform one or a number of functions at the surface of the nanoparticulates. The surface-modifying material may function as a surfactant to modify the surface properties. The surface-modifying material may function as a dispersing agent to promote uniform separation and dispersion of the nanoparticulates in a liquid medium. The surface modifying material may function as a stabilizer to inhibit chemical degradation of the nanoparticulates.

Table 12 shows some non-limiting examples of polymers that may be used as surface-modifying materials to coat the surface of metal oxide, metal and semiconductor nanoparticulates.

TABLE 12

Exemplary Polymers for Surface Modifying Nanoparticulate Metal Oxides, Metals and Semiconductors

| NANOPARTICULATE METAL OXIDES | NANOPARTICULATE METALS AND SEMICONDUCTORS |
|---|---|
| Reactive Polysiloxanes | Amphiphilic Polymers |
| Crown Ethers | Thiol Polymers |
| Dendrimers | Polythiophenes |
| Amphiphilic Polymers | Polyanalines |
| Polyanilines | Starches |
| Starches | Gelatines |

TABLE 12-continued

Exemplary Polymers for Surface Modifying Nanoparticulate Metal Oxides, Metals and Semiconductors

| NANOPARTICULATE METAL OXIDES | NANOPARTICULATE METALS AND SEMICONDUCTORS |
|---|---|
| Gelatins | Polyelectrolytes |
| Polyelectrolytes | Polypyrroles |
| Polypyrroles | Polyanilines |
| | Polysiloxanes |

Table 13 shows some additional non-limiting examples of surface-modifying materials that could be used during the surface modifying 118. The surface modifying materials listed in Table 13 are materials that would normally associate with a surface of nanoparticulates by a mechanism other than through chemical binding (e.g., adhesive).

TABLE 13

Exemplary Surface-Modifying Materials For Nanoparticulates

| MATERIAL | EXAMPLES |
|---|---|
| Tyloxapol | 4-(1,1,3,3-tetramethylbutyl)-phenol polymer with ethylene oxide and formaldehyde |
| Polyvinylpyrrolidone (PVP) | |
| Poloxamers (copolymers of ethylene oxide and propylene oxide) | Pluronics ™ F68, F108, F127 |
| Poloxamines (copolymers of propylene oxide, ethylene oxide and ethylenediamine) | Tetronic ™ 908 |
| Gelatin | |
| Sulfated poloxamers | |
| Sulfated poloxamines | |
| Casein | |
| Lecithin (phosphatides) | |
| Glycerol | |
| Gum acacia | |
| Cholesterol | |
| Tragacanth | |
| Stearic acid | |
| Benzalkonium chloride | |
| Calcium stearate | |
| Glycerol monostearate | |
| Cetostearyl alcohol | |
| Cetomacrogol emulsifying wax | |
| Sorbitan esters | |
| Polyoxyethylene | |
| Polyoxyethylene alkyl ethers | macrogol ethers such as cetomacrogol 1000 |
| Polyoxyethylene alkyl esters | |
| Polyoxyethylene castor oil derivatives | |
| Polyoxyethylene sorbitan fatty acid esters | Tweens ™; Tween ™ 80 |
| Polyethylene glycols (PEG) | Carbowax ™ 3350, 1450 and Carbopol 934 ® |
| Polyoxyethylene stearates | |
| Phosphates | |
| Sodium dodecylsulfate | |
| Ethylene oxide and butylene oxide copolymers | |
| Cellulose ethers | methylcellulose; hydroxyethylcellulose; hydroxypropylcellulose; hydroxypropylmethylcellulose phthalate; carboxymethylcellulose; carboxymethylcellulose calcium; carboxymethylcellulose sodium |
| Polysaccharides | dextrin, guar gum, starch |
| Vinyl acetate and vinyl pyrrolidone copolymers | Plasdone ® S630; Kollidone ® VA 64 |
| Vinylacetate and vinylalcohol copolymers | |
| Noncrystalline cellulose | |
| Magnesium aluminum silicate | |
| Triethanolamine | |
| Polyvinyl alcohol (PVA) | |
| Dextran | |
| Dialkylesters of sodium sulfosuccinic acid | Aerosol OT ™ (dioctyl ester of sodium sulfosuccinic acid) |
| Duponol ™ (sodium lauryl sulfate); | |

TABLE 13-continued

Exemplary Surface-Modifying Materials For Nanoparticulates

| MATERIAL | EXAMPLES |
|---|---|
| Triton ™ X-200 (alkyl aryl polyether sulfonate) | |
| PEG-phospholipids | |
| dimyristoyl phosphatidyl glycerol | |
| Dioctylsulfosuccinate (DOSS) | |
| PEG-cholesterol | |
| PEG-vitamin A | |
| PEG-vitamin E | |
| PEG-liposomes | DPP-PEG-OH α-(dipalmitoylphosphatidyl)-ω-hydroxypolyoxyethylene); DSPE-PEG-COOH (distearoylphosphatidyl-N-(3-carboxypropionylpolyoxyethylene succinyl)ethanolamine); PEG-5000 ™ and PEG-2000 ™ |
| Sodium dodecylbenzene sulfonate | |
| Sodium stearate | |
| Decanoyl-N-methylglucamide | |
| N-decyl β-D-glucopyranoside | |
| N-decyl β-D-maltopyranoside | |
| N-dodecyl β-D-glucopyranoside | |
| N-dodecyl β-D-maltoside | |
| Heptanoyl-N-methylglucamide | |
| N-heptyl β-D-glucopyranoside | |
| N-heptyl β-D-thioglucoside | |
| N-hexyl β-D-glucopyranoside | |
| Nonanoyl-N-methylglucamide | |
| N-nonyl β-D-glucopyranoside | |
| Octanoyl-N-methylglucamide | |
| N-octyl β-D-glucopyranoside | |
| Octyl β-D-thioglucopyranoside | |
| Zwitterionic stabilizers | |
| Poly-n-methylpyridinium | |
| Anthryul pyridinium chloride | |
| Cationic phospholipids | |
| Chitosan | |
| Polylysine | |
| Polyvinylimidazole | |
| Polybrene | |
| Polymethylmethacrylate trimethylammoniumbromide bromide (PMMTMABr) | |
| Pexyldesyltrimethylammonium bromide (HDMAB) | |
| Quaternary ammonium compounds | stearyltrimethylammonium chloride; benzyl-di(2-chloroethyl)ethylammonium bromide; coconut trimethyl ammonium chloride or bromide; coconut methyl dihydroxyethyl ammonium chloride or bromide; decyl triethyl ammonium chloride; decyl dimethyl hydroxyethyl ammonium chloride or bromide; $C_{12-15}$ dimethyl hydroxyethyl ammonium chloride or bromide; coconut dimethyl hydroxyethyl ammonium chloride or bromide; myristyl trimethyl ammonium methyl sulphate; lauryl dimethyl benzyl ammonium chloride or bromide; lauryl dimethyl (ethenoxy)$_4$ ammonium chloride or bromide; N-alkyl ($C_{12-18}$) dimethylbenzyl ammonium chloride; N-alkyl ($C_{14-18}$)dimethyl-benzyl ammonium chloride; N-tetradecylidmethylbenzyl ammonium chloride monohydrate; dimethyl didecyl ammonium chloride; N-alkyl and ($C_{12-14}$) dimethyl 1-napthylmethyl ammonium chloride; trimethylammonium halide; alkyl-trimethylammonium salts; dialkyl-dimethylammonium salts; lauryl trimethyl ammonium chloride; ethoxylated alkyamidoalkyldialkylammonium salt; ethoxylated trialkyl ammonium salt; dialkylbenzene dialkylammonium chloride; N-didecyldimethyl ammonium chloride; N-tetradecyldimethylbenzyl ammonium; chloride monohydrate, N-alkyl($C_{12-14}$) dimethyl 1-naphthylmethyl ammonium chloride; dodecyldimethylbenzyl ammonium chloride; dialkyl benzenealkyl ammonium chloride; lauryl trimethyl ammonium chloride; alkylbenzyl methyl ammonium chloride; alkyl benzyl dimethyl ammonium bromide; $C_{12}$, $C_{15}$, $C_{17}$ trimethyl ammonium bromides; dodecylbenzyl triethyl ammonium chloride; poly-diallyldimethylammonium chloride (DADMAC); dimethyl ammonium chlorides; alkyldimethylammonium halogenides; tricetyl methyl ammonium chloride; decyltrimethylammonium bromide; dodecyltriethylammonium bromide; tetradecyltrimethylammonium bromide; methyl trioctylammonium chloride (ALIQUAT 336 ™); POLYQUAT 10 ™; tetrabutylammonium bromide; benzyl trimethylammonium bromide |
| Choline esters | choline esters of fatty acids |
| Benzalkonium chloride | |
| Stearalkonium chloride compounds | stearyltrimonium chloride and Di-stearyldimonium chloride |
| Cetyl pyridinium bromide or chloride | |
| Halide salts of quaternized polyoxyethylalkylamines | |
| MIRAPOL ™ | |
| ALKAQUA ™ | |

TABLE 13-continued

Exemplary Surface-Modifying Materials For Nanoparticulates

| MATERIAL | EXAMPLES |
| --- | --- |
| Amines | alkylamines; dialkylamines; alkanolamines; polyethylenepolyamines; N,N-dialkylaminoalkyl acrylates; vinyl pyridine |
| Amine salts | lauryl amine acetate; stearyl amine acetate; alkylpyridinium salt; alkylimidazolium salt |
| Amine oxides | |
| Imide azolinium salts | |
| Protonated quaternary acrylamides | |
| Methylated quaternary polymers | poly[diallyl dimethylammonium chloride]; poly-[N-methyl vinyl pyridinium chloride] |
| Cationic guar | |
| Carboxylates | |
| Citrates | |
| Thiols | |
| Di thiols | |

In one embodiment of the implementation of the invention shown in FIG. 4, the modifying nanoparticulates 118 includes surface modification comprising functionalizing a surface of the nanoparticulates. By functionalizing, it is meant that chemical functional groups of a desired type are attached to the surface of the nanoparticulates though chemical bonding (e.g., covalent bonding or ionic bonding). The functional group could be bonded directly to the nanoparticulates, or could be bonded to the nanoparticulates through some intermediate group or groups. Often, the functional group will be a part of a longer constituent group that is bonded to the nanoparticulates. The bonding to the nanoparticulates may in some cases be effected through a coupling agent that acts as a couplant intermediate between a nanoparticulate and the functional group. As used herein, a coupling agent refers to each of the following: a molecule or ionic group that is reactable with the nanoparticulates to form a chemical bond with the nanoparticulates, the residual portion of that molecule or ionic group bonded to the nanoparticulates following reaction with the nanoparticulates, and any further residual linking group bonded to a functional group following farther reaction to attach a functional group. One common group of coupling agents useful in many situations are silane coupling agents. Non-limiting examples of some silane coupling agents that may be used with the invention include: aminopropyltriethoxysilane; aminopropyltrimethoxysilane; aminopropylmethyldiethoxysilane; aminopropylmethyldimethoxysilane; aminoethylaminopropyltrimethoxysilane; aminoethylaminopropyltriethoxysilane; aminoethylaminopropylmethyldimethoxysilane; diethylenetriaminopropyltrimethoxysilane; diethylenetriaminopropyltriethoxysilane; diethylenetriaminopropylmethyldimethoxysilane; diethylenetriaminopropylmethyldiethoxysilane; cyclohexylaminopropyltrimethoxysilane; hexanediaminomethyltriethoxysilane; anilinomethyltrimethoxysilane; anilinomethyltriethoxysilane; diethylaminomethyltriethoxysilane; (diethylaminomethyl)methyldiethoxysilane; methylaminopropyltrimethoxysilane; bis(triethoxysilylpropyl)tetrasulfide; bis(triethoxysilylpropyl)disulfide; mercaptopropyltrimethoxysilane; mercaptopropyltriethoxysilane; mercaptopropylmethyldimethoxysilane; 3-thiocyantopropyltriethoxysilane; glycidoxypropyltrimethoxysilane; glycidoxypropyltriethoxysilane; glycidoxypropylmethyldimethoxysilane; glycidoxypropylmethyldiethoxysilane; methacryloxypropyltrimethoxysilane; methacryloxypropyltriethoxysilane; methacryloxypropylmethyldimethoxysilane; chloropropyltrimethoxysilane; chloropropyltriethoxysilane; chloromethyltrimethoxysilane; chloromethyltriethoxysilane; dichloromethyltriethoxysilane; vinyltrimethoxysilane; vinyltriethoxysilane; vinyltris(2-methoxyethoxy)silane; hexamethyldisilazane; dimethylchlorosilane; hexamethyldisiloxane; hexamethyldisilane; dimethyltrichlorosilane; methyltrichlorosilane; and silicon oils.

Non-limiting examples of some chemical functional groups that may be used to functionalize the nanoparticulates include hydroxyl, carboxyl, sulfo, oxo, amine, amide, acyl, alkyl, vinyl, carbonate, ammonium, sulfate, sulfhydryl, carbonyl, silyl, siloxy, acetyl, and any substituted form of any of the foregoing. In some embodiments of the present invention, functional groups may be attached to the surface of the nanoparticulates for the purpose of forming a precursor to a material on the surface of the nanoparticulates. This may be useful for example in an ink composition used in forming conductive features on a substrate. Ink compositions used in forming conductive features on a substrate may contain conductive particles that once deposited on a substrate in a desired pattern, are heated to fuse the particles together to form an electrically conductive feature. In one embodiment of the present invention, a nanoparticulate made of a conductive material may be functionalized with a chemical functional group that is then reacted to form a precursor to a conductive material on the surface of the nanoparticulates. When the nanoparticulates, with such a precursor on their surface, are used in an ink that is deposited on a substrate and heated, the precursor material on the surface of the nanoparticulates reacts to form the conductive material, which aids in fusing the nanoparticulates together and forming a conductive feature.

Non-limiting examples of some types of functionality that may be imparted to the nanoparticulates by the functional group include metal addition, hydrophilicity, hydroprobicity, lipophilicity, dispersibility in or compatibility with any desired material with which the nanoparticulates may be subsequently contacted or combined during subsequent processing or use. Also, the functional group may be selected to provide a reactive site for further modification at a later time. For example, the functional group may provide a reaction site for later grafting a polymer segment or a site for initiation of a polymerization reaction to form a polymer segment at the reactive site.

One preferred example of functionalizing nanoparticulates is attaching hydrophobic groups to metal or metal oxide nanoparticulates for enhanced compatibility with, and/or dispersibility in, an organic medium such as dispersion in an organic liquid or a polymer composition. For example, the hydrophobic groups may be attached by substitution at hydroxyl sites on the surface of the nanoparticulates such as through use of a silane coupling agent or some other coupling agent. As another example, polymer segments may be grafted to the surface of the nanoparticulates directly, or through the use of a coupling agent, in order to make the nanoparticulates more compatible with and dispersible in a particular polymer, aiding the preparation of a homogeneous blend of the nanoparticulates in a composition of the particular polymer. In the first example, the modified nanoparticulates may be more easily dispersible in an organic liquid to form a homogeneous composition, such as for preparation of an ink composition for ink jet printing.

As noted, the nanoparticulates may be modified by attaching directly, or through the use of some intermediate linking group, a group containing a reactive site for subsequent modification. The reactive site may be a site, for example, for polymerization, for grafting polymer segments, for cross-linking in a cross-linked polymer network or an ionic site for ionic bonding with other materials or for ion exchange.

Another type of surface modification that may be performed during the modifying nanoparticulates 118 is removal of surface groups or characteristics from the nanoparticulates. One example of this is dehydroxylating the surface of metal or metal oxide nanoparticulates to remove hydroxyl functionalization that may have formed on the nanoparticulates.

A compositional modification that may be performed during the modifying nanoparticulates 118 involves changing the composition in the interior of the nanoparticulates. For example, a metal oxide material contained in the nanoparticulates may be compositionally modified by reduction to form a metallic material (e.g., silver oxide to silver, nickel oxide to nickel). Conversely, a metallic material contained in the nanoparticulates may be oxidized to form a metal oxide material. As another example, when the nanoparticulates contain a monomer, the monomer may be polymerized to form a polymer. As another example, pre-polymer blocks in nanoparticulates could be linked together or cross-linkable polymers in the nanoparticulates could be cross-linked. As yet another example, a dopant could be diffused into a material of the nanoparticulates, such as to form a semiconductor or phosphor material with a specific desired property.

Structural modification that may be performed during the modifying nanoparticulates 118 involves a non-compositional, physical change to the nanoparticulate crystallinity or particle morphology. Such structural modification often involves subjecting the nanoparticulates to a thermal treatment at elevated temperature. As one example, structural modification may involve annealing the nanoparticulates, such as for crystal growth, to change the crystallinity or to redistribute materials within the nanoparticulates. Another example of a structural modification is changing the size of the nanoparticulates, which may involve a heat treatment to grow the size of the nanoparticulates.

It should be appreciated, that the modifying nanoparticulates 118 may involve one or more than one of any number of surface modifications and/or compositional modifications and/or structural modifications. As an example, the nanoparticulates could be annealed in the presence of a reactive component to effect both a compositional change and a physical change.

The modifying nanoparticulates 118 may be performed while the nanoparticulates are maintained in a dispersed state in the multi-phase particles made during the forming particles 104, after modifying the matrix of the multi-phase particles, or after decomposing the multi-phase particles to release the nanoparticulates. Also, the modifying nanoparticulates 118 may involve multiple modifications to the nanoparticulates. For example, one or more modifications may be performed to the nanoparticulates while the nanoparticulates are maintained in a dispersed state within the particles made during the forming particles 104; one or more additional modifications may be performed on the nanoparticulates during decomposition of the multi-phase particles and one or more modifications may be performed on the nanoparticulates after decomposition of the multi-phase particles 116 to release the nanoparticulates (such as for example surface modifying the nanoparticulates by contacting the nanoparticulates with an appropriate surface modifying material in a fluidized bed after release of the nanoparticulates from the matrix).

Figure 5:
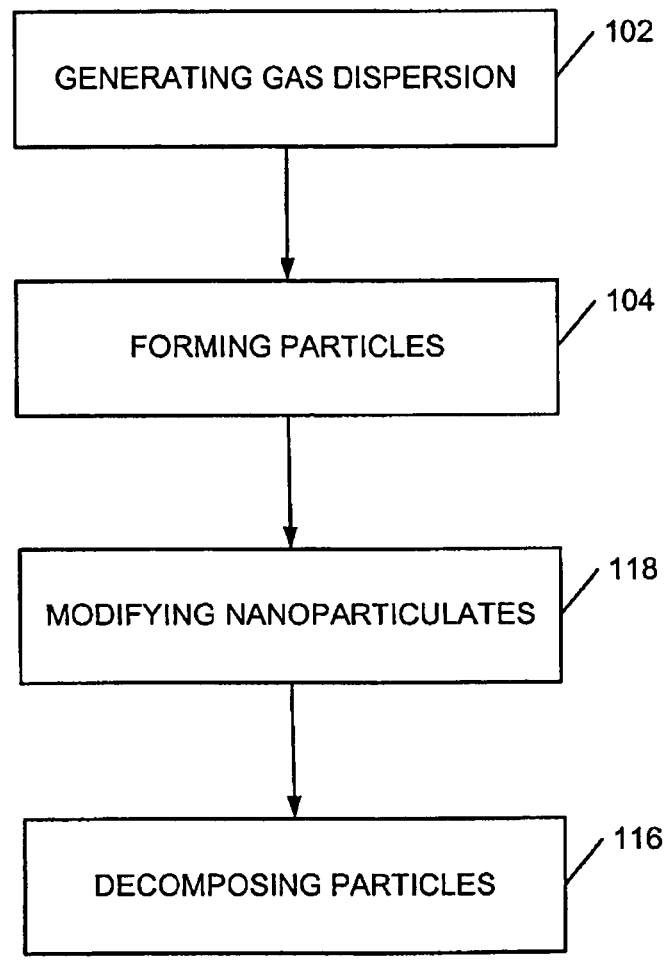
FIG. 5 is a generalized process block diagram of one embodiment of the method of the present invention including a modifying nanoparticulates step followed by a decomposing particles step.

Referring now to FIG. 5, a generalized process block diagram is shown for one implementation of the invention in which the modifying nanoparticulates 118 is performed after the forming particles 104 and prior to the decomposing particles 116. The decomposing particles 116 and modifying nanoparticulates 118 in FIG. 5 and subsequent figures are the same as discussed previously with respect to FIG. 3 and FIG. 4 respectively. The modifying nanoparticulates 118 involves a surface, composition and/or structural modification, as discussed above while the nanoparticulates are maintained in a dispersed state within the particles made during the forming particles 104. Performing the modifying nanoparticulates 118 while the nanoparticulates are in a dispersed state within the particles provides the advantage of making modifications to the nanoparticulates in a controlled way while avoiding the problem of nanoparticulate agglomeration. As previously stated, the matrix may be temporary or permanent. In the case where the matrix is permanent, the nanoparticulates may be modified to impart a characteristic that is desired in a final product. In the case where the matrix is temporary, the matrix will continue to act as a handling/storage/processing aid for the nanoparticulates prior to use of the nanoparticulates in a final application.

The modifying nanoparticulates step 118 may be performed while the particles are still in the gas dispersion. Thus, the modifying nanoparticulates step 118 may be performed in series after the forming particles step 104 without intermediate collection of the particles. One example of this is annealing or calcining the particles on-the-fly in the gas dispersion. Alternatively, the modifying nanoparticulates 118 could be performed after removal of the particles from the gas dispersion. One example of this is annealing or calcining the particles in a kiln, rotary calciner, belt furnace or tray furnace after collection of the particles. In some cases during the annealing or calcining, the matrix material from several multi-phase particles may fuse together to form a continuous structure of matrix with dispersed nanoparticulates. If it is desirable to have discrete multi-phase particles, the continuous structure of matrix with dispersed nanoparticulates may be jet milled or hammer milled to form separated multi-phase particles.

Referring now to FIG. 6 a generalized process block diagram is shown for one implementation of the invention in which the modifying nanoparticulates 118 is performed after the decomposing particles 116. This is the reverse order of the modifying nanoparticulates 118 and the decomposing particles 116 relative to the implementation shown in FIG. 5. As an alternative to the implementation shown in FIG. 5 and FIG. 6, the modifying nanoparticulates 118 could instead be performed completely, or partially, during the decomposing particles 116.

Figure 7:
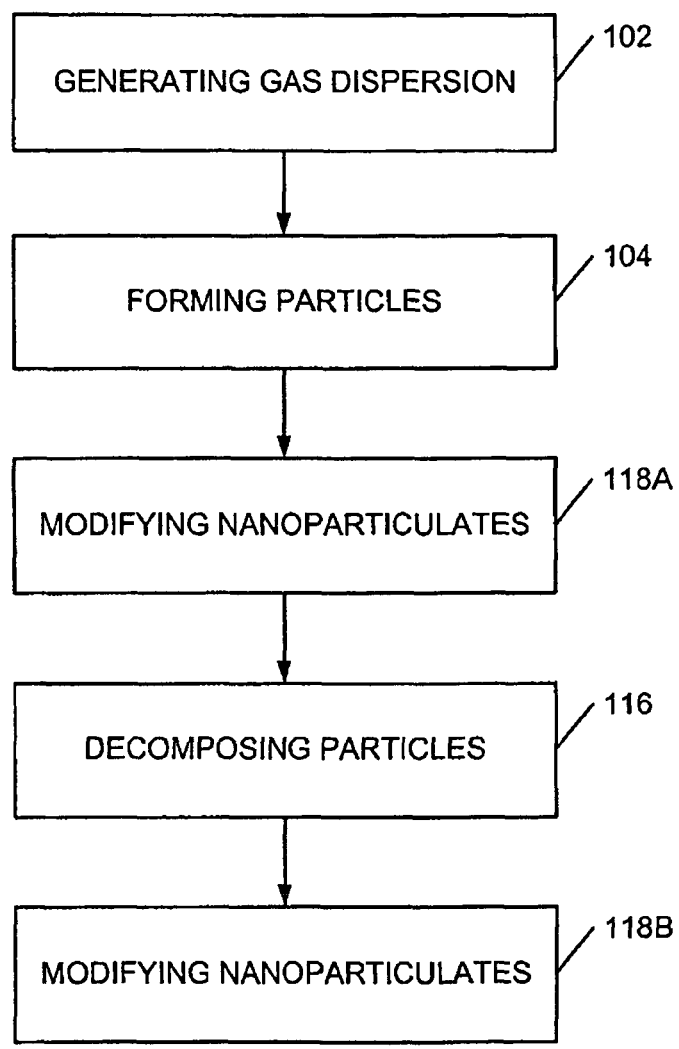
FIG. 7 is a generalized process block diagram of one embodiment of the method of the present invention including two modifying nanoparticulates steps, one following and one preceding a decomposing particles step.

Referring now to FIG. 7, a generalized process block diagram is shown for one implementation of the invention that includes two modifying nanoparticulates steps, modifying nanoparticulates 118A and modifying nanoparticulates 118B. A first modification step, modifying nanoparticulates 118A is performed as described for the embodiment shown in FIG. 5 (i.e. the modifying nanoparticulates 118A is performed prior to the decomposing particles 116) and a second modification step, modifying nanoparticulates 118B, is performed as described for the embodiment shown in FIG. 6 (i.e. the modifying nanoparticulates 118B is performed after the decomposing particles 116). As one example, the modifying nanoparticulates 118A may involve a compositional modification to the nanoparticulates and the modifying nanoparticulates 118B may involve a surface modification to the nanoparticulates to enhance the dispersability of the nanoparticulates and/or to inhibit agglomeration of the nanoparticulates.

Referring now to FIG. 8, a generalized process block diagram is shown for one implementation of the invention including a step of modifying matrix 126 after the forming particles 104. During the modifying matrix 126, one or more than one surface modification and/or compositional modification and/or structural modification is performed on the matrix. The previous discussions concerning surface modification, compositional modification and structural modification, and exemplary materials for use during such modifications apply equally to the modifying matrix 126, except that the modifications are performed on a material of the matrix rather than a material of the nanoparticulates. When both the nanoparticulates and the matrix are to be modified, the modifying matrix 126 may be performed partially or entirely prior to, simultaneously with or after a modification of the nanoparticulates.

One particularly preferred embodiment involving modifying the matrix is to remove only a portion of the matrix to increase porosity in the matrix and enhance access to the nanoparticulates through the increased porosity. The matrix with increased porosity may be a permanent matrix, and the increase in porosity may be useful for a final application. For example in catalytic applications, a porous matrix is useful to provide access to catalytic nanoparticulates dispersed in the porous matrix. Alternatively, the matrix with increased porosity may be a temporary, non-permanent matrix, and the enhanced porosity may be useful to provide access to the nanoparticulates to modify the nanoparticulates, (e.g., surface modification, compositional modification and/or structural modification). The increased porosity enhances infiltration of treating chemicals and reagents that may be used to modify the nanoparticulates.

The matrix could initially be composed of a single material with the increase in porosity being effected by removal of a portion of the matrix, (e.g., partial dissolution of the single matrix material). In another, preferred implementation however, the matrix initially comprises multiple materials with one matrix material being selectively removable relative to another matrix material to effect the increase in matrix porosity. The selective removal may be performed, for example, by selective sublimation, selective dissolution into a liquid medium, selective chemical removal, selective thermal decomposition at elevated temperature or selective melting of one matrix material relative to the other matrix material. By selective chemical removal it is meant that the matrix material is reacted with one or more reactants to form reaction products that are removed from the matrix, while the other matrix material is substantially not removed.

The selective removability of the matrix materials requires that the materials be selected to have different properties in relation to the removal technique to be used, with one material being substantially removable by the technique and the other being substantially not removable by the technique. For example, the matrix could contain one material that dissolves into a particular liquid medium and another material that does not dissolve into that liquid medium. As one example, a first matrix material may be a water soluble salt and a second matrix material may be a water insoluble polymer, with the selective removal being effected by dissolving at least a portion, and preferably substantially all, of the first matrix material into an aqueous liquid. As another example, the selective removal of the second matrix material could be effected by dissolving the polymer into an organic solvent in which the salt is substantially insoluble. As another example, the matrix could comprise two different inorganic salts with different solubilities in an aqueous liquid. As another example, the matrix could comprise two polymers with different solubilities in an aqueous or organic liquid. As another example, the matrix could comprise an inorganic salt or polymer that is soluble in a liquid medium and an inorganic oxide material (e.g., silica) that is not soluble in the liquid medium.

The partial removal of the matrix may be performed in a gas dispersion. For example, the partial removal of the matrix may be performed in series following the forming particles 104 while the particles are in the same gas dispersion. Alternatively, the partial removal of the matrix may occur after collection of the particles, which particles may then be re-dispersed in a new carrier gas to form a new gas phase in which the partial removal of the matrix is performed. As another alternative, the partial removal of the matrix may occur in an environment other than a gas dispersion. For example, after collection of the particles from the gas dispersion, the particles may be mixed with a liquid medium that is a selective solvent for one of the matrix materials.

One aspect of the invention involves removing nanoparticulates from a matrix structure and re-dispersing the nanoparticulates in a new medium. The re-dispersion may be in a new matrix or in a selected liquid medium. In one embodiment, at least a portion of the matrix, and preferably substantially all of the matrix, is removed using a liquid medium, with corresponding release of the nanoparticulates into the liquid medium, followed by separation of the nanoparticulates from the liquid medium and then re-dispersion of the nanoparticulates in a new liquid medium or in a new matrix.

Figure 9:
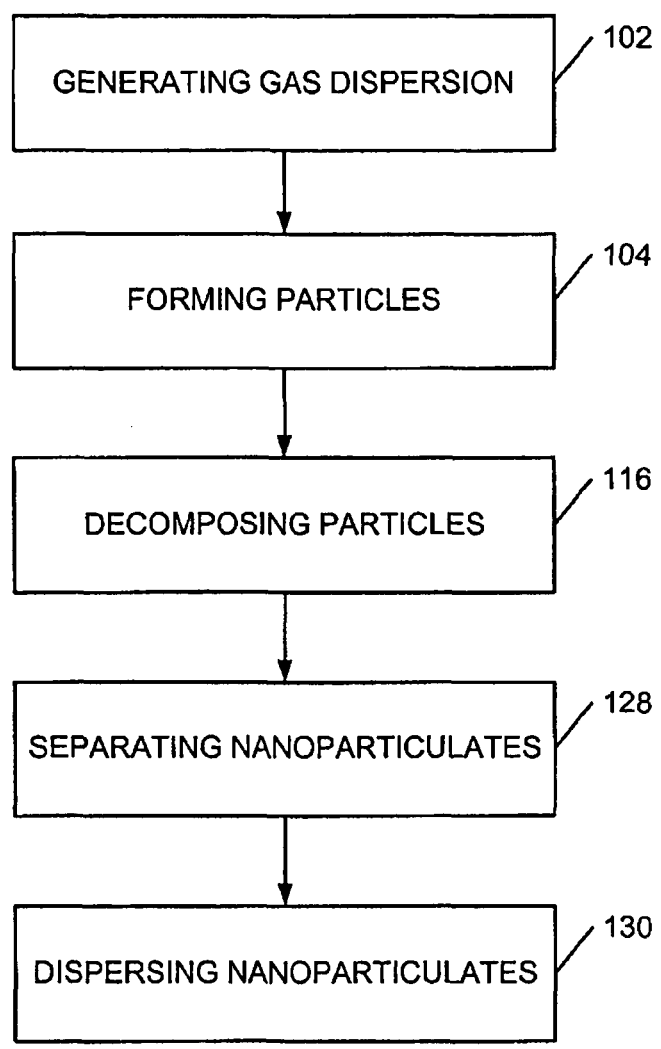
FIG. 9 is a generalized process block diagram of one embodiment of the method of the present invention including a decomposing particles step, a separating nanoparticulates step and a dispersing nanoparticulates step.

FIG. 9 shows a generalized process block diagram of a process that includes the decomposing particles 116, followed by the steps of separating nanoparticulates 128 and dispersing nanoparticulates 130. During the decomposing particles 116, at least a portion of the matrix is removed from the particles sufficient to release the nanoparticles into a liquid medium. During the separating nanoparticulates 128, the nanoparticulates are separated from at least a portion, and preferably substantially all, of the liquid medium. During the dispersing nanoparticulates 130, the separated nanoparticulates are mixed with and dispersed in a new liquid medium. The dispersing of the nanoparticulates is often aided by a surface modification performed on the nanoparticulates prior to the separating nanoparticulates 128. The surface modification may include coating the nanoparticulates with a dispersing agent that is compatible with the new liquid medium.

With continued reference to FIG. 9, separating nanoparticulates 128 may be performed using any suitable liquid/solid separation technique. Some examples of liquid/solid separation techniques that may be used include nanofiltration, centrifugation, sedimentation/decantation, diafiltration and froth flotation, using any separation aids as appropriate, such as filter aids, flocculants and frothing reagents. In one embodiment, the separating nanoparticulates 128 is performed by partitioning the nanoparticulates from one liquid medium to another immiscible liquid medium. For example, the decomposing particles 116 may be performed using an aqueous liquid medium and the separating nanoparticulates 128 may be performed by contacting the aqueous medium with an organic liquid medium into which the nanoparticulates preferentially partition. For example, metal nanoparticulates may be partitioned from an aqueous liquid into an organic liquid containing a metal complexing agent, such as for example an amine or phosphorous-containing extractant such as are used in solvent extraction operations. As another example, metal nanoparticulates may be surface modified with a hydrophobic modifying agent that aids in partitioning the metal nanoparticulates from an aqueous liquid into an organic liquid. In one embodiment, a first liquid medium is a process liquid used to remove the matrix and a second liquid medium is formulated for a particular final application. For example, the second liquid medium into which the nanoparticulates are re-dispersed could be an organic liquid for preparation of a paste or slurry composition, such as an ink composition comprising the nanoparticulates, for example for ink jet printing or offset lithographic printing. Alternatively, the second liquid medium may be formulated so that the nanoparticulates are stable during storage, transportation or to facilitate further processing of the nanoparticulates.

Another aspect of the present invention involves re-dispersing nanoparticulates in a composite structure with a new matrix. The matrix of the multi-phase particles as manufactured during the forming particles 104 may be useful for subsequent processing, handling, transportation or storage of the nanoparticulates, but it may be desirable at same point to have a different matrix for further processing, handling, storage or transportation, or for a final application for use of the nanoparticulates. The new matrix may be a permanent matrix for a final use or it may be a non-permanent temporary matrix for intermediate handling, storage, transportation or further processing.

Figure 10:
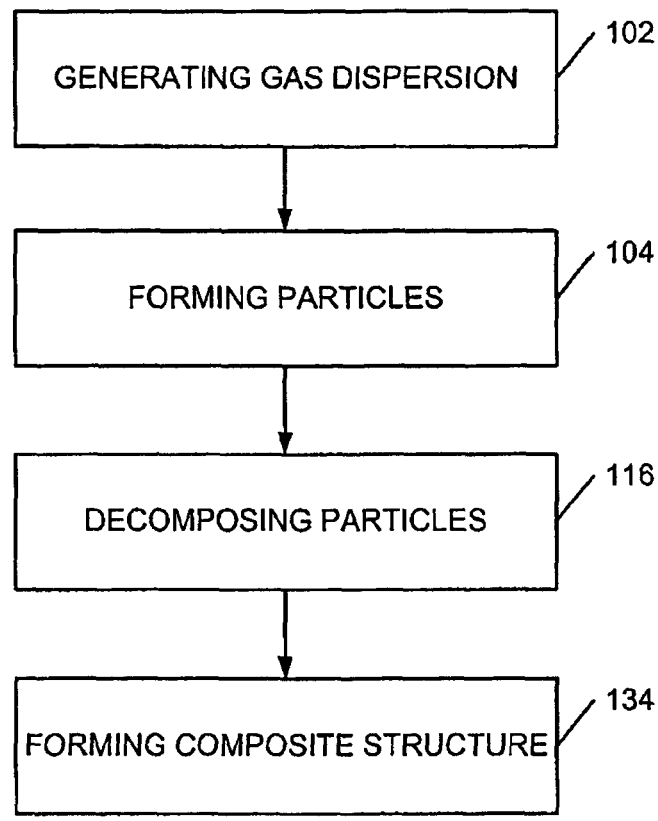
FIG. 10 is a generalized process block diagram of one embodiment of the method of the present invention including a decomposing particles step and a forming composite structure step.

FIG. 10 shows a generalized process block diagram for one implementation within this aspect of the invention. As shown in FIG. 10, the steps of decomposing particles 116 and forming composite structure 134 are included after the forming particles 104. The composite structure formed during the forming composite structure 134 includes nanoparticulates and a new matrix. The nanoparticulates in the composite structure are fixedly dispersed, meaning that the nanoparticulates are maintained in a dispersed state by the new matrix. The composite structure may be in a particulate form or a non-particulate form (e.g., monolithic form, sheet, layer, film, bar, etc.).

As with the matrix of the particles described previously, the matrix of the composite structure may be comprised of a single material or of multiple materials that function to maintain the nanoparticulates in a dispersed state. The new matrix of the composite structure may have the same composition or a different composition than the matrix removed during the decomposing particles 116. More often, the new matrix of the composite structure will have a different composition than that of the matrix removed during the decomposing particles 116, because the new matrix in the composition structure will typically serve a different purpose. The new matrix of the composite structure may include any suitable materials for a desired purpose. Examples of materials previously identified for the particles, made during the forming particles 104, are examples of materials that may be used for the new matrix of the composite structure.

Any procedure useful for dispersing nanoparticulates in a matrix may be used during the forming composite structure 134. As one example, the nanoparticulates may be dispersed in a melt of matrix materials and then cooled to solidify the composite structure (e.g., dispersed in a polymer melt). As another example, the nanoparticulates may be mixed with and dispersed in a new liquid medium, with the matrix then being formed around the dispersed nanoparticulates. As a specific example, nanoparticulates may be dispersed in a solution of reactable monomers or pre-polymer segments that are then polymerized or otherwise reacted to form the matrix around the dispersed nanoparticulates. As a further example, nanoparticulates may be dispersed in a polymer solution that gels upon inducing some change in the system. The polymer solution may change from a liquid to gel form, for example, in response to a change in temperature, pH or light. As another example, nanoparticulates may be dispersed in a solution of cross-linkable polymer that is then cross-linked to form the matrix around the dispersed nanoparticulates. As yet another example, the nanoparticulates may be dispersed in a liquid medium that includes colloidal particles of inorganic oxide (e.g., silica), and then liquid may be removed (e.g., evaporated) to form a matrix comprising the inorganic oxide. As another example, the nanoparticulates may be dispersed in a precursor solution comprising a reactable precursor material for the matrix and the precursor may be reacted to form the matrix material (e.g., dissolved precursor for making silica or another inorganic oxide).

In one implementation, the composite structure is made in particulate form by gas dispersion processing during the forming composite structure 134. Droplets comprising the nanoparticulates, and preferably also comprising one or more precursors for the new matrix, are formed and dispersed in and suspended by a carrier gas to form a new gas dispersion. The droplets are formed from a feed medium comprising the nanoparticulates dispersed in a liquid vehicle. Precursor(s) for material(s) of the new matrix are preferably dissolved or suspended in a liquid vehicle, but precursor(s) for material(s) of the new matrix may also be included in the carrier gas. In the gas dispersion, liquid is removed from the droplets and the precursors for the new matrix are reacted or otherwise processed to form the new matrix. The new gas dispersion may be made, for example as previously discussed with respect to forming the gas dispersion during the generating gas dispersion 102. Examples of liquid vehicles and matrix precursors that may be included in the feed medium are similar to those described previously with respect to the generating gas dispersion 102. After particles of the composite structure have been made in the new gas dispersion, the particles may be collected for further processing or use. The collection of the particles involves separating the particles of the composite structure from the gas phase of the new gas dispersion, such as by cyclone, filter, electrostatic precipitation, or in a bag house.

The composite structure made during the forming composite structure 134 may be designed as a permanent structure for a final use or may be a temporary structure useful for intermediate storage, transportation, handling or further processing of the nanoparticulates prior to final use. One example of a composite structure designed for final use is a dispersion of thermally conductive metal nanoparticulates (such as copper or silver) in a polymer matrix for use as a thermal interface material.

Figure 11:
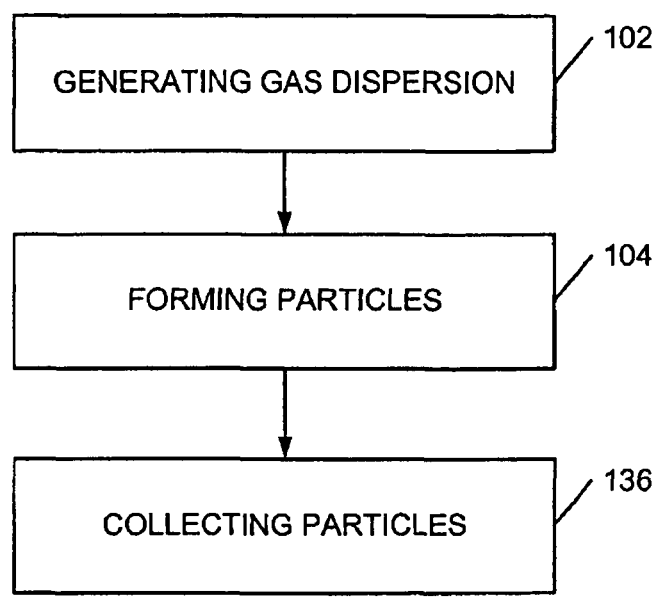
FIG. 11 is a generalized process block diagram of one embodiment of the method of the present invention including a collecting particles step.

Referring again to FIG. 1, the forming particles 104 may be performed entirely in the gas dispersion, and the resulting multi-phase particles may be subjected to further processing in the gas dispersion prior to collection, or the particles may be collected and subjected to further processing other than in the gas dispersion. FIG. 11 shows a generalized process block diagram of an implementation of the invention including a step of collecting particles 136 after the forming particles 104. The collecting particles may be performed, for example, immediately following formation of the particles during the forming particles 104 or after further processing of the particles in gas dispersion prior to the collecting particles 136. During the collecting particles 136, at least a portion and preferably substantially all of the particles are separated from the gas dispersion. The separation may be effected by any solid/gas separation technique, for example by using a filter, a cyclone, bag house, or electrostatic precipitator.

In one preferred embodiment of the implementation of FIG. 11, during the collecting particles 136, particles are separated from the gas phase of the gas dispersion directly into a liquid medium. The particles may be collected directly into a liquid medium by spraying the liquid medium into the gas dispersion, such as by using venturi scrubbers, to capture the particles in the droplets of liquid medium, and then collecting the liquid medium containing the particles. The particles may be collected directly into a liquid medium by impinging the particles into a "wall" of liquid medium, such as by using a wetted wall electrostatic precipitator. The wall of liquid medium may be, for example, a flowing film or sheet of the liquid medium. The gas phase of the gas dispersion may pass through the wall of liquid medium, or a flow of the gas dispersion may be subjected to a sudden change indirection, with momentum carrying the particles into the wall of liquid medium. The liquid medium containing the particles is then collected.

One advantage of collecting the particles directly into a liquid medium is inhibition, and preferably prevention, of agglomeration of the particles, which may occur with other collection techniques. More importantly, many implementations of the present invention include processing the particles in a liquid medium, and collecting the particles directly into a liquid medium can significantly simplify the processing. For example, if the particles are collected directly into a liquid medium of a type to be used for processing, this eliminates the need to collect and then disperse the collected particles in the liquid medium. The dispersion in the liquid medium has been accomplished as part of the collection. After the particles have been collected into the desired liquid medium, then reagents/reactants may be added to the liquid medium for desired processing (e.g., for modification of nanoparticulates or matrix). Alternatively, at the time of particle collection, the liquid medium may already have one or more reagents and/or reactants for such processing.

In one embodiment of the implementation of FIG. 11, the liquid medium into which the particles are collected is a solvent for one or more materials included in the matrix of the particles. Consequently, removal of at least a portion, or even substantially all, of the matrix is automatically effected in the liquid medium as it is being used to collect the particles. In one embodiment, the liquid medium may dissolve a sufficient portion of material of the matrix to automatically release the nanoparticulates from the particles. In another embodiment, the liquid vehicle may dissolve only a portion of the matrix material that is not sufficient to release the nanoparticulates, so that the nanoparticulates continue to be held in a dispersed state by the remaining matrix material. In this case, the matrix may be comprised of multiple materials, with the liquid medium being a selective solvent for one of the matrix materials relative to another of the matrix materials, so that there is selective removal of one of the matrix materials relative to another of the matrix materials.

In another variation of collecting particles directly into a liquid medium during the collecting particles 136, the liquid medium as used during the collecting particles 136 may be a solvent for one or more materials of the matrix and also contain one or more reactants and/or reagents for performing a modification of the nanoparticulates. Such a modification could involve, for example, a surface modification, compositional modification and/or structural modification of the nanoparticulates or the matrix, in a manner as previously discussed. For example, the liquid medium may contain a surface-modifying material, such as a dispersing agent, that surface modifies the nanoparticulates in the liquid medium of the collection. As another example, liquid medium used for collection may include reactants for use in attaching functional groups to the surface of the nanoparticulates, or reactants for use to compositionally modify the nanoparticulates.

Figure 12:
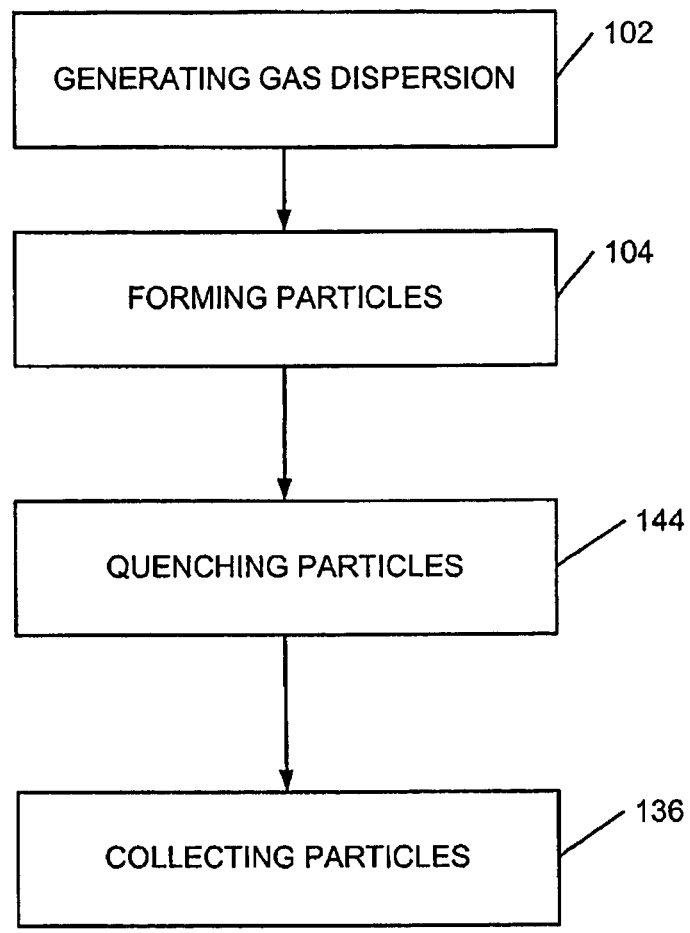
FIG. 12 is a generalized process block diagram of one embodiment of the present invention including a quenching particles step and a collecting particles step.

FIG. 12 shows a generalized process block diagram of an implementation of the invention including a step of quenching particles 144 performed prior to the collecting particles 136. The quenching particles 144 may be performed to quickly reduce the temperature of the particles after forming particles 104. This might be necessary, for example, to maintain a crystalline structure of the nanoparticulates or matrix and avoid or limit crystal growth. Additionally, if it is undesirable to have the particles agglomerate after the forming particles 104, the quenching particles 144 may be performed to quickly reduce the temperature of the particles to prevent them from agglomerating.

In one embodiment of the process implementation shown in FIG. 12, the multi-phase particles are formed in the gas dispersion during the forming particle 104, and a quench gas that is at a lower temperature than the gas dispersion is used during the quenching particles 144 to reduce the temperature of the particles. In this embodiment, the quench gas is mixed into the gas dispersion after the particles have been formed during the forming particles 104, such as by injecting a stream of the quench gas cocurrent with or counter current to the flow of the gas dispersion. In most cases, the quench gas will contain non-reactive gases that merely reduce the temperature of the particles and do not react with any materials in the particles. However, in some cases, the quench gas may contain oxidizing agents, reducing agents or precursors that react with materials in the particles to form a new material or modify existing materials in the particles.

In another embodiment of the process shown in FIG. 12, the quenching particles 144 may be performed using a liquid medium. In this case, the quenching particles 144 and the collecting particles 136 may be accomplished in a single step using a single liquid medium. The liquid medium used for collection of the particles may also quench the particles as they are collected in the liquid medium. As described with respect to FIG. 11, the liquid medium used to collect and quench the particles may contain a variety of materials for modifying the matrix and/or the nanoparticulates.

Another aspect of the present invention involves manipulation of multi-phase particles (such as for example those made during the forming particles 104 or made by another route) that include a dispersion of nanoparticulates and matrix, with the nanoparticulates maintained in a dispersed state by the matrix. Such manipulation may be, for example, as an aid to handling, storage, transportation, further processing or use of the nanoparticulates. This aspect of the invention includes any and all of the different operations discussed above (e.g., FIGS. 3-12) performed following manufacture of the multi-phase particles during the forming particles 104.

Another aspect of the invention concerns making a formulation comprising nanoparticulates and a liquid medium and involves forming a mixture comprising multi-phase particles and liquid medium, the multi-phase particles comprising nanoparticulates maintained in a dispersed state in the multi-phase particles by matrix; treating the multi-phase particles while in the mixture; and removing solutes from the liquid medium to thereby reduce the concentration of the solutes in the mixture, and preferably to reduce the molar concentration of the solutes by at least a factor of 10. The treating of the multi-phase particles may involve any treatment that may be performed in a liquid medium, including for example, decomposing the multiphase particles to release the nanoparticulates or any of the modification to the multiphase particles discussed above (such as any of the modifications to the matrix and/or nanoparticulates as discussed above), or some other treatment. The performing of such a treatment often results in solutes in the liquid medium. The solutes may include, for example, one or more of: residual treating material left over from the treatment, matrix material or nanoparticulate material dissolved into the liquid medium during the treatment, and reaction or decomposition products produced during the treatment. The multi-phase particles subjected to the treatment are preferably made as described herein, but may be made by another route.

Figure 19:
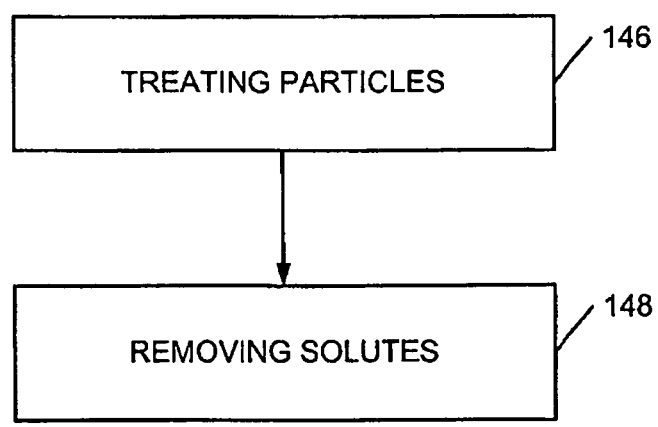
FIG. 19 is a generalized process block diagram of one embodiment of the present invention including a treating particles step and a removing solutes step.

Reference is now made to FIG. 19 showing a generalized process block diagram for one implementation of this aspect of the invention. As shown in FIG. 19, the multi-phase particles are subjected to a treating particles 146 step. During the treating particles 146, the multi-phase particles in a mixture with a liquid medium are subjected to some treatment in such a manner that during or after the treating particles 146, the liquid medium contains the solutes, at least a portion of which are removed from the liquid medium in the removing solutes 148 step. The treating particles 146 may involve, for example, any of the decomposing particles 116, modifying nanoparticulates 118 and modifying matrix 126 discussed previously with respect to any of FIGS. 3-10 when performed in a liquid medium. The solutes are substances dissolved in the liquid medium for which partial or total removal is desired during the removing solutes 148.

With continued reference to FIG. 19, at least some, preferably a majority, and most preferably substantially all, of one or more of the solutes are removed from the liquid medium in the removing solutes 148 step. Removal of the solutes reduces the concentration of dissolved components in the liquid medium. This is often important to prepare the liquid medium/nanoparticulate mixture for use as a product (such as an ink, paste or other slurry formulation), or to permit further processing of the liquid medium that would be interfered with by the solutes if not removed. For example, after the solutes are removed during the solute removing 148, then one or more additives could be added to the remaining mixture or a portion of the liquid medium could be removed to thicken the mixture, in preparation for formulating an ink, paste or other slurry composition. When thickening the mixture by removing a portion of the liquid medium, a mixture is prepared that is more concentrated in the nanoparticulates, regardless of whether the nanoparticulates are still retained in a matrix structure or not. Alternatively, reactants or reagents could be added to the liquid medium for performance of a different treatment, for which the presence of the solutes would be detrimental. In this latter alternative, additional solutes may be introduced into the liquid medium and another removing solutes step could be performed after performing the different treatment to remove at least a portion of one or more of the additional solutes.

Also, although the treating particles 146 and removing solutes 148 are shown as being sequential, the steps may be performed partially or wholly simultaneously. For example, solutes may be removed from the liquid medium while the multi-phase particles are being subjected to the treatment to immediately commence removal of solutes as they begin to build up in the liquid medium.

The removing solutes 148 may be performed by any technique. One preferred technique is membrane separation of the solutes by preferentially passing the solutes through a semipermeable membrane relative to particulates in mixture with the liquid medium. The particulates may comprise, for example, modified forms of the multi-phase particles or nanoparticulates that have been released from the matrix structure through decomposition of the multi-phase particles. By semipermeable membrane, it is meant that the membrane is significantly more permeable to passage of the solutes to be removed than passage of the particulates. Passage of the solutes across the membrane may be due to unaided diffusion of the solutes through the membrane, or the membrane may be functionalized or contain ion exchange activity to facilitate transport of one or more solutes across the membrane. For example, dissolved salt ions, from dissolution of a salt matrix may be removed in a dialysis-type membrane separation. Likewise, special molecule polymers may also be removed in such a dialysis-type membrane separation. For larger polymers, or macromolecules, a diasolysis or other membrane separation technique may be used. Examples of some membranes that may be used for removing smaller molecule solutes include, for example parchment membranes, collodion, cellophane, asbestos fiber and perfluorosulfonic acid membrane (such as NAFION™ membranes from DuPont). For removal of larger polymer molecules, some examples of some membranes that may be used include gum, plastic or rubber membranes. Another technique is to partition target solutes into another liquid that is immiscible with the liquid medium. For example, some polymer solutes could be partitioned into an organic liquid that is immiscible with the liquid medium, such as for example when the liquid medium is an aqueous liquid.

Another aspect for the present invention concerns particulate product comprising multi-phase particles that comprise a dispersion of nanoparticulates and matrix, with the nanoparticulates maintained in a dispersed state by the matrix. The nanoparticulates may have any composition, including any composition as discussed previously. Likewise, the matrix may have any composition, and may be comprised of any material or materials that function to maintain the nanoparticulates in the dispersed state, as discussed previously. Moreover, the multi-phase particles may have any of the attributes described previously, including any attributes imparted by any modifications of the multi-phase particles described previously, including any modifications to the matrix and/or nanoparticulates.

Figure 13:
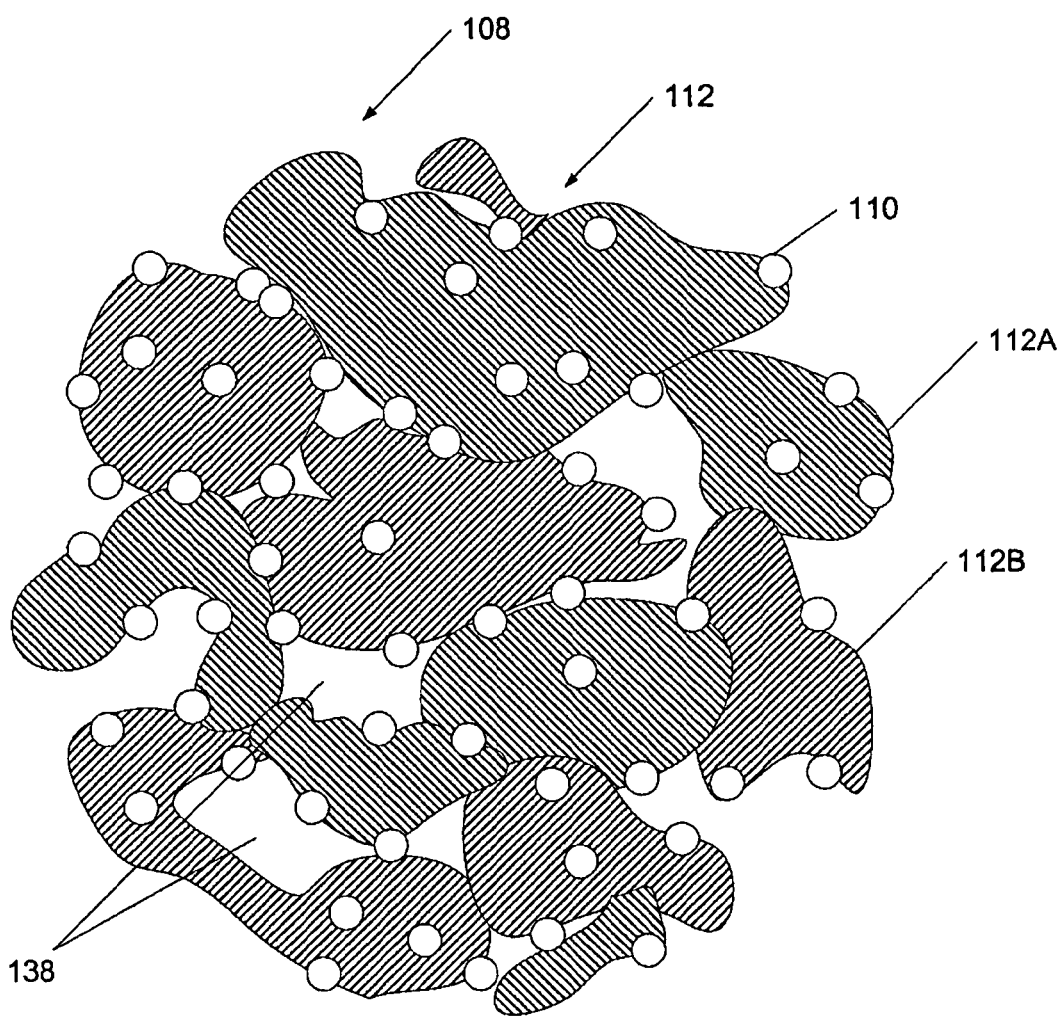
FIG. 13 shows one embodiment of a porous multi-phase particle manufacturable using the method of the present invention.

In one variation of the particulate product of the invention, the matrix of the multi-phase particles comprises multiple materials. FIG. 13 shows one embodiment of the multi-phase particle 108 in which the matrix 112 includes different matrix materials in two different material phases 112A and 112B of the matrix 112. The two different material phases 112A and 112B together function to maintain the nanoparticulates 110 in a dispersed state. This particular embodiment of the multi-phase particle 108 contains significant porosity 138 between the different material phases 112A and 112B of the matrix 112. The different material phases 112A and 112B, may be for example different salt materials, a salt and an inorganic oxide metal oxide (e.g., silica, etc.), different polymers, or a salt and a polymer, or any other combination of different materials. The different material phases 112A and 112B may or may not be selectively removable from the multi-phase particle 108. One of the material phases 112A and 112B may comprise a surface-modifying material that modifies a surface of the nanoparticulates 110 when the multi-phase particle 108 is decomposed to release the nanoparticulates 110.

Figure 14:
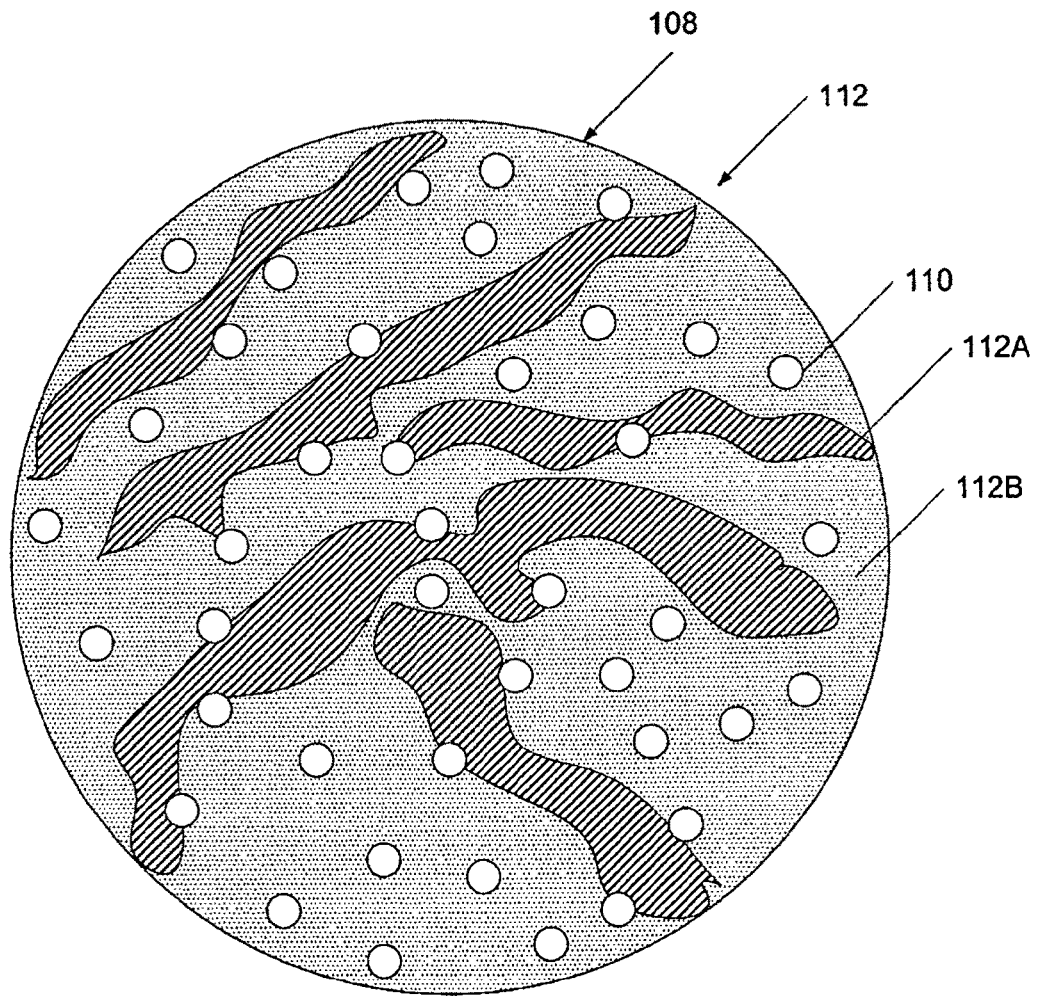
FIG. 14 shows one embodiment of a multi-phase particle including two matrix materials that is manufacturable using the method of the present invention.

FIG. 14 shows another embodiment of the multi-phase particle 108 in which the matrix 112 comprises the two different material phases 112A and 112B. The material phases 112A and 112B in the embodiment of FIG. 14, however, have different morphologies than in the embodiment of FIG. 13. Unlike FIG. 13, occurrences of the material phase 112A tend to be in elongated bands, while the other material phase 112B is more continuous. Again the material phases 112A and 112B may each be of any composition. For example, matrix phase 112A could be a polymer and the more continuous phase 112B of matrix 112 could be a salt.

Figure 15:
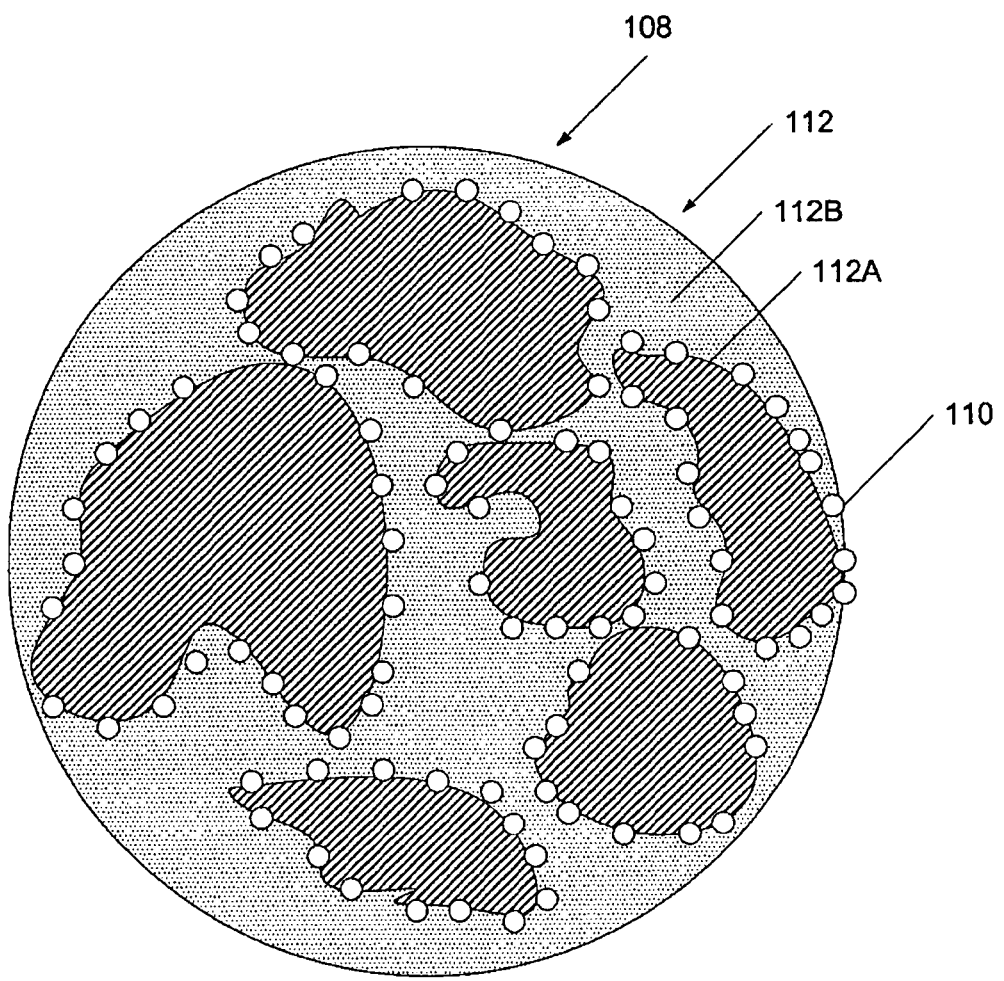
FIG. 15 shows one embodiment of a multi-phase particle including two matrix materials that is manufacturable using the method of the present invention.

FIG. 15 shows yet another embodiment of the multi-phase particle 108 in which the matrix 112 comprises the two different material phases 112A and 112B. In the embodiment shown in FIG. 15, the material phase 112A acts as a substrate for the nanoparticulates 110 and the other material phase 112B of matrix 112 helps to keep the nanoparticulates 110 separated. Again, the material phases 112A and 112B may be of any composition. For example, material phase 112A could be particles of an inorganic oxide (e.g., silica) and the other material phase 112B could be a polymer.

Figure 16:
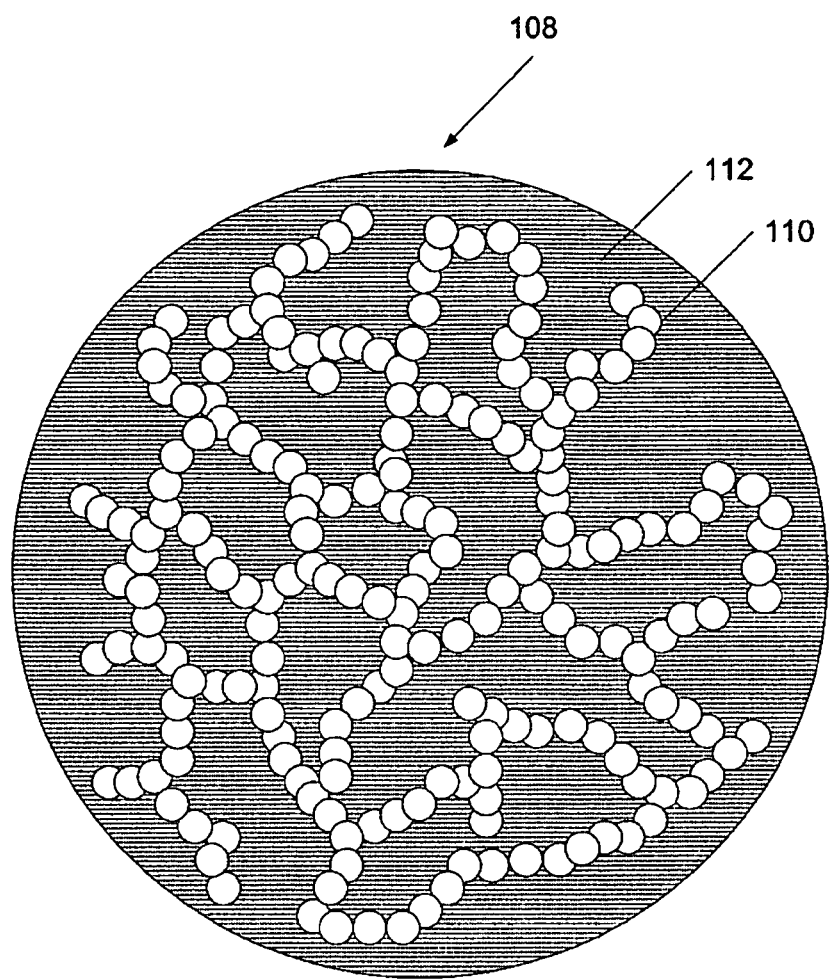
FIG. 16 shows one embodiment of a multi-phase particle with an interconnected network of nanoparticulates that is manufacturable using the method of the present invention.

FIG. 16 shows another embodiment of the multi-phase particles in which the nanoparticulates 110 are interconnected in a network. In the embodiment shown in FIG. 16, the matrix 112 maintains the nanoparticulates 110 in a partially dispersed state. The volume fraction of nanoparticulates 110 in particle 108 is high enough that the nanoparticulates 110 touch (i.e. are slightly necked) to form an interconnected network of nanoparticulates 110. The particle morphology shown in FIG. 16 may be useful for making nanoparticulates to be used in applications requiring large surface area, such as catalysts, sorbents or separation applications. As described above, matrix 112 may be used as an aid for delivering the interconnected network of nanoparticulates 110 into a final product or application, and then removed to reveal the large surface area provided by the interconnected network of nanoparticulates 110.

Figure 17:
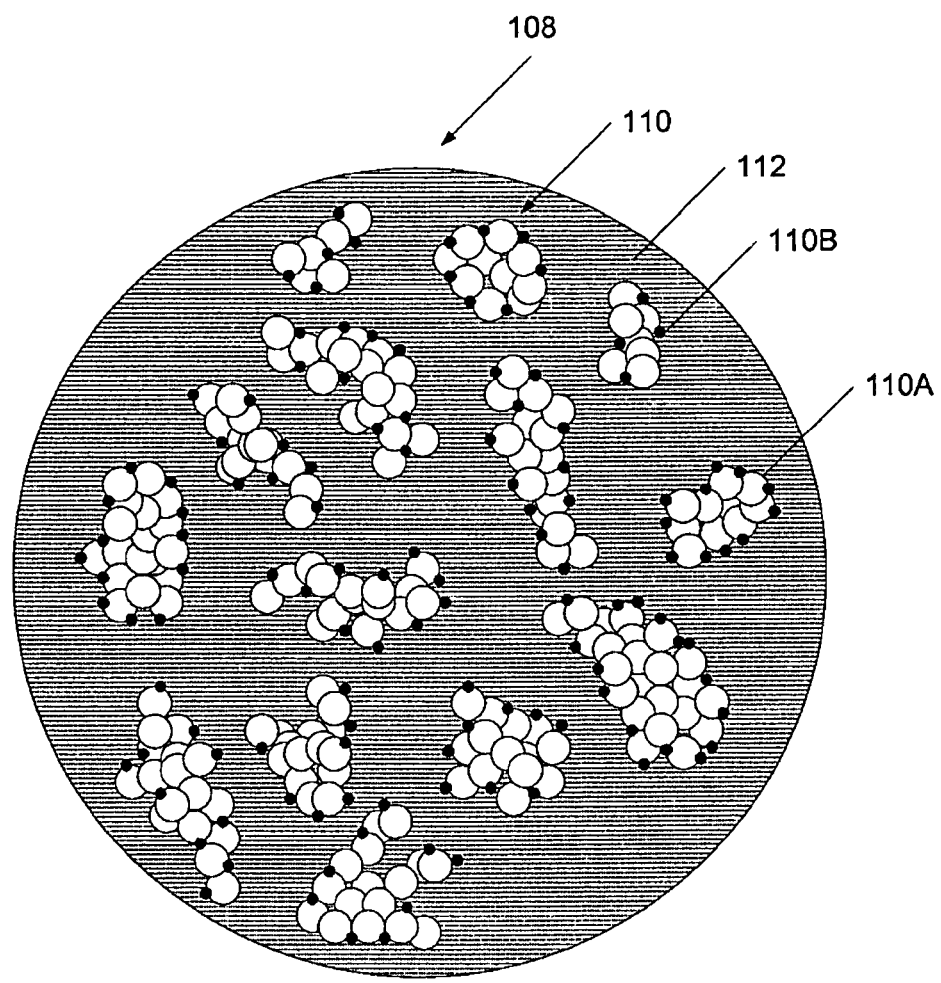
FIG. 17 shows one embodiment of a multi-phase particle with two nanoparticulate materials that is manufacturable using the method of the present invention.

FIG. 17 shows another embodiment of the present invention with a multi-phase particle 108 having matrix 112 and nanoparticulates 110 with two nanoparticulate materials 110A and 110B. In the embodiment shown in FIG. 17, one material of the nanoparticulates 110A is a collection of particles that have combined into a single amorphous unit. The second material of the nanoparticulates 110B is dispersed on the first material 110A. The first material 110A of the nanoparticulates acts as a substrate or a support for the second material 110B. The nanoparticulates 110 shown in FIG. 17 could be formed for example if a first precursor to the nanoparticulates reacts prior to reaction of a second precursor, so that the first precursor forms particles that combine to form the first material 110A, then a second precursor reacts to form the second material 110B on the first material 110A.

Figure 18:
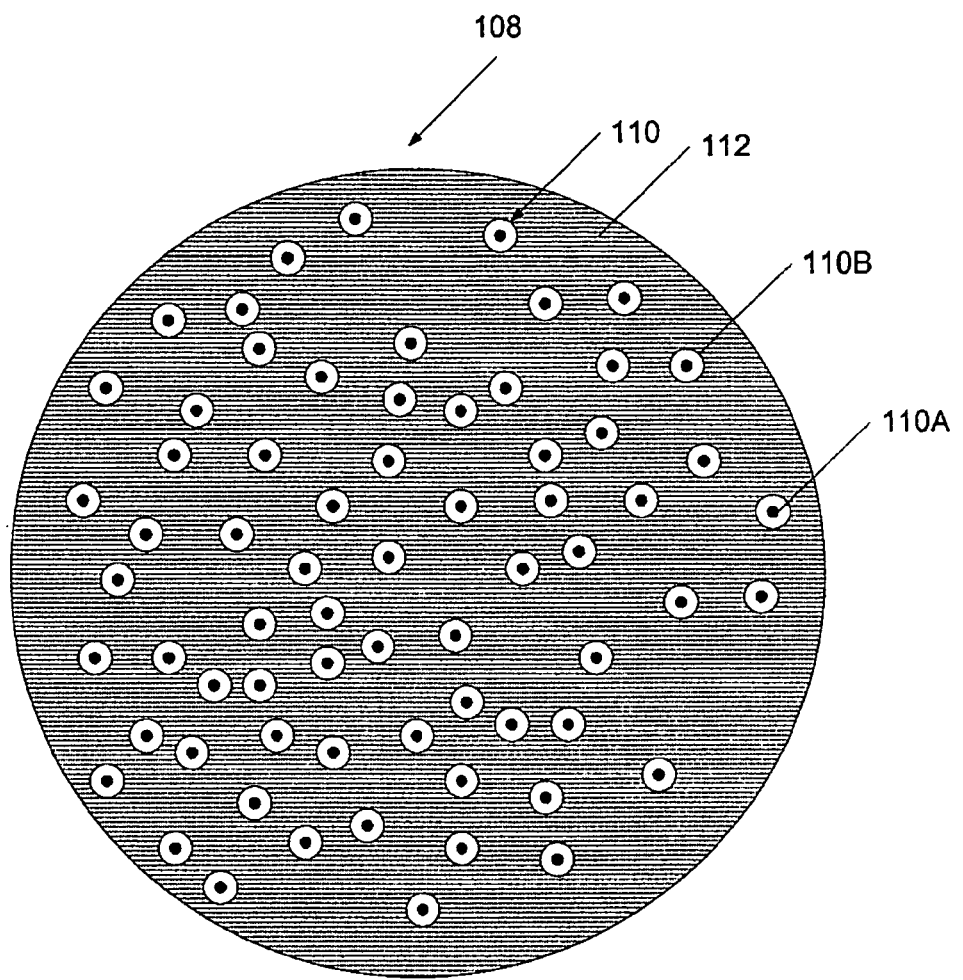
FIG. 18 shows one embodiment of a multi-phase particle with two nanoparticulate materials that is manufacturable using the method of the present invention.

FIG. 18 shows another embodiment of multi-phase particles with a matrix 112 and nanoparticulates 110 with two materials 110A and 110B. The first material 110A of nanoparticulates 110 is a core that is covered with a shell of the second material 110B. The nanoparticulates 110 shown in FIG. 18 could be formed if a first precursor to the nanoparticulates 110 reacts prior to reaction of a second precursor, so that the first precursor forms the core material 110A, then a second precursor reacts to form the shell material 110B that covers the first material 110A.

It will be appreciated that FIGS. 13-18 are only non-limiting examples of some embodiments of multi-phase particles of the invention having multiple matrix materials and nanoparticulate materials. Other morphologies are possible. Moreover, although the embodiments of FIGS. 13-18 show only two material phases in the matrix or in the nanoparticulates, the matrix or nanoparticulates could include three or more material phases. Also, the particulate product of the invention comprising two or more materials in the matrix or in the nanoparticulates need not comprise multiple material phases in the matrix. The multiple matrix and nanoparticulate materials may be present in a single material phase. Also, the multi-phase particles may have little or may have significant porosity, and the porosity may be open or closed and may comprise mesoporosity or microporosity.

Typically, the multi-phase particles of the present invention are spheroidal, meaning that they are generally of spherical shape, even if not perfectly spherical.

In another variation of the particulate product of the invention, the particulate product comprises multi-phase particles in which some or all of the nanoparticulates comprise one or more precursors that are reactable to modify the nanoparticulates while the nanoparticulates are maintained in the dispersed state. The modification may involve surface modification of the nanoparticulates, such as functionalization. Alternatively, the modification may involve compositional modification. As one example, the nanoparticulates could comprise monomers that are polymerizable while held by the matrix to form polymers in the nanoparticulates. As another example, the nanoparticulates could comprise a metal oxide that is reducible to form metallic material in the nanoparticulates. The reduction could be accomplished, for example, by thermal treatment at an elevated temperature and/or by introduction of a reducing agent, such as hydrogen gas that is infiltrated into the matrix to contact the nanoparticulates.

In another variation of the particulate product of the invention, the particulate product comprises multi-phase particles that comprise a surface-modifying material, which may be present in the matrix, nanoparticulates, or elsewhere in the multi-phase particles. The multi-phase particles are decomposable to release the nanoparticulates, with at least a portion of the surface-modifying material associating with the nanoparticulates to modify the surface of the nanoparticulates. As one example, the surface modifying material may be a residual surfactant or dispersing agent that adheres to the surface of the nanoparticulates. In another example, the surface-modifying material is reactable with a surface of the nanoparticulates, before, during or after decomposition of the multi-phase particles, to attach functional groups to the surface of the nanoparticulates through chemical bonding.

In another variation of the particulate product of the invention, the particulate product comprises multi-phase particles in which some portion or substantially all material of the matrix is removable by a technique other than by dissolution in a liquid. Matrix material may be removable, for example, by sublimation, melting, decomposition or chemical removal (e.g., by reacting the material away).

EXAMPLES

Example 1

Iron Oxide Nanoparticulates and Salt Matrix

Several precursor mediums are prepared containing: $Fe(NO_3)_3 \cdot 9H_2O$, as a precursor to iron oxide nanoparticulates; a salt, $NaNO_3$ or $NaCl$, as a precursor to a matrix material and deionized water. The precursor mediums are processed into a powder containing multi-phase particles including iron oxide nanoparticulates in a salt matrix, which is dissolved away in a subsequent step. The weight ratio of $Fe(NO_3)_3 \cdot 9H_2O$ to salt in the precursor mediums is varied between 1:2 and 1:8, based on the final amount of iron oxide desired in the multi-phase particles. The precursor mediums are processed using a spray pyrolysis system that generates droplets of the precursor mediums, using an ultrasonic generator, and heats the droplets in a tubular hot wall reactor at temperatures ranging from 400° C. to 1000° C. The processing conditions for the production of the powders containing the multi-phase particles are summarized in Table 14.

Thermogravimetric analysis (TGA) of the $Fe(NO_3)_3 \cdot 9H_2O$ precursor and the $NaNO_3$ salt matrix component indicates that the decomposition of $Fe(NO_3)_3 \cdot 9H_2O$ to iron oxide occurs stepwise, wherein the water is first stripped off and then the nitrate is converted to iron oxide. The conversion temperature for the $Fe(NO_3)_3$ precursor is relatively low, below about 200° C.

After production of the powders containing the multi-phase particles, the nanoparticulates are subjected to a heat treatment using two different methods. In one method, the nanoparticulates are heat treated prior to being separated from the salt matrix. In a second method, the nanoparticulates are heated after separating the nanoparticulates from the matrix in a separation step. Because the salts $NaNO_3$ and $NaCl$ used as matrices are highly soluble in water, the separation step involves dissolving away the salt matrix using water. The salt matrix is dissolved by repeated additions of water followed by settling or centrifugation of the nanoparticulates released from the matrix. An alternative method of separating the nanoparticulates from the matrix is to filter and wash the nanoparticulates, which form soft agglomerates, several times with water to remove the matrix material.

The powders containing the multi-phase particles are tested using x-ray diffraction (XRD) to determine which phases are present in the powders. Table 14 shows the phases that are detected in the powders. Some of the iron oxide nanoparticulates produced from the precursor mediums are magnetic.

TABLE 14

Processing Conditions and Detected Phases in Powders

| Sample | Precursor to Nanoparticulates | Salt Matrix | Weight Ratio Of Nanoparticulate Precursor:Salt Matrix In Precursor Medium | Processing Temperature (° C.) | Detected Phases In Powder |
|---|---|---|---|---|---|
| A | $Fe(NO_3)_3$ | $NaNO_3$ | 1:2 | 400 | $NaNO_3$ |
| B | $Fe(NO_3)_3$ | $NaNO_3$ | 1:2 | 500 | $NaNO_3$ |
| C | $Fe(NO_3)_3$ | $NaNO_3$ | 1:2 | 600 | $NaNO_3$ |
| D | $Fe(NO_3)_3$ | $NaNO_3$ | 1:2 | 700 | $NaNO_3$ |
| E | $Fe(NO_3)_3$ | $NaCl$ | 1:2 | 600 | $NaCl$ |
| F | $Fe(NO_3)_3$ | $NaCl$ | 1:2 | 400 | $NaCl$ $NaNO_3$ |
| G | $Fe(NO_3)_3$ | $NaCl$ | 1:2 | 800 | $NaCl$ |
| H | $Fe(NO_3)_3$ | $NaCl$ | 1:2 | 1000 | $NaCl$ $Fe_2O_3$ |
| I | $Fe(NO_3)_3$ | $NaCl$ | 1:4 | 400 | $NaCl$ $NaNO_3$ |
| J | $Fe(NO_3)_3$ | $NaCl$ | 1:8 | 400 | $NaCl$ $NaNO_3$ |
| K | $Fe(NO_3)_3$ | $NaCl$ | 1:8 | 1000 | $NaCl$ |
| L | $Fe(NO_3)_3$ | $NaCl$ | 1:4 | 1000 | $NaCl$ $Fe_2O_3$ |
| M | $Fe(NO_3)_3$ | $NaNO_3$ | 1:2 | 400 | $NaNO_3$ |
| N | $Fe(NO_3)_3$ | $NaNO_3$ | 1:2 | 400 | $NaNO_3$ |

It is expected that the use of two different matrix salts will result in particles of different particle size and morphology because $NaCl$ melts 500° C. higher than $NaNO_3$.

Precursor mediums processed at or below 800° C. yield powders with crystalline salt matrices ($NaCl$ or $NaNO_3$) and amorphous iron oxide. Crystalline phases of both the iron oxide and the matrix material, when $NaCl$ is used as the matrix, are detected from powders that are processed at a temperature of 1000° C. It is likely that some of the $NaNO_3$ matrix melts or decomposes when processing the precursor mediums between 400° C. and 700° C.

Powders with NaCl as Matrix of Multi-Phase Particles

A crystalline phase of $NaNO_3$ appears in the XRD spectra of powders produced from the precursor medium containing $NaCl$ and processed at 400° C. The presence of the crystalline phase of $NaNO_3$ is probably due to the simultaneous precipitation of $NaNO_3$ and $FeCl_3$ during processing of the precursor medium. The $FeCl_3$ decomposes to iron oxide at about 315° C. For powders processed at higher temperatures, the only crystalline salt phase detected is $NaCl$. It is believed that the $NaNO_3$ is not present in the powders processed at higher temperatures because it melts and decomposes at the higher temperatures.

Scanning electron microscope (SEM) images of the powder, made from the precursor medium containing NaCl, before separation of the nanoparticulates from the matrix, show multi-phase particles mainly in the size range between 0.5 μm and 5 μm, as would be expected from the ultrasonic generation method. The particles are mostly spherical shaped with an uneven surface structure. Individual domains within the multi-phase particles are visible, indicating the heterogeneity of the multi-phase particles. An increased presence of smaller multi-phase particles (200 nm to 500 nm) is observed for powders processed at 1000° C., which may be caused by bursting of larger particles during processing.

SEM images of the multi-phase particles indicate that the iron oxide formed at lower temperatures appears as mostly spherical nanoparticulates in the size range between 50 nm and 200 nm. At higher processing temperatures smaller nanoparticulates, that are partially sintered and form larger agglomerates after separation from the matrix, are formed. A variety of different morphologies are observed at a processing temperature of 1000° C., such as irregularly shaped multi-phase particles, small nanoparticulates sintered together to make up secondary agglomerates and porous shells that are mostly spherical or broken into smaller pieces.

An analysis is performed on the particle morphology of the multi-phase particles produced from the precursor mediums with ratios of $Fe(NO_3)_3 \cdot 9H_2O$ to NaCl of 1:4, 1:2 and 1:8. The analysis indicates distinct crystalline facets for sample L (1:4 ratio), indicating the presence of cubic phased NaCl. Thin broken shells are observed in sample L and are attributed to iron oxide. The thin broken shells are also observed after dissolution of the NaCl in the multi-phase particles to separate the nanoparticulates. The decreased relative amount of $Fe(NO_3)_3 \cdot 9H_2O$ in sample L (compared to sample H, with a 1:2 ratio) leads to the formation of thinner shells that break up more easily. This effect is even more pronounced at lower $Fe(NO_3)_3 \cdot 9H_2O$ to NaCl ratios such as sample K (1:8 ratio).

A higher amount of smaller NaCl matrix material forms at high temperatures and low precursor to matrix ratios such as in sample K. One interpretation is that initially individual smaller domains of NaCl form from larger droplets separated by an iron nitrate phase. However, because most of the iron nitrate migrates to the surface during the course of the conversion, gaps are formed and at higher temperatures the larger particle bursts into smaller spherical particles consisting of matrix material and thin broken shells of iron oxide.

The above analysis indicates that the preferred process conditions for the preparation of iron oxide nanoparticulates in a NaCl matrix include the use of lower temperatures since higher temperatures lead to an increased droplet drying rate which causes the $Fe(NO_3)_3 \cdot 9H_2O$ to migrate to the surface where it nucleates and crystallizes. Keeping the residence time constant and lower temperatures provide more time for the $Fe(No_3)_3 \cdot 9H_2O$ to precipitate and convert within the NaCl matrix rather than at the surface. A high $Fe(NO_3)_3 \cdot 9H_2O$ to NaCl ratio is preferred since it leads to higher yield of nanoparticulates and better separation without a negative effect on the particle size.

Powders with $NaNO_3$ as Matrix of Multi-Phase Particles

Different results are observed when $NaNO_3$ is used as the matrix material. The powders processed at 400° C. are analyzed with an SEM to view the nanoparticulates before and after separation from the $NaNO_3$ matrix. In contrast to the samples using a NaCl matrix at the same temperature and precursor to matrix ratio (overall solution concentration not considered), the average particle size of the amorphous iron oxide nanoparticulates is larger, around 300 nm and the shape is distinctively spherical and only moderate agglomeration occurs.

The nanoparticulates produced at 400° C. are separated from the $NaNO_3$ matrix by settling and centrifugation. However, when separated by filtration instead of settling and centrifugation the SEM images show larger agglomerates. Agitation of the agglomerates by, for example, ultrasonication breaks up these agglomerates. It is also noted that accelerated drying of the nanoparticulates after dissolving of the $NaNO_3$ matrix leads to agglomeration.

Processing at higher temperatures of 500° C. to 700° C. provides inconclusive results, and it is not clear if the combination of $Fe(NO_3)_3$ with a $NaNO_3$ matrix is useful at higher temperatures.

Processing at 1000° C. creates multi-phase particles with iron oxide nanoparticulates having significant crystallinity. However, the multi-phase particles processed at 1000° C. have size and morphology characteristics that are not ideal. Multi-phase particles with more favorable characteristics are obtained at lower temperatures. Consequently, the multi-phase particles may be formed at lower temperatures and then to increase the crystallinity of the nanoparticulates, a post treatment step may be performed (e.g., heat treatment). The post treatment step may be performed on the nanoparticulates after separation from the matrix. Alternatively, the nanoparticulates may be subjected to the post treatment prior to separation from the matrix.

Example 2

Phosphor Nanoparticulates and Salt Matrix

Precursor mediums are prepared for making powders containing multi-phase particles with phosphor nanoparticulates, having the general composition $Na(Y,Yb,Er)F_4$ nominally including 69 mol % Y, 30 mol % Yb and 1 mol % Er. The following precursors are included in the precursor mediums: $Y_2(CO_3)_2 \cdot xH_2O$, $Er_2(CO_3)_3 \cdot xH_2O$, $Yb_2(CO_3)_3 \cdot xH_2O$ and $NaHCO_3$. As a first step to the preparation of the precursor mediums, $HO^fAc$ is added to the carbonate precursors to form the corresponding metal trifluoracetates. Complete reaction of the precursors to the metal trifluoracetates is indicated by the presence of a clear precursor solution. A matrix precursor is then dissolved in the clear precursor solution. $NaNO_3$, NaF or NaCl are dissolved in the precursor medium as precursors for a salt matrix. The different precursor mediums prepared are listed in Table 15. Each precursor medium also includes an excess of $HO^fAc$.

TABLE 15

| | Precursor Mediums | | | |
|---|---|---|---|---|
| Sample | Phosphor Precursor (wt. %) | Matrix Salt (wt. %) | Water (wt. %) | Type of Matrix Salt |
| 1 | 5 | 5 | 90 | $NaNO_3$ |
| 2 | 5 | 5 | 90 | $NaNO_3$ |
| 3 | 2.5 | 12.5 | 85 | $NaNO_3$ |
| 4 | 1.5 | 15 | 83.5 | $NaNO_3$ |
| 5 | 3 | 9 | 88 | NaF |
| 6 | 3 | 15 | 82 | NaCl |
| 7 | | | | |
| 8 | | | | |
| 9 | 5 | 10 | 85 | $NaNO_3$ |
| 10 | | | | |

The precursor mediums are processed to produce powders containing multi-phase particles. The precursor mediums are processed using a spray pyrolysis system. The spray pyrolysis system includes an ultrasonic generator that generates a gas dispersion containing droplets of the precursor medium in a carrier gas. The gas dispersion is then heated in a tubular hot wall reactor to form the multi-phase particles, which are collected on a heated filter plate. Some samples are processed using an impactor to narrow the size distribution of the droplets of precursor medium in the gas dispersion prior to heating the droplets in the tubular hot wall reactor. The processing conditions for each sample are listed in Table 16.

TABLE 16

Processing Conditions

| Sample | Reactor Temperature (° C.) | Carrier Gas Flow Rate [lpm] | Carrier Gas | Impactor Used |
|---|---|---|---|---|
| 1 | 350 | 5 | $N_2$ | Yes |
| 2 | 500 | 5 | $N_2$ | Yes |
| 3 | 500 | 5 | $N_2$ | No |
| 4 | 500 | 5 | $N_2$ | No |
| 5 | 500 | 5 | $N_2$ | No |
| 6 | 500 | 5 | $N_2$ | No |
| 7 | 600 | 5 | $N_2$ | No |
| 8 | 700 | 5 | $N_2$ | No |
| 9 | 500 | 5 | $N_2$ | No |
| 10 | 500 | 10 | Air | No |

Some of the powders containing the multi-phase particles are characterized using XRD. Also, for some of the examples, additional characterization is performed on the nanoparticulates after they are released from the matrix of the multi-phase particles, including testing the nanoparticulates for luminescence. The results are summarized in Table 17.

TABLE 17

Results of Analysis on Powders

| Sample | Powder Color | Crystalline Phases Detected by XRD | Luminescence |
|---|---|---|---|
| 1 | White | $Na(YYbEr)F_4$<br>$NaYbF_4$<br>$NaF$<br>$NaHF_2$<br>$NaNO_3$ | Not tested |
| 1A (Separated nanoparticulates from sample 1) | White | $Na(YYbEr)F_4$<br>$NaYbF_4$<br>$NaNO_3$ | Green |
| 2 | White | $Na(YYbEr)F_4$<br>$NaYbF_4$<br>$NaF$<br>$NaHF_2$<br>$NaNO_3$ | Not tested |
| 3 | White | $Na(YYbEr)F_4$<br>$NaYbF_4$<br>$NaNO_3$<br>$NaF$ | Not tested |
| 4 | White | $Na(YYbEr)F_4$<br>$NaYbF_4$<br>$NaNO_3$<br>$NaF$ | Not tested |
| 5 | White | $Na(YYbEr)F_4$<br>$NaHF_2$<br>$NaF$ | Not tested |
| 6 | White | $Na(YYbEr)F_4$<br>$NaCl$<br>$NaHF_2$<br>$NaF$ | Not tested |
| 6A (Separated nanoparticulates from Sample 6) | White | $Na(YYbEr)F_4$ | Green |
| 7 | White | $Na(YYbEr)F_4$<br>$NaCl$<br>$NaHF_2$<br>$NaF$ | Not tested |
| 8 | White | $Na(YYbEr)F_4$<br>$NaCl$<br>$NaHF_2$<br>$NaF$ | Not tested |

The results of the XRD analysis determines that the phases detected correspond to the phases that would be expected based on the processing conditions.

The presence of $NaNO_3$ is clearly indicated in XRD measurements of powders containing multi-phase particles with a high matrix to nanoparticulate ratio. The desired nanoparticulate $Na(Y,Yb,Er)F_4$ phase is always formed. In most cases, the $Na(Y,Yb,Er)F_4$ phase is accompanied by $NaYbF_4$ and/or $NaYF_4$, which may be reacted with $NaErF_4$ at higher temperatures. The $NaErF_4$ concentration is not high enough to be detected by XRD.

The processing of the powders can also be carried out in the presence of excess $NaO^fAc$. During processing, $NaO^fAc$ forms an NaF matrix in-situ. The NaF matrix is formed after the water has been removed from the droplets of precursor medium. The use of excess $NaO^fAc$ to form a NaF matrix is selected because it provides free fluoride ions in the precursor solution, resulting in precipitation of $YF_3$.

As mentioned above, the precursor mediums are prepared with an excess of $HO^fAc$ to ensure a quantitative transformation of the metal carbonate precursors to the corresponding metal trifluoroacetate compounds. During the processing of the precursor mediums, excess $HO^fAc$ is converted into HF, which combines with NaF to form NaF.HF as is inferred by the XRD analysis.

SEM photomicrographs show that the multi-phase particles range in size between about 1 μm and 5 μm. The nanoparticulates (the desired phosphor product) range in size between about 50 nm and 200 nm.

Two of the samples are subjected to a step for separating the phosphor nanoparticulates from the matrix. 0.2 grams of powder from sample 1 are suspended in 10 ml water and stirred for 1 min. After settling, the supernatant is decanted. This process is repeated once. The resulting powder, sample 1A, is dried in air at room temperature.

1.1 grams of powder from sample 6 is suspended in 40 ml of water and stirred for 1 min. The salt matrix is dissolved while the $Na(Y,Yb,Er)F_4$ nanoparticulates stay in suspension. After settling, the supernatant is decanted. This process is repeated once. The resulting powder, sample 6A, is dried in air with a heat gun.

The phosphor nanoparticulates from sample 6A are shown to be pure $Na(Y,Yb,Er)F_4$ by XRD. The powder also shows green luminescence when irradiated by an infrared laser. Qualitatively, the brightness of the nanoparticulates of sample 6A is lower than the nanoparticulates of sample 1A.

Spray Pyrolysis Systems Used in Some of Examples 3-23

Some of the following Examples utilize a pilot scale spray pyrolysis system. The pilot scale spray pyrolysis system consists of an ultrasonic generator, a tube furnace, and a bag house. An aerosol of a precursor medium is generated in the ultrasonic generator, flowed horizontally through a tube inside the tube furnace, and collected on a filter inside the bag house. The ultrasonic generator consists of a 3×3 array of piezoelectric transducers that are arranged on the base of a generation chamber. The transducers operate in a water bath that sits just below the generator box. The generator box is a separate unit with a sealed polyimide (Kapton) membrane that separates the water bath and the precursor medium. The transducers act upon the precursor medium through this film to generate droplets of the precursor medium. A carrier gas is flowed into the generator box to move the droplets of precursor medium through a hot zone. In most cases, the carrier gas is air, but other gasses such as nitrogen, or forming gas may be employed. The hot zone consists of a quartz tube inside the tube furnace. The tube may be composed of materials such as metals or ceramics. The particles made from the precursor medium are collected in a bag house. Prior to collection, at the end of the hot zone, a quench gas is introduced. The quench gas may be air, nitrogen, forming gas or other gasses. The quench gas helps to lower the bag-house temperature to avoid filter degradation and negative effects associated with particle contact at high temperatures. The particles are collected on a filter and the gas flow is exhausted.

Some of the following Examples utilize a lab scale spray pyrolysis system, which is similar to the pilot scale spray pyrolysis system described above. However, the generator box in the lab scale system uses only one piezo transducer, which is in direct contact with the precursor medium. Carrier gas is run through the generator box into a tube furnace and particles are collected on a disk filter. Unless otherwise noted, the carrier gas is air. The disk filter is heated to avoid moisture precipitation inside the filter holder. There is no quench gas system on the lab scale system.

Example 3

Yttria Nanoparticulates and Salt Matrix

A precursor medium containing yttrium nitrate hexahydrate, $Y(NO_3)_3 6H_2O$ and sodium nitrate $NaNO_3$, dissolved in deionized water is prepared. The precursor medium contains:

| | |
|---|---|
| $Y(NO_3)_3*6H_2O$ | 85 g |
| $NaNO_3$ | 101.9 g |
| $H_2O$ | 200 g |

The precursor medium is sprayed out of a pump spray bottle onto a hotplate. The hotplate has a sheet of foil and a glass plate, onto which the precursor medium is sprayed. The glass plate is at a temperature of 300° C. The resulting deposit is scraped off of the glass plate and is then heated in a porcelain crucible using a box furnace. The box furnace is operated by being ramped up at 15° C./minute to a temperature of 550° C. and held at 550° C. for 12 minutes, then cooled at about 10° C./minute.

After processing the powder, examination indicates that the salt matrix melted during heating in the furnace. Also, some of the salt matrix vaporizes during the thermal treatment in the furnace, but the amount is not quantified. After the powder is thermal treated in the furnace, water is added to the crucible and the combined water and powder is poured onto a watch glass, where it is dried and subjected to characterization using XRD. XRD indicates very crystalline $Y_2O_3$. SEM images show that the $Y_2O_3$ nanoparticulates have a size in the range of 200 nm and smaller.

Example 4

Yttria Nanoparticulates and Salt Matrix

A precursor medium is prepared containing:

| | |
|---|---|
| Y Nitrate soln | 114 g |
| Eu Nitrate soln | 11.8 g |
| $NaNO_3$ | 88.9 g |
| Deionized $H_2O$ | 1790 g |

The precursor medium is processed using a spray dryer run at 232° C. as the inlet temperature and 121° C. for the outlet temperature, to produce a powder of multi-phase particles. Characterization of the powder using XRD indicates the presence of $Y(NO_3)_3.5H_2O$ and $NaNO_3$. The powder may be post treated by heating to produce yttria nanoparticulates from the $Y(NO_3)_3.5H_2O$.

Example 5

Silver Nanoparticulates and Salt Matrix

A precursor medium containing silver nitrate, $AgNO_3$ and sodium nitrate $NaNO_3$, dissolved in deionized water is prepared. The precursor medium contains:

| | |
|---|---|
| $AgNO_3$ | 10 g |
| $NaNO_3$ | 12.3 g |
| Deionized $H_2O$ | 200.5 g |

This precursor medium is designed for 10 wt % loading of salts, and to yield particles consisting of 10 vol % silver metal in a sodium nitrate salt matrix. The precursor medium is processed on the lab scale system described above, at a temperature of 300° C. and a carrier gas flow rate of 5 liters per minute (lpm). XRD analysis of the resulting powder shows strong sodium nitrate ($NaNO_3$) peaks without the presence of silver nitrate or silver peaks.

The precursor medium is also processed on the lab scale system at 400° C. and a carrier gas flow rate of 5 lpm. XRD pattern for this powder again shows strong sodium nitrate peaks. In this case there are also very small peaks that can be correlated to silver. No silver nitrate peaks are present, but silver metal peaks are not strong enough to indicate full decomposition of silver nitrate to silver. The particle may contain amorphous silver nitrate that may be post processed at low temperatures (<300° C.) in a reducing environment to yield nanoparticulates of silver.

Example 6

Silver Nanoparticulates and Salt Matrix

A precursor medium containing silver nitrate, $AgNO_3$ and sodium nitrate $NaNO_3$, dissolved in deionized water is prepared. The precursor medium contains:

| | |
|---|---|
| $AgNO_3$ | 100 g |
| $NaNO_3$ | 123 g |
| Deionized $H_2O$ | 2030 g |

The precursor medium is designed to approximate the precursor medium of Example 5. This material is processed with a spray dryer having an inlet temperature of 293° C. and an outlet temperature of 171° C. The powder recovered is light gray-blue in color. XRD of the powder indicates that sodium nitrate is present and also indicates that there may be some copper nitrate hydroxide contamination from previous processing of other precursor mediums. Sodium nitrate is well defined by the XRD but, no silver nitrate peaks are present. Silver nitrate may be amorphous and present in solid solution with the sodium nitrate. The silver nitrate may be converted to silver nanoparticulates by low temperature processing (<300° C.) in a reducing environment.

Example 7

Silver Nanoparticulates and Salt Matrix

A precursor medium containing silver nitrate, $AgNO_3$ and strontium nitrate $Sr(NO_3)_2$, dissolved in deionized water is prepared. The precursor medium contains:

| | |
|---|---|
| $AgNO_3$ | 37.5 g |
| $Sr(NO_3)_2$ | 60.9 g |
| Deionized $H_2O$ | 557.6 g |

The precursor medium is designed to yield a particle that is 10 vol % silver metal in a strontium nitrate salt matrix. Strontium nitrate is chosen for its solubility in water and for having a higher melting temperature than sodium nitrate. Strontium nitrate begins to melt or decompose at approximately 570° C. compared to sodium nitrate, which melts at approximately 330° C.

The precursor medium is processed at 450° C., 500° C., and 550° C. on the pilot scale system, with a carrier gas flow rate of 60 lpm. XRD indicates the presence of silver, strontium nitrate, and silver nitrate to varying degrees at the three temperatures. This indicates that the precursor medium cannot be processed to complete decomposition of silver without a reducing agent in the precursor, or a post process treatment of the powder.

Example 8

Silver Nanoparticulates, Silica and Salt Matrix

A precursor medium is prepared containing:

| | |
|---|---|
| $AgNO_3$ | 10.0 g |
| $NaNO_3$ | 12.3 g |
| Aerosil 200 (silica) | 1.3 g |
| Deionized $H_2O$ | 212.8 g |

This precursor medium is designed for 10 wt % loading of salts plus a fumed silica (with a surface area of 200 $m^2/g$), and is designed to yield 10 vol % silver metal, approximately 10 vol % silica and 80 vol % sodium nitrate matrix. The precursor medium is processed using the lab scale spray pyrolysis system previously described. The precursor medium is processed at 300° C. and 400° C., with a carrier gas flow rate of 5 lpm. The powders made from the precursor are pink-tan for the precursor medium processed at 300° C. and gray-brown for the precursor medium processed at 400° C. Characterization of the powders using XRD indicates the presence of $NaNO_3$ but not crystalline $AgNO_3$. The $AgNO_3$ may be amorphous. Additionally, the XRD does appear to indicate the presence of a small amount of converted silver. This powder may be post treated by heating in a reducing environment to form silver nanoparticulates from the amorphous $AgNO_3$.

Example 9

Silver Nanoparticulates, Silica and Salt Matrix

A precursor medium is prepared containing:

| | |
|---|---|
| $AgNO_3$ | 100.3 g |
| $NaNO_3$ | 123.4 g |
| Aerosil 200 (silica) | 13.4 g |
| Deionized $H_2O$ | 2135 g |

The precursor is prepared to contain the same ratios of components as Example 8. The precursor medium is processed using a spray dryer with an inlet temperature of 293° C. and outlet temperature of 171° C. The resulting powder is gray in color. The XRD analysis of the powder shows strong sodium nitrate peaks and no silver or silver nitrate peaks. This powder may be post treated by heating in a reducing environment to form silver nanoparticulates from the amorphous $AgNO_3$.

Example 10

Silver Nanoparticulates and Salt Matrix with Use of Reducing Agent

A precursor medium is prepared containing:

| | |
|---|---|
| $AgNO_3$ | 10.0 g |
| $NaNO_3$ | 12.3 g |
| Deionized $H_2O$ | 212.8 g |
| 3-amino-1-propanol | 13.0 g |

The precursor medium is processed on the lab scale system at 400° C. Due to problems with buildup of system pressure, 450° C. is chosen as the temperature with a carrier gas flow rate of 5 lpm. The resulting powder is brown in color. XRD indicates the presence of sodium nitrate and silver.

Example 11

Silver Nanoparticulates, Silica and Salt Matrix with Use of Reducing Agent

A precursor medium is prepared containing:

| | |
|---|---|
| $AgNO_3$ | 10.0 g |
| $NaNO_3$ | 12.3 g |
| Aerosil 200 (silica) | 1.3 g |
| Deionized $H_2O$ | 212.8 g |
| 3-amino-1-propanol | 13.0 g |

This precursor medium is designed for 10 wt % loading of salts plus a fumed silica (with a surface area of 200 $m^2/g$) and is designed to yield 10 vol % silver metal, approximately 10 vol % silica and 80 vol % sodium nitrate matrix. Additionally, the precursor medium contains a reducing agent for creating a reducing environment for converting the $AgNO_3$ to silver.

The precursor medium is processed using the lab scale spray pyrolysis system at temperatures of 350° C., 400° C. and 450° C., with a carrier gas flow rate of 5 lpm. The spray pyrolysis system runs well at 400° C. and 450° C. but the filter clogs at 350° C. giving a small sample. The powder produced from the processing is very dark brown.

Characterization of the powder produced from processing at 350° C. indicates the presence of $NaNO_3$ and cubic silver. The powders produced at 400° C. and 450° C. also indicate the presence of $NaNO_3$ and cubic silver, but show an unidentified crystalline phase having more pronounced peaks at 450° C. than at 400° C. Transmission electron microscope (TEM) images are taken of the sample processed at 350° C. The TEM images show silver nanoparticulates of about 20 nm in a matrix, with some of the nanoparticulates as small as 5 nm. The TEM beam seems to melt the sodium nitrate matrix. Silica may be present in some instances as a matrix but it is unclear if the silica is present at the surface of the nanoparticulates to form a coating.

Example 12

Silver Nanoparticulates, Silica and Salt Matrix with Use of Reducing Agent

A precursor medium is prepared containing:

| | |
|---|---|
| AgNO$_3$ | 100.2 g |
| NaNO$_3$ | 123.4 g |
| Aerosil 200 (silica) | 13.4 g |
| Deionized H$_2$O | 2125 g |
| 3-amino-1-propanol | 100 g |

The precursor has the same silver/silica/sodium nitrate ratios as in Example 11, with a slightly lower 3-amino-1-propanol ratio. The above precursor is prepared and shipped overnight for processing in a spray dryer. This is different from the precursor mediums processed on the pilot scale and lab scale spray pyrolysis systems, which are processed immediately after preparation. The precursor material ages during shipping to the spray dryer. When initially mixed, the material is clear and light yellow in color. After shipping the material is still clear, but is gray in color, and some settling of the silica component appears to take place. The precursor medium is stirred to resuspend the silica and processed through the spray dryer with an inlet temperature of 482° C. and an outlet temperature of 260° C. The recovered powder is dark gray-brown in color. The XRD pattern of this material shows strong silver peaks as well as sodium nitrate peaks.

The above material is post processed to separate the silver-silica particles. This is done by solvating the sodium nitrate matrix with deionized water and separating the silver-silica particles from the slurry by centrifuge. Particles are collected as a cake, then resuspended and centrifuged several times in order to remove all the sodium nitrate. In the last step, particles are suspended in absolute ethanol and allowed to dry in a crystallization dish at 60° C. The recovered powder is analyzed by XRD, SEM and BET. XRD indicates silver with no sodium nitrate remaining. Crystallite size is calculated, by the Scherer equation, as 21.3 nm. SEM of the material indicates particles in the sub100 nm range.

Example 13

Silver Nanoparticulates, Silica and Salt Matrix with Use of Reducing Agent

A precursor medium similar to the one in Example 12 is prepared containing:

| | |
|---|---|
| AgNO$_3$ | 37.5 g |
| NaNO$_3$ | 46.2 g |
| Aerosil 200 (silica) | 5.0 g |

-continued

| | |
|---|---|
| Deionized H$_2$O | 742 g |
| 3-amino-1-propanol | 56.2 g |

The precursor medium is processed using the pilot scale system at 450° C., 500° C. and 550° C. with a carrier gas flow rate of 60 lpm. XRD of the collected powders indicate the presence of silver and sodium nitrate. The sample produced at 450° C. is separated from the matrix with deionized water in a test tube and analyzed by XRD. The XRD indicates the presence of silver. Calculation of the crystallite size via the Scherer equation gives 16 nm.

Larger amounts of the sample produced at 450° C. are separated from the salt matrix by addition of water and centrifugation. This is done 3 times, after which the separated material is dispersed in methanol and dried in air at room temp until most of the methanol is gone. The separated material is then dried at 120° C. in a box oven for one hour. BET surface area for this material is measured to be 33.7 m$^2$/g.

SEM of all powders show particles on the order of 1 to 5 microns with smaller silver particulates present on the surface. All the powders seem to produce silver inclusions ranging from 50 nm to 200 nm. The samples made at higher temperatures seem to be dryer and easier to handle.

Collection and separation of the powders is complicated by the presence of organic residue. This residue imparts an orange hue when the powders are put into water. This residue is also present on the inside of the bag housing after the precursor medium is processed. It is assumed that the residue may be formed due to the presence of the 3-amino-1-propanol reducing agent.

Example 14

Silver Nanoparticulates, Silica and Salt Matrix with Use of Reducing Agent

A precursor medium is prepared containing:

| | |
|---|---|
| AgNO$_3$ | 5 g |
| NaNO$_3$ | 6.2 g |
| Sol-gel solution | 13.4 g |
| Deionized H$_2$O | 94 g |
| 3-amino-1-propanol | 7.5 g |

The precursor medium contains a premixed sol-gel solution composed of tetraethoxysilane, ethanol, water, and a catalyst and yields about 28.8 wt % silica. The sol-gel solution is used in place of the Aerosil 200 fumed silica used in previous Examples. The precursor medium is designed to yield the same ratios of components as Examples 11-13, with particles of 80 vol % sodium nitrate, 10 vol % silica, and 10 vol % silver. This material is processed using the lab scale system at 450° C., with a carrier gas flow rate of 5 lpm. The SEM images of the resulting powder shows silver particles ranging from 50 to 500 nm inside micron size matrix particles. This precursor produces silver particles that are much larger than those generated with precursor mediums that have fumed silica.

Example 15

Silver Nanoparticulates, Silica and Salt Matrix with Use of Reducing Agent

A precursor medium is prepared containing:

| | |
|---|---|
| AgNO$_3$ | 15 g |
| NaNO$_3$ | 18.6 g |
| 3-aminopropyl triethoxysilane | 13.4 g |
| 3-amino-1-propanol | 9.0 g |
| Ethanol | 33.5 g |
| Deionized H$_2$O | 301.8 g |

In the precursor medium, 3-aminopropyl triethoxysilane is used as both reducing agent and silica precursor. 3-amino-1-propanol is also used in order to maintain a similar silica volume ratio to the previous Examples (that have silica, silver, salt and a reducing agent), while ensuring that the silver is completely complexed. Ethanol is used as a medium to combine the two reducing agents while minimizing the chance of gel formation. The precursor medium is mixed by first making an aqueous solution of the nitrates (AgNO$_3$ and NaNO$_3$) and then a mixture of 3-amino-1-propanol and 3-aminopropyl triethoxysilane in ethanol. The two solutions are combined to yield a clear light brown precursor medium. The precursor medium is allowed to sit for 30 minutes to an hour to ensure no gel formation. The precursor medium is then processed using the pilot scale system at 450° C. with a carrier gas flow rate of 60 lpm.

XRD of the resulting powder indicates the presence of silver and sodium nitrate. SEM images of the powder show silver particles on the order of 100 nm inside micron size matrix particles. Some areas show particles that are smaller; on the order of 50 nm. Overall, the powders appear to be comparable to those produced with fumed silica.

Example 16

Silver Nanoparticulates, Silica and Salt Matrix with Use of Reducing Agent

A precursor medium is prepared containing:

| | |
|---|---|
| AgNO$_3$ | 37.5 g |
| NaNO$_3$ | 46.1 g |
| Aerosil 200 fumed silica | 5.1 g |
| Ethylene Diamene | 22.5 g |

Deionized H$_2$O 776 g

The precursor medium is prepared with ethylenediamene as a reducing agent instead of 3-amino-1-propanol. The precursor medium is processed using the pilot scale system at a temperature of 550° C. and a carrier gas flow rate of 60 lpm. XRD of the powders indicates the presence of sodium nitrate and silver. SEM images of the powders appear very similar to those produced with 3-amino-1-propanol as the reducing agent. The residue associated with the powders made from precursor mediums containing 3-amino-1-propanol as a reducing agent (see Example 13) is not present in the baghouse.

Example 17

Silver Nanoparticulates, Polymer and Salt Matrix with Use of Reducing Agent

A precursor medium is prepared containing:

| | |
|---|---|
| AgNO$_3$ | 5 g |
| NaNO$_3$ | 6.3 g |
| 3-amino-1-propanol | 7.5 g |
| Polyvinyl pyrrolidone 10,000 MW | 0.5 g |
| Deionized H$_2$O | 94 g |

The precursor medium is processed using the lab scale system at 450° C. with a carrier gas flow rate of 5 lpm. XRD of the powder shows silver but no indication of sodium nitrate peaks. This may be due to the presence of the polyvinyl pyrrolidone (PVP) polymer. SEM images of the powder show silver particles in a matrix. The silver particles appear to have a structure similar to strings of necked particles. The strings appear to be on the order of 1 to 2 microns in length within matrix particles around 1 to 3 microns in diameter.

Example 18

Silver Nanoparticulates, Polymer and Salt Matrix with Use of Reducing Agent

A precursor medium is prepared containing:

| | |
|---|---|
| AgNO$_3$ | 75 g |
| NaNO$_3$ | 92.2 g |
| Ethylene diamene | 45 g |
| Polyvinyl pyrrolidone 10,000 MW | 15 g |
| Deionized H$_2$O | 1640 g |

The precursor medium is a modification of Example 17, which is processed using the lab scale system. The precursor medium is designed to have a loading of 10 wt % of soluble materials. The amount of PVP is roughly doubled, with respect to other components, as compared to the precursor medium in Example 17. This should produce particles that are about 7.7 vol % silver, 24.8 vol % PVP and 67.5 vol % sodium nitrate. The precursor medium is processed using the pilot scale system at 550° C. and with a carrier gas flow rate of 60 lpm.

The powder is dark gray in color. XRD of the powder indicates peaks for silver and sodium nitrate. SEM images of the powder look very different from Example 17, made with half as much PVP in the precursor medium. Many of the multi-phase particles appear to have nanoparticulates on the order of 100 nm uniformly coating the surface of the micron sized multi-phase particles. Other multi-phase particles within the same lot have a much different microstructure—containing a silver component at the surface that is much more aggregated, and which are not distributed uniformly throughout the multi-phase particle. Many of the multi-phase particles appear to have these silver aggregate particulates present on only one side of the particle.

The precursor medium is also processed at lower temperatures of 400° C., 450° C., and 500° C. and at a higher temperature of 600° C. These temperature variations seem to have little effect upon particle morphology as determined by SEM, but the temperatures of 500° C. and lower consistently clog the filter bags on the pilot scale system.

Separation of the nanoparticulates from the multi-phase particles is attempted by addition of water to the powder. About 0.2 to 2 g of different powders are mixed with about 50 g of water. This produces a light gray-green suspension for powders processed at 550° C. Powders processed at 500° C. and 450° C. tend to form dark brown suspensions. Nanoparticulates are separated by flocculation overnight or by centrifugation at 700 rpm. The color of the water after settling of the nanoparticulates varies from light yellow for powders processed at 550° C. to dark yellow to orange for powders processed at 500° C. and 450° C.

After settling of the nanoparticulates, they can be resuspended in a small amount of ethylene glycol but are not stable for more than several minutes. Films made from drying the settled nanoparticulates on a hotplate, at 120° C., appear to be thin and uniform. Deposits are gray in color, but have areas that are shiny. It is assumed that the darker areas are larger particles and that shiny areas may be the result of smaller particles.

Example 19

Silver Nanoparticulates and Silica Matrix with Use of Reducing Agent

A precursor medium is prepared containing:

| | |
|---|---|
| $AgNO_3$ | 10.0 g |
| Aerosil 200 (silica) | 1.3 g |
| Deionized $H_2O$ | 89.0 g |
| 3-amino-1-propanol | 13.0 g |

The precursor medium is made by mixing a 20 wt % silver nitrate in water solution. Aerosil 200 fumed silica is added to the solution and suspended with an ultrasonic horn. A 3-amino-1-propanol solution is then prepared separately and the two mixtures are combined to produce a slightly opaque yellow mixture. The precursor is designed to yield particles with a one to one ratio of silver and silica.

The precursor medium is processed using the lab scale system at 450° C., with a carrier gas flow rate of 5 lpm. The collected powder is dark gray. XRD of the powder shows peaks for silver. SEM shows particles on the order of 1 micron in size that appear to be composed of smaller particles in the range of 50 to 200 nm.

Example 20

Silver Nanoparticulates and Polymer Matrix

A precursor medium is prepared containing:

| | |
|---|---|
| $AgNO_3$ | 30 g |
| Polyvinyl pyrrolidone 10,000 MW | 12 g |
| Deionized $H_2O$ | 235 g |

The precursor medium has 15 wt % soluble components and is designed to yield particles with 13.4 vol % silver nanoparticulates inside a PVP matrix. The precursor medium is formulated with the idea of achieving similar results as have been achieved by liquid batch routes in the polyol process, which produces silver nanoparticulates of approximately 50 nm in size.

The precursor medium is processed using the pilot scale system at 550° C. with a carrier gas flow rate of 60 lpm. The resulting powder is very dark brown. XRD of the resulting powder indicates contamination of strontium nitrate from a previous precursor medium, but primarily shows the presence of silver. Some silver nitrate appears to be present, but is difficult to identify. SEM images of the powder show spherical particles on the order of 1 to 5 microns. The surface of the spherical particles appears to contain nanoparticulates. The larger particles contain features less than 100 nm in diameter on their surfaces. Some of the larger particles appear to be hollow and the nanoparticulates can be seen in pieces of crumbled micron size hollow particles.

The precursor medium is also processed using the pilot scale system at 350° C. with a carrier gas flow rate of 60 lpm. XRD of this sample is also contaminated with strontium nitrate from previously processed precursor mediums, but does clearly show the presence of silver. The morphology of the powder is similar to the powder produced at 550° C., with sub-100 nm features visible on the surface of micron size particles.

Example 21

Copper Nanoparticulates and Salt Matrix

A precursor medium is prepared containing:

| | |
|---|---|
| $Cu(NO_3)_2 \cdot 3H_2O$ | 7.7 g |
| $NaNO_3$ | 13.6 g |
| Deionized $H_2O$ | 176.6 g |

The precursor medium has a loading of 10 wt % salts and is designed for the copper yield to represent 10 vol % of the powder produced. The precursor medium is processed using the lab scale spray pyrolysis system, with a carrier gas flow rate of 5 lpm. Initially, the precursor medium is processed at a temperature of 250° C., however the powder produced is wet and forms a cake on the filter. The powder on the filter is brown in places and light blue in places. When collected and put in a bottle the overall color is brown. Characterization by XRD indicates the presence of sodium nitrate and copper nitrate hydroxide $(Cu_4(NO_3)_2(OH)_6)$ with an unaccounted for peak at 2 theta=45. Additionally, the precursor medium is also processed at 300° C. and 400° C. The increase in temperature produces a drier, slightly darker powder but does not change the XRD pattern.

Example 22

Copper Nanoparticulates and Salt Matrix

A precursor medium is prepared containing:

| | |
|---|---|
| $CuNO_3 \cdot 3H_2O$ | 200.1 g |
| $NaNO_3$ | 120 g |
| Deionized $H_2O$ | 2874 g |

The precursor medium is mixed and packaged in liquid form, shipped, and processed in a spray dryer. The precursor medium is processed at an inlet temperature of 282° C. and an outlet temperature of 149° C. The liquid production rate of this sample is about 300 g/minute. About 100 grams of powder are collected. The powder is light blue-green in color. XRD of the powder indicates the presence of sodium nitrate ($NaNO_3$) and copper nitrate hydroxide $(Cu_4(NO_3)_2$ (OH)$_6$. The powder must be post treated in a reducing atmosphere in order to reduce the copper nitrate hydroxide to copper nanoparticulates.

Example 23

Copper Nanoparticulates, Silica and Salt Matrix

A precursor is prepared by dissolving salts in water in combination with fumed silica particles. The precursor medium contains:

| | |
|---|---|
| CuNO$_3$*3H$_2$O | 200 g |
| NaNO$_3$ | 119.2 g |
| Aerosil 200 fumed silica | 13 g |
| H$_2$O | 2885 g |

The precursor medium has a loading of 10 wt % salts and is designed for the copper yield to represent 10 vol % of multi-phase particle assuming complete conversion of the copper precursor to copper with 10 vol % silica and 80 vol % NaNO$_3$. The precursor medium is mixed and packaged in liquid form, shipped, and processed in a spray dryer. The precursor medium is processed in the spray dryer with an inlet temperature of 293° C. and an outlet temperature of 171° C. The powder is light blue-green in color. XRD indicates the presence of NaNO$_3$ and copper nitrate hydroxide Cu$_4$(NO$_3$)$_2$(OH)$_6$. The powder may be post treated by heating to form silica with copper oxide nanoparticulates in a salt matrix.

Example 24

Precursor Mediums with Silver Nitrate and High Melting Point Salt

In searching, for a salt matrix material that is stable at high processing temperatures, salts such as fluorides, chlorides and sulfates are considered. However, these system have a propensity to form insoluble silver salts with the chloride and fluoride ions in solution, which also cause corrosion of processing equipment. A solution to this problem is achieved by complexing the silver from the silver nitrate with an amine such as 3-amino-1-propanol.

In one case, silver nitrate is combined with sodium sulfate in water in an attempt to create an aqueous precursor medium. Silver sulfate precipitates as a result. The problem is resolved by complexing the silver with 3-amino-1-propanol, which results in a clear gray-green solution, when 3-amino-1-propanol is added to the precursor medium in greater than a 2 to 1 molar ratio to silver.

The foregoing discussion of the invention has been presented for purposes of illustration and description. The foregoing is not intended to limit the invention to only the form or forms specifically disclosed herein. Although the description of the invention has included description of one or more embodiments and certain implementations, variations and modifications, other implementations, variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, any feature described with respect to any disclosed embodiment, implementation or variation of any aspect of the invention may be combined in any combination with one or more features of any other embodiment, implementation or variation of the same or any other aspect of the invention. For example, additional processing steps can be included at any point before, during or after processing disclosed in any of the process embodiments described herein or shown in any of the figures, so long as the additional steps are not incompatible with the disclosed processing according to the present invention. Moreover, processing steps disclosed in any of the process embodiments described herein can be combined with any other processing steps described with any other process embodiment. Not to limit the generality of the foregoing, any number of the decomposing particles 116, modifying nanoparticulates 118, modifying matrix 126, separating nanoparticulates 128, dispersing nanoparticulates 130, collecting particles 136, quenching particles 144, treating particles 146 and removing solutes 148 may be combined, with or without the generating gas dispersion 102 and/or the forming particles 104, in any way provided that the combination is not technically incompatible, and all such combinations are within the scope of the present invention.

The terms "comprising, "containing, "including, and "having," and variations thereof, are intended to be non-limiting in that the use of such terms indicates the presence of some condition or feature, but not to the exclusion of the presence of any other condition or feature. Percentages stated herein are by weight unless otherwise expressly stated.

What is claimed is:

1. A gas dispersion method for making nanoparticulates, the method comprising: generating a flowing gas dispersion, as generated the gas dispersion comprising droplets of a precursor medium dispersed in a gas phase, with the precursor medium comprising liquid vehicle and at least two precursors, a first said precursor being a precursor to a first material and a second said precursor being a precursor to a second material, the second material being a surface-modifying material comprising a dispersing agent capable of inhibiting agglomeration and promoting dispersion of nanoparticulates in a dispersion medium; in the gas dispersion, forming particles dispersed in the gas phase, the particles dispersed in the gas phase each comprising the second material and nanoparticulates that include the first material; the forming particles comprising removing at least a portion of the liquid vehicle from the droplets; wherein, the particles are decomposable in a liquid dispersion medium to release the nanoparticulates from the particles for dispersion of the nanoparticulates in the liquid dispersion medium; and wherein, when the particles are decomposed in and the nanoparticulates are dispersed in the liquid dispersion medium, at least a portion of the second material modifies a surface of the dispersed nanoparticulates, wherein the second material is chemically reactable with the nanoparticulates to functionalize the surface of the nanoparticulates.

2. A gas dispersion method for making nanoparticulates, the method comprising: generating a flowing gas dispersion, as generated the gas dispersion comprising droplets of a precursor medium dispersed in a gas phase, with the precursor medium comprising liquid vehicle and at least two precursors, a first said precursor being a precursor to a first material and a second said precursor being a precursor to a second material, the second material being a surface-modifying material comprising a dispersing agent capable of inhibiting agglomeration and promoting dispersion of nanoparticulates in a dispersion medium; in the gas dispersion, forming particles dispersed in the gas phase, the particles dispersed in the gas phase each comprising the second material and nanoparticulates that include the first material; the forming particles comprising removing at least a portion of the liquid vehicle from the droplets; wherein, the particles are decomposable in a liquid dispersion medium to release the nanoparticulates from the particles for dispersion of the nanoparticulates in the liquid dispersion medium; and wherein, when the particles are decomposed in and the nanoparticulates are dispersed in the liquid dispersion medium, at least a portion of the second material modifies a surface of the dispersed nanoparticulates, wherein after the forming particles, the method comprises: decomposing the particles in the liquid dispersion medium; and in the liquid dispersion medium, releasing the nanoparticulates from the particles, wherein during or after the decomposing, the method comprises: reacting the second material with the nanoparticulates to functionalize a surface of the nanoparticulates.

* * * * *